May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 1

INVENTORS: J. W. DEHN
O. H. WILLIFORD

BY C. Mathie

ATTORNEY

May 16, 1950 J. W. DEHN ET AL 2,508,053

AUTOMATIC MONITOR FOR COMPARING DESIGNATIONS
RECEIVED AND TRANSMITTED BY CONTROL CIRCUITS
IN DIAL SWITCHING SYSTEMS

Filed Dec. 31, 1948 34 Sheets-Sheet 2

INVENTORS J. W. DEHN
O. H. WILLIFORD
BY C. Mathie
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 3

INVENTORS J. W. DEHN
O. H. WILLIFORD
BY C. Mathie
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 4

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 5

INVENTORS: J. W. DEHN
O. H. WILLIFORD

BY C. Mathie

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 6

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 7

INVENTORS J. W. DEHN
O. H. WILLIFORD

BY C. Mattice

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 8

INVENTORS J. W. DEHN
O. H. WILLIFORD

BY C. Mattie

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 9

INVENTORS: J. W. DEHN
O. H. WILLIFORD

BY C. Mattice

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 10

INVENTORS J. W. DEHN
O. H. WILLIFORD

BY C. Mathis

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 11

INVENTORS J. W. DEHN
O. H. WILLIFORD

BY C. Mathie

ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 12

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS
RECEIVED AND TRANSMITTED BY CONTROL CIRCUITS
IN DIAL SWITCHING SYSTEMS

Filed Dec. 31, 1948 34 Sheets-Sheet 13

INVENTORS J.W. DEHN
O.H. WILLIFORD
BY C. Mattice
ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 15

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 16

INVENTORS: J. W. DEHN
O. H. WILLIFORD
BY C. Mathis
ATTORNEY

May 16, 1950 J. W. DEHN ET AL 2,508,053

AUTOMATIC MONITOR FOR COMPARING DESIGNATIONS
RECEIVED AND TRANSMITTED BY CONTROL CIRCUITS
IN DIAL SWITCHING SYSTEMS

Filed Dec. 31, 1948 34 Sheets-Sheet 17

INVENTORS J. W. DEHN
O. H. WILLIFORD
BY C. Mattice
ATTORNEY

INVENTORS
J. W. DEHN
O. H. WILLIFORD
BY C. Mathis
ATTORNEY

May 16, 1950 J. W. DEHN ET AL 2,508,053

AUTOMATIC MONITOR FOR COMPARING DESIGNATIONS
RECEIVED AND TRANSMITTED BY CONTROL CIRCUITS
IN DIAL SWITCHING SYSTEMS

Filed Dec. 31, 1948 34 Sheets-Sheet 19

INVENTORS J. W. DEHN
O. H. WILLIFORD
BY C. Mathie
ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 20

INVENTORS J.W. DEHN
O.H. WILLIFORD
BY C. Mathie
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 21

INVENTORS J. W. DEHN
O. H. WILLIFORD
BY C. Mathie
ATTORNEY

INVENTORS
J. W. DEHN
O. H. WILLIFORD
BY
C. Mathews
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 23

INVENTORS: J. W. DEHN
O. H. WILLIFORD

BY C. Mattice

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 24

INVENTORS: J. W. DEHN
O. H. WILLIFORD

BY C. Mathis

ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 25

INVENTORS: J. W. DEHN
O. H. WILLIFORD
BY C. Mattice
ATTORNEY

INVENTORS J. W. DEHN
O. H. WILLIFORD
BY C. Mattice
ATTORNEY

INVENTORS J. W. DEHN
O. H. WILLIFORD
BY C. Mathie
ATTORNEY

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 29

INVENTORS J. W. DEHN
O. H. WILLIFORD

BY C. Mattice

ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 30

INVENTORS J. W. DEHN
O. H. WILLIFORD
BY C. Mattice
ATTORNEY

May 16, 1950 J. W. DEHN ET AL 2,508,053

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 31

INVENTORS J. W. DEHN
O. H. WILLIFORD

BY C. Mathie

ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948 34 Sheets-Sheet 32

INVENTORS J. W. DEHN
O. H. WILLIFORD
BY C. Mattice
ATTORNEY

INVENTORS J. W. DEHN
O. H. WILLIFORD
BY C. Mattice
ATTORNEY

AUTOMATIC MONITOR FOR COMPARING DESIGNATIONS RECEIVED AND TRANSMITTED BY CONTROL CIRCUITS IN DIAL SWITCHING SYSTEMS

Filed Dec. 31, 1948

INVENTORS: J. W. DEHN
O. H. WILLIFORD
BY C. Mathie
ATTORNEY

Patented May 16, 1950

2,508,053

UNITED STATES PATENT OFFICE 2,508,053

AUTOMATIC MONITOR FOR COMPARING DESIGNATIONS RECEIVED AND TRANSMITTED BY CONTROL CIRCUITS IN DIAL SWITCHING SYSTEMS

Joseph W. Dehn, Great Neck, and Oscar H. Williford, Bronxville, N. Y., assignors to Bell Telephone Laboratories, Incorporated, New York, N. Y., a corporation of New York Application December 31, 1948, Serial No. 68,556

12 Claims. (Cl. 179—175.24)

Figure 1:
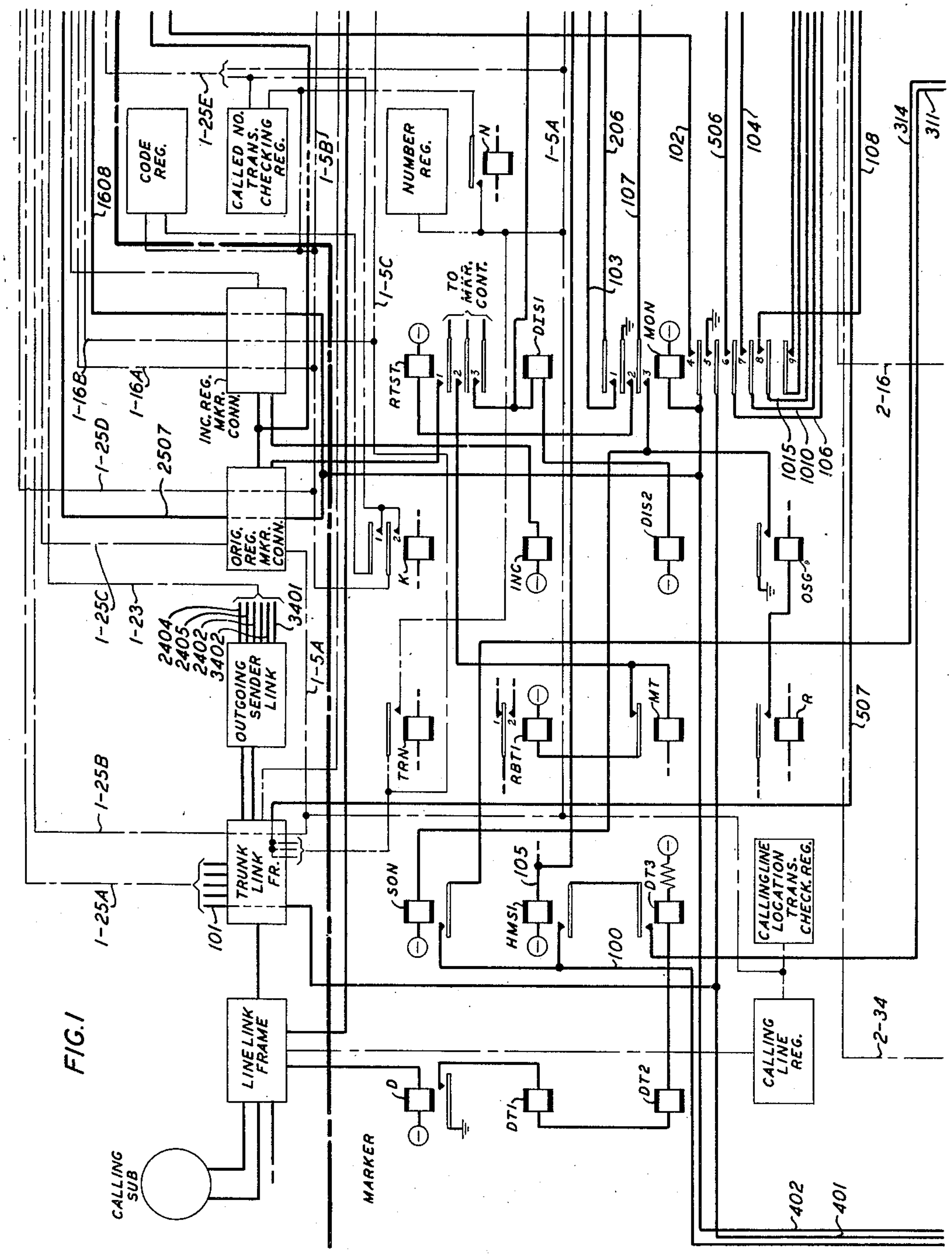

This invention relates to automatic telephone systems and has for its object to facilitate the maintenance of such systems.

In automatic systems employing cross-bar switches, the function of registering the designation of a desired line and the function of controlling the automatic switches to establish the necessary connection are performed by separate control units known respectively as register senders and markers, and the designation must be transferred from the register sender to the marker before the latter can perform its function. It is essential, therefore, that the designation so transferred be the same as that registered.

In cross-bar systems of the prior art a set of originating register senders and originating markers has been employed for receiving the designation from the calling subscriber and connecting the calling line to an interoffice trunk and a set of terminating register senders and terminating markers has been employed for receiving the called line number from the originating register sender and connecting an interoffice trunk with the called line. To determine that these register senders are transferring correctly the designations received to the associated markers, two routine testing circuits are provided, one for each kind of register sender, which select the register senders in succession, set up therein a variety of arbitrary designations, receive the designations as transferred to a marker, and check the accuracy of such transfer.

In the cross-bar system disclosed in the copending application of A. J. Busch, Serial No. 57,394, filed October 29, 1948, a single type of marker is employed to establish both originating and terminating connections receiving designations from either orginating registers or from incoming registers, which resemble the terminating register senders of the prior art. In addition, this system employs outgoing senders for transmitting designations, which they receive from the markers, to other offices.

In accordance with the present invention, means is provided, associated with the above type of cross-bar system, for checking designations transferred to or from the marker with those received by the registers or sent out by the sender during service.

This means takes the form of an automatic monitor which is seized, if idle, at the seizure of a register or sender, is connected with the seizing circuit and with the marker associated with that circuit, receives the designation as transmitted to a register or from a sender, receives the same designation as transferred to or from the marker and checks the designations as received and transferred. Means is provided, in case the designations do not check, to make a trouble record which gives the two forms of the designation and therefore provides a means for accurately identifying the source of the error.

A feature of the invention lies in means for repeatedly advancing the monitor through a cycle during which it performs a plurality of monitoring operations on each variety of circuit, that is on originating registers, on incoming registers and on outgoing senders. Means is also provided to vary the relative number of monitoring operations performed on each variety of circuit.

In addition, means is provided to optionally cause the monitor to monitor only on one of said varieties of circuits, or to monitor on a single one of said circuits.

Incoming registers may be of a plurality of types according to the form of pulsing they are arranged to receive, for example dial pulsing, multifrequency pulsing, etc. Similarly, outgoing senders may be of a plurality of types according to the form of pulsing they are arranged to transmit. The monitor is provided with a plurality of pulse receiving circuits each of which is responsive to a particular form of pulsing. When the monitor is associated with an incoming register or outgoing sender, it receives an indication of the form of pulsing to be expected and responds thereto to render the proper pulse receiving circuit effective.

Figure 5:
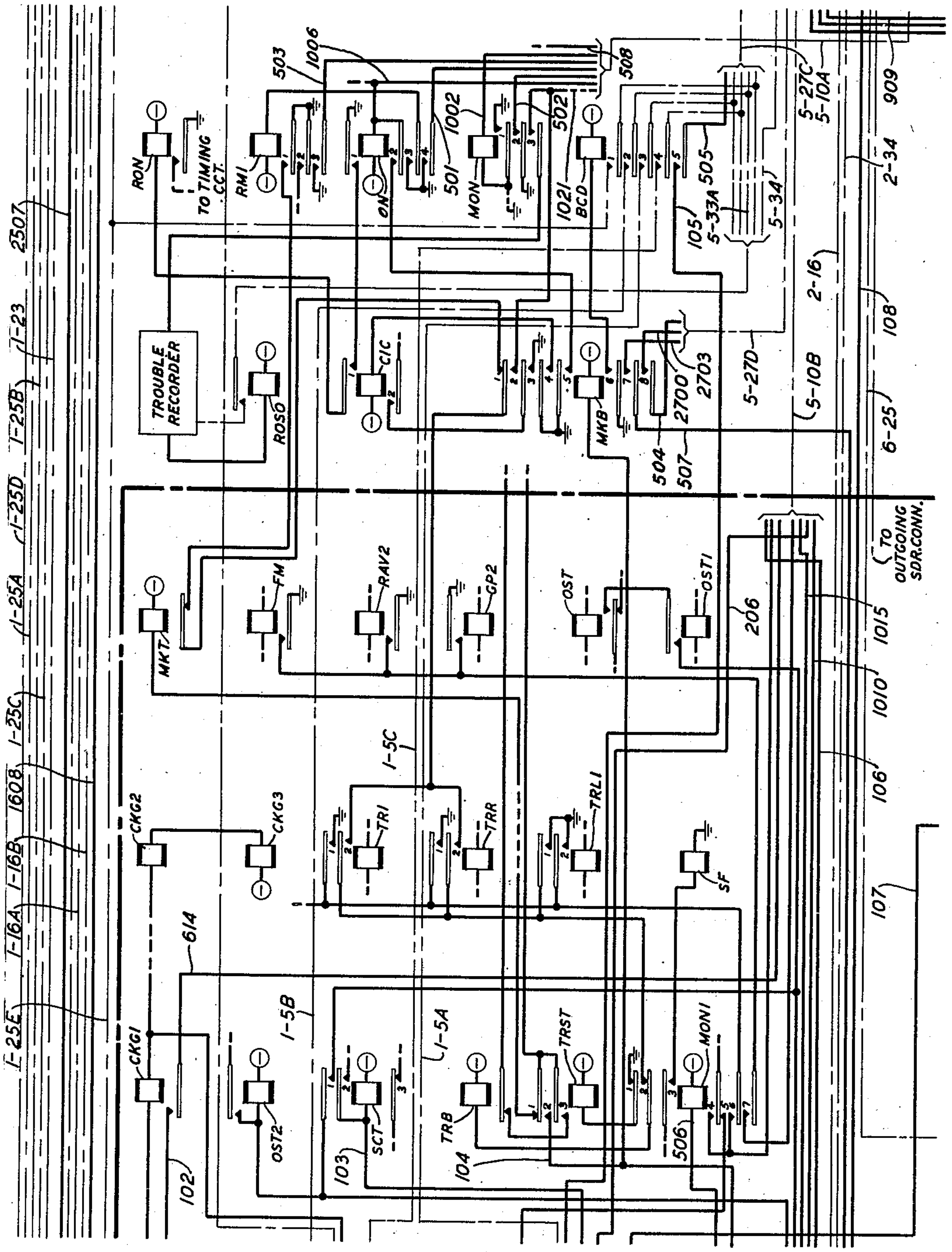
Figure 6:
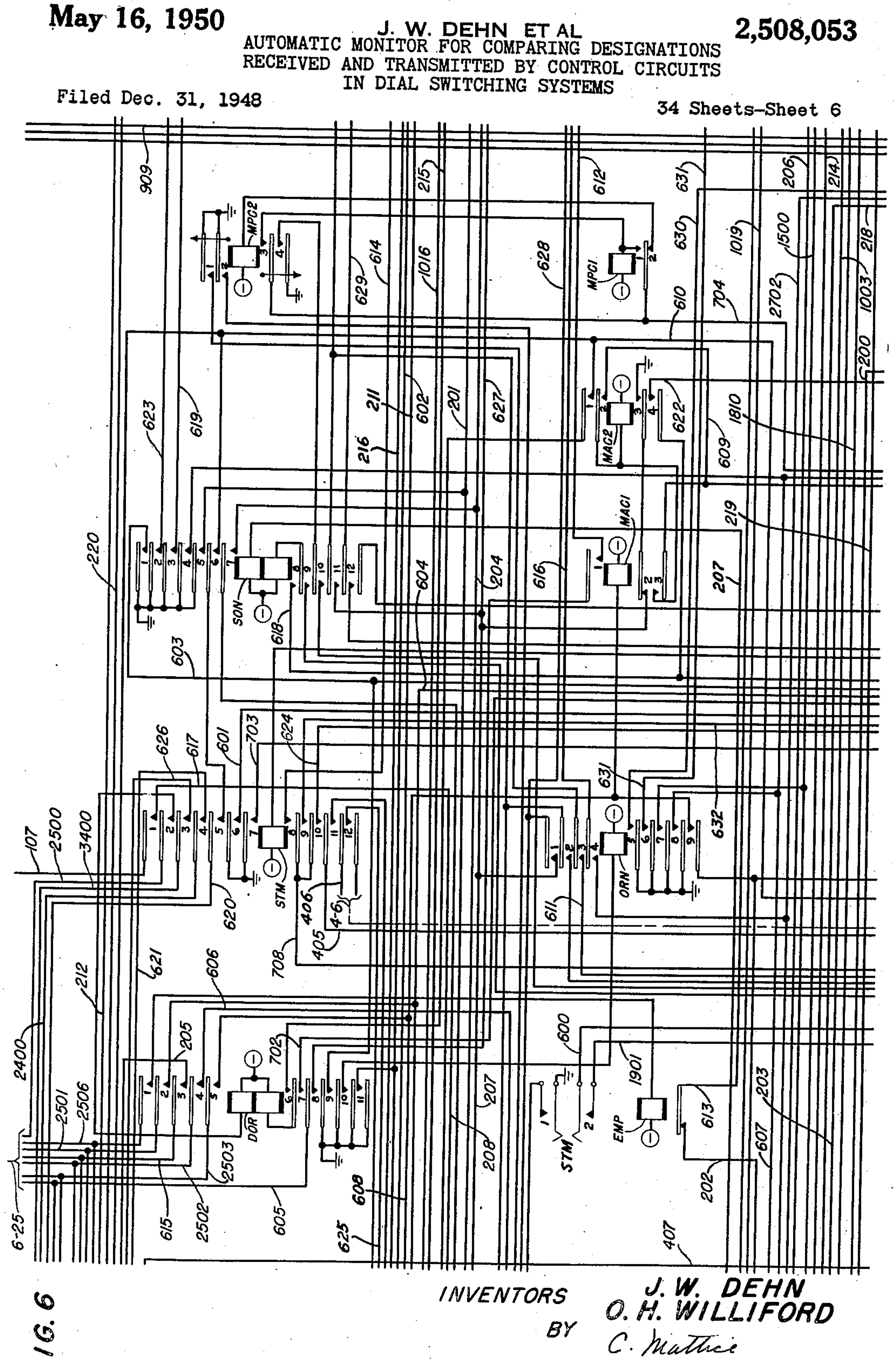
Figure 7:
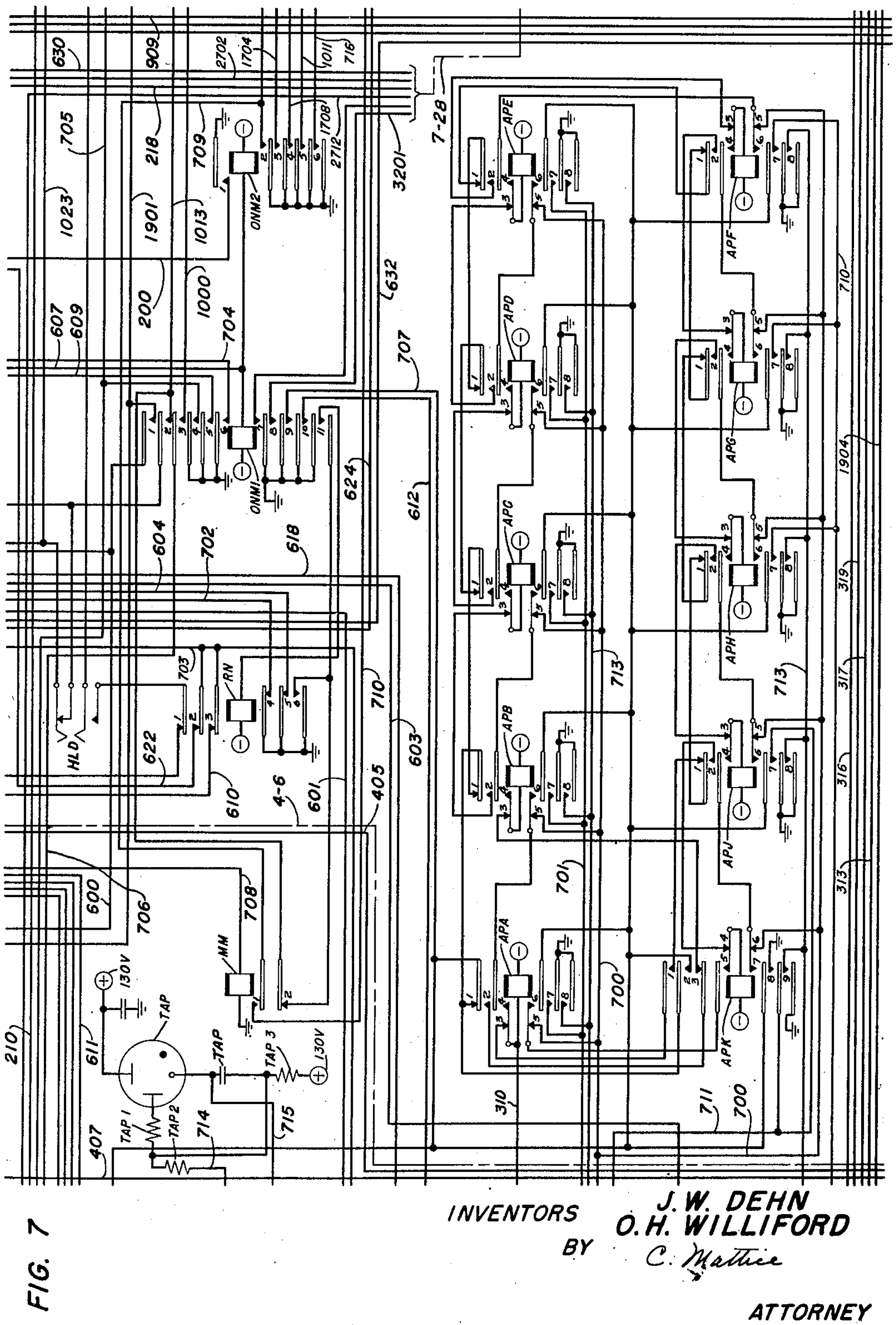
Figure 8:
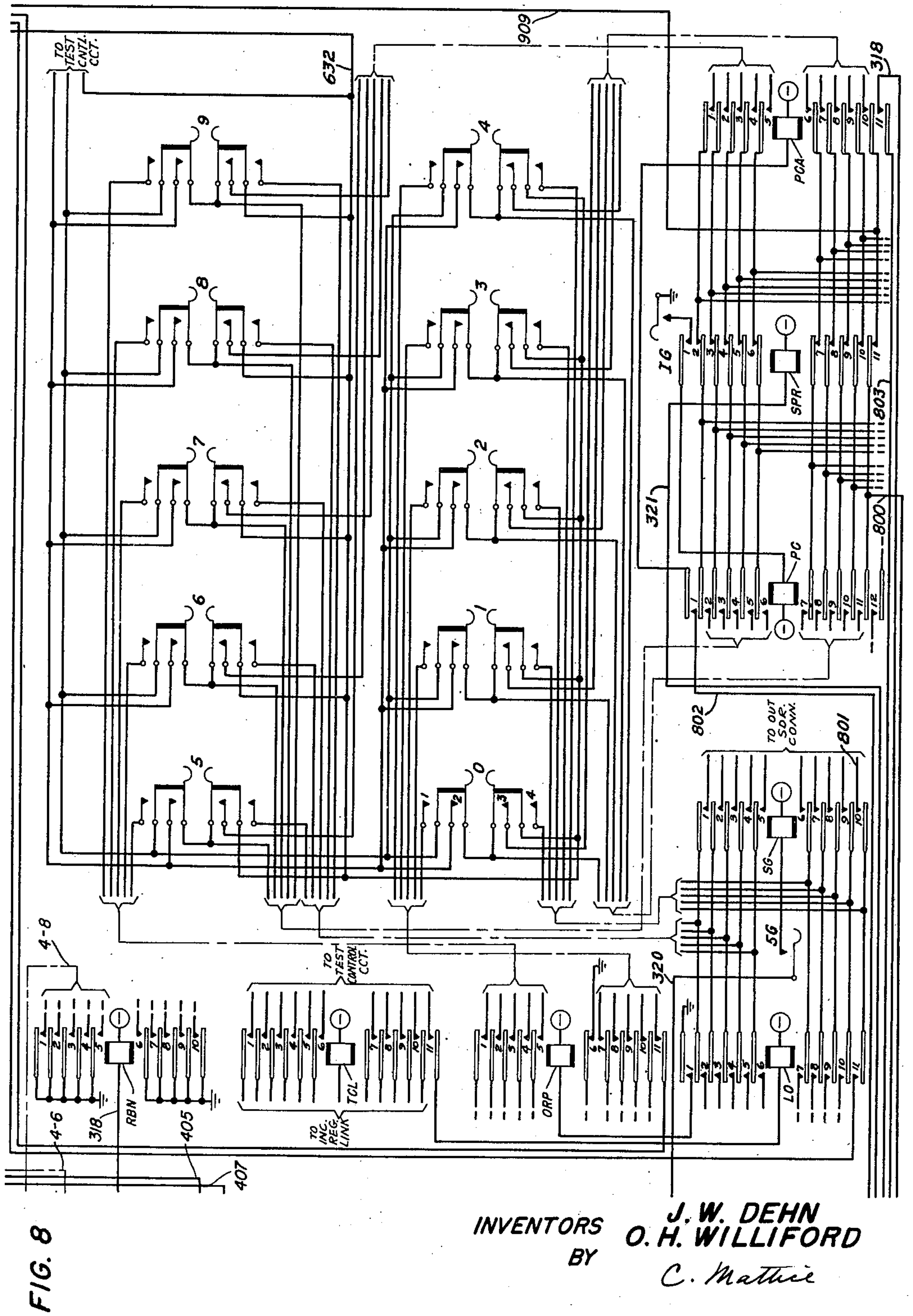
Figure 9:
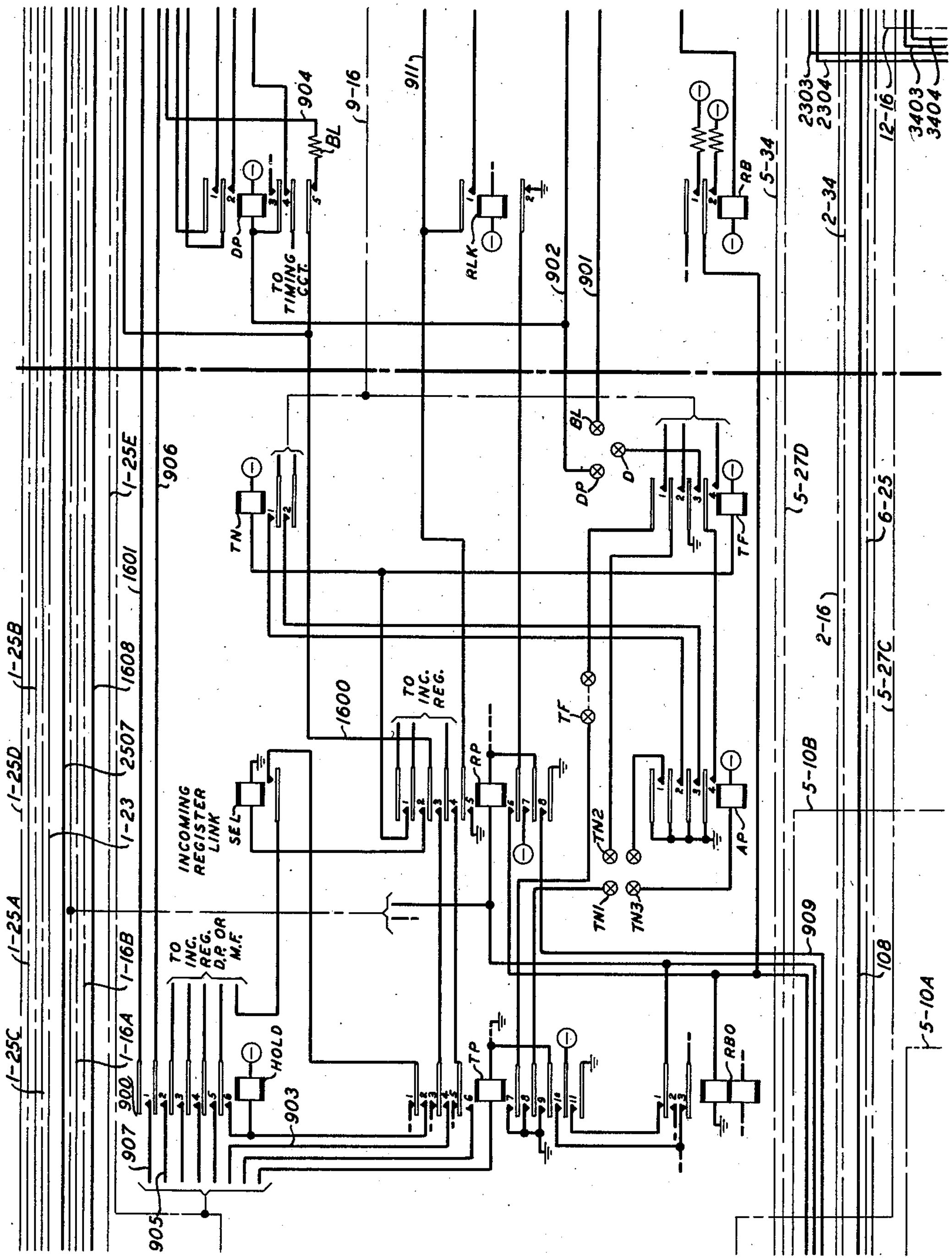
Figure 10:
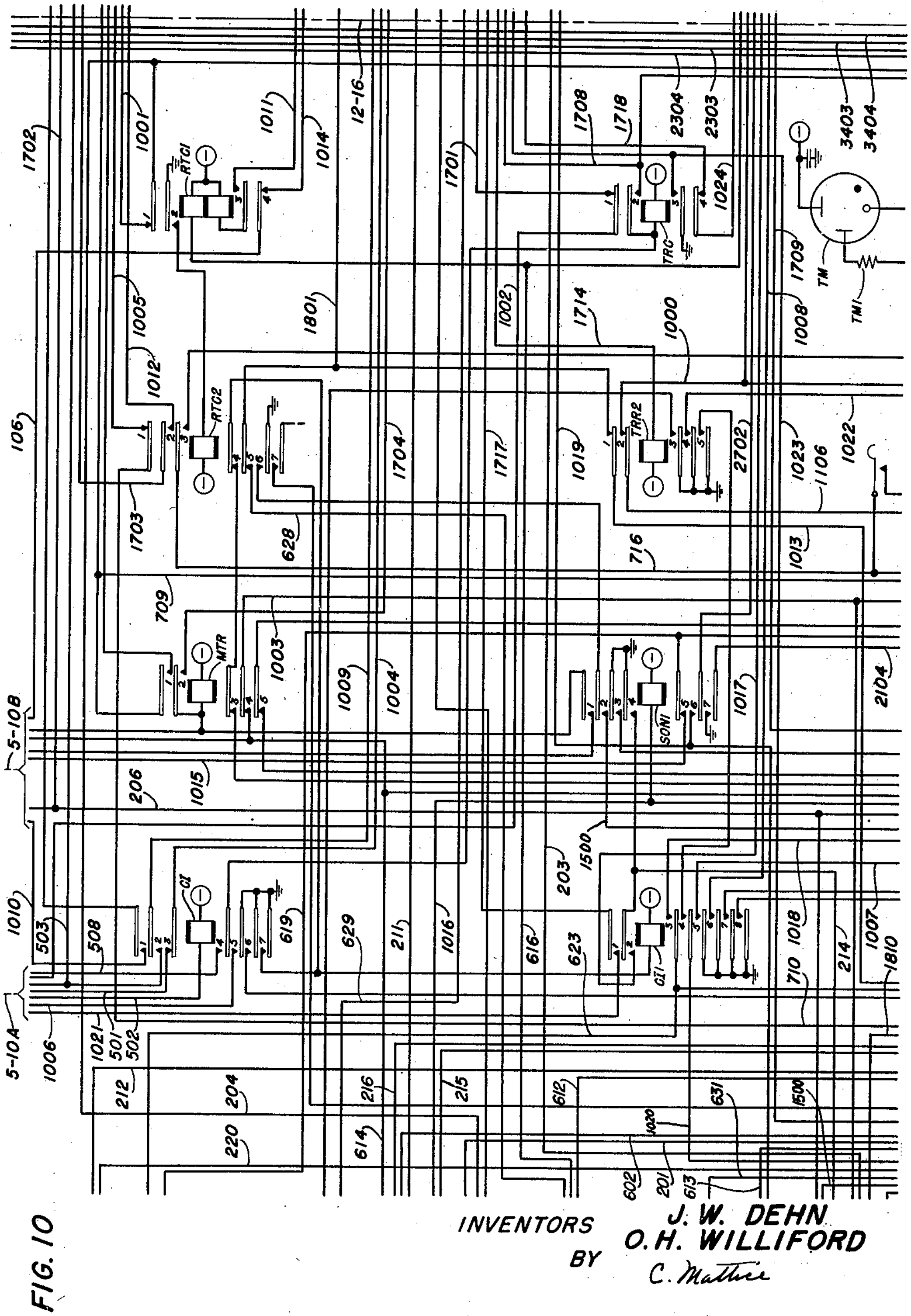
Figure 11:
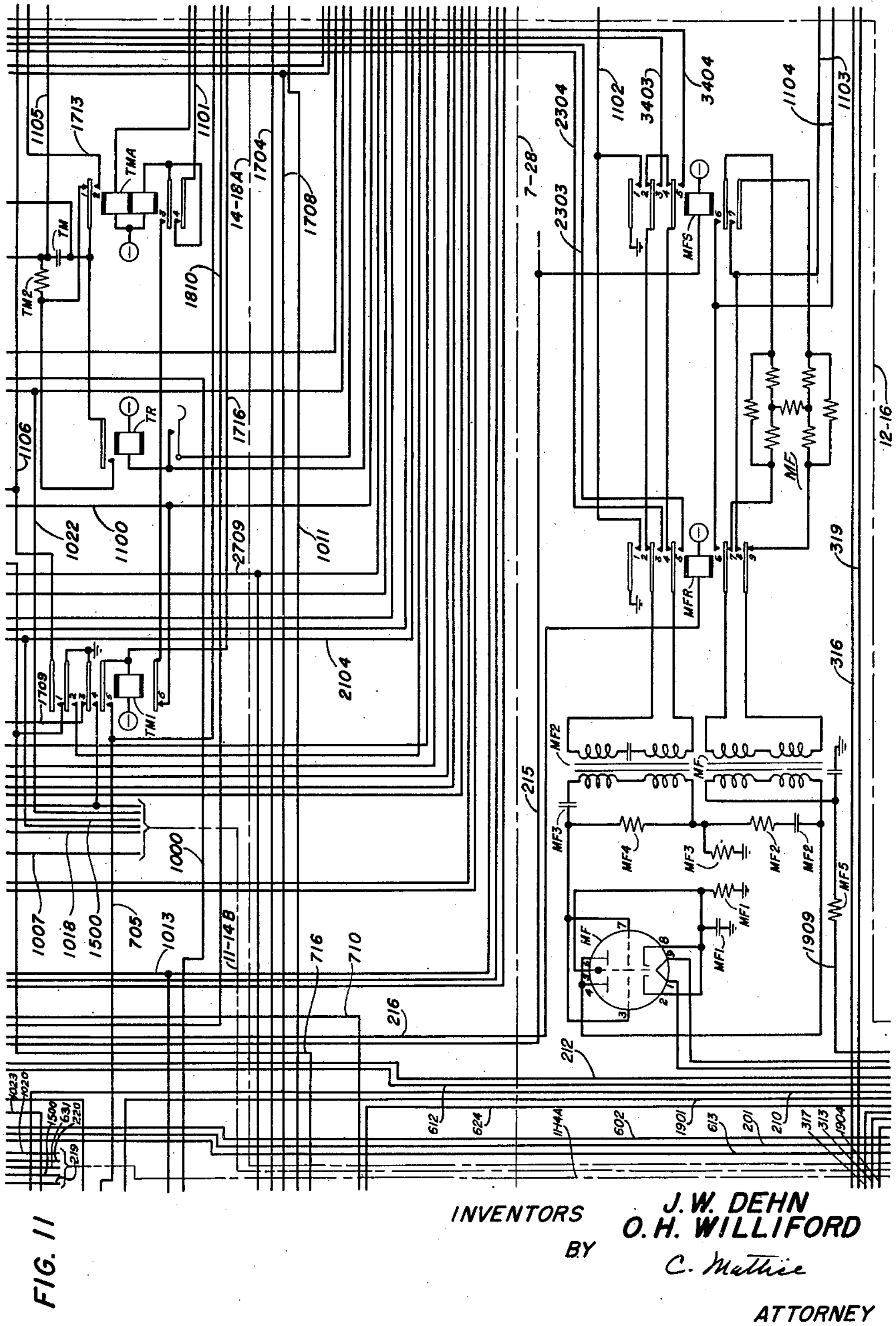
Figure 16:
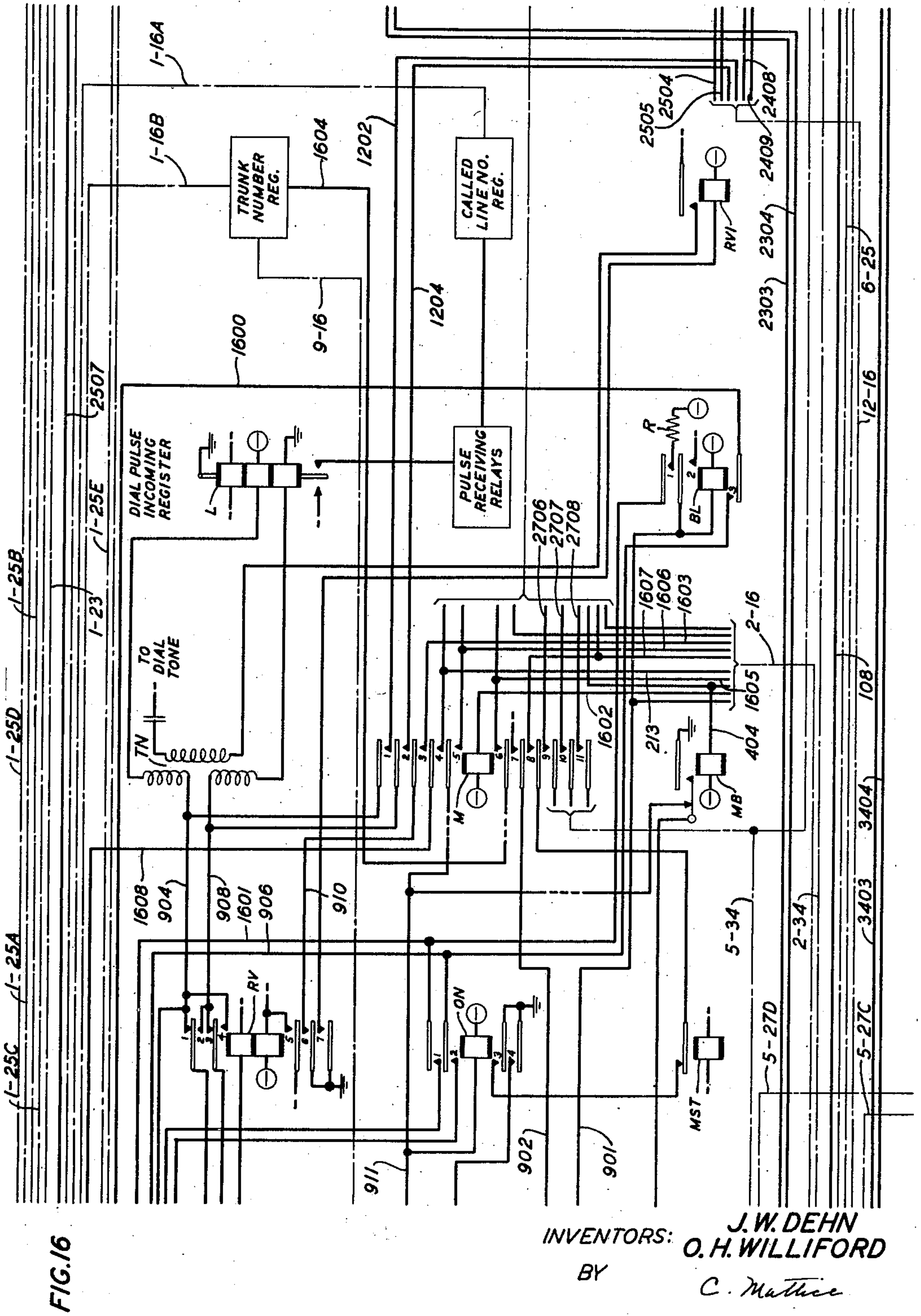
Figure 17:
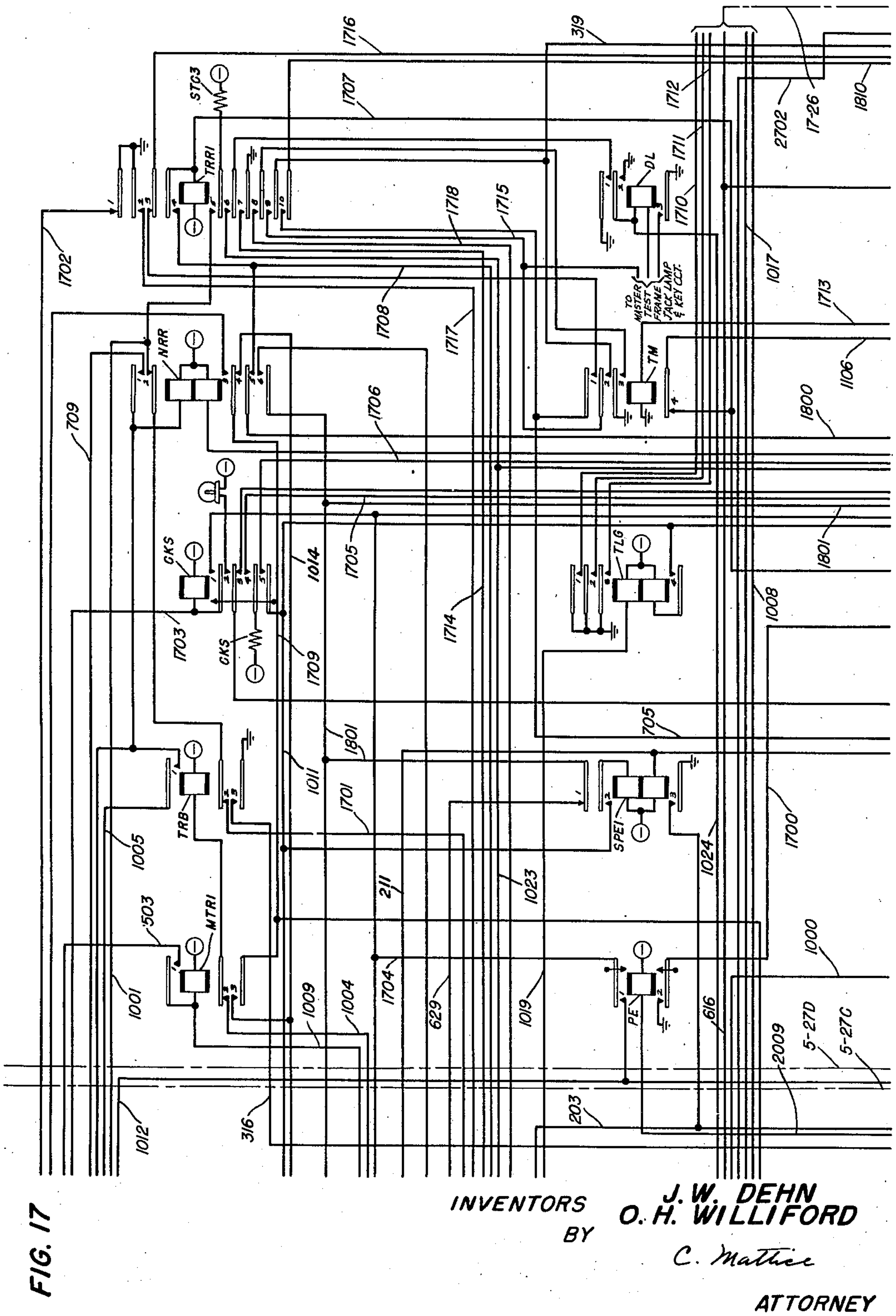
Figure 18:
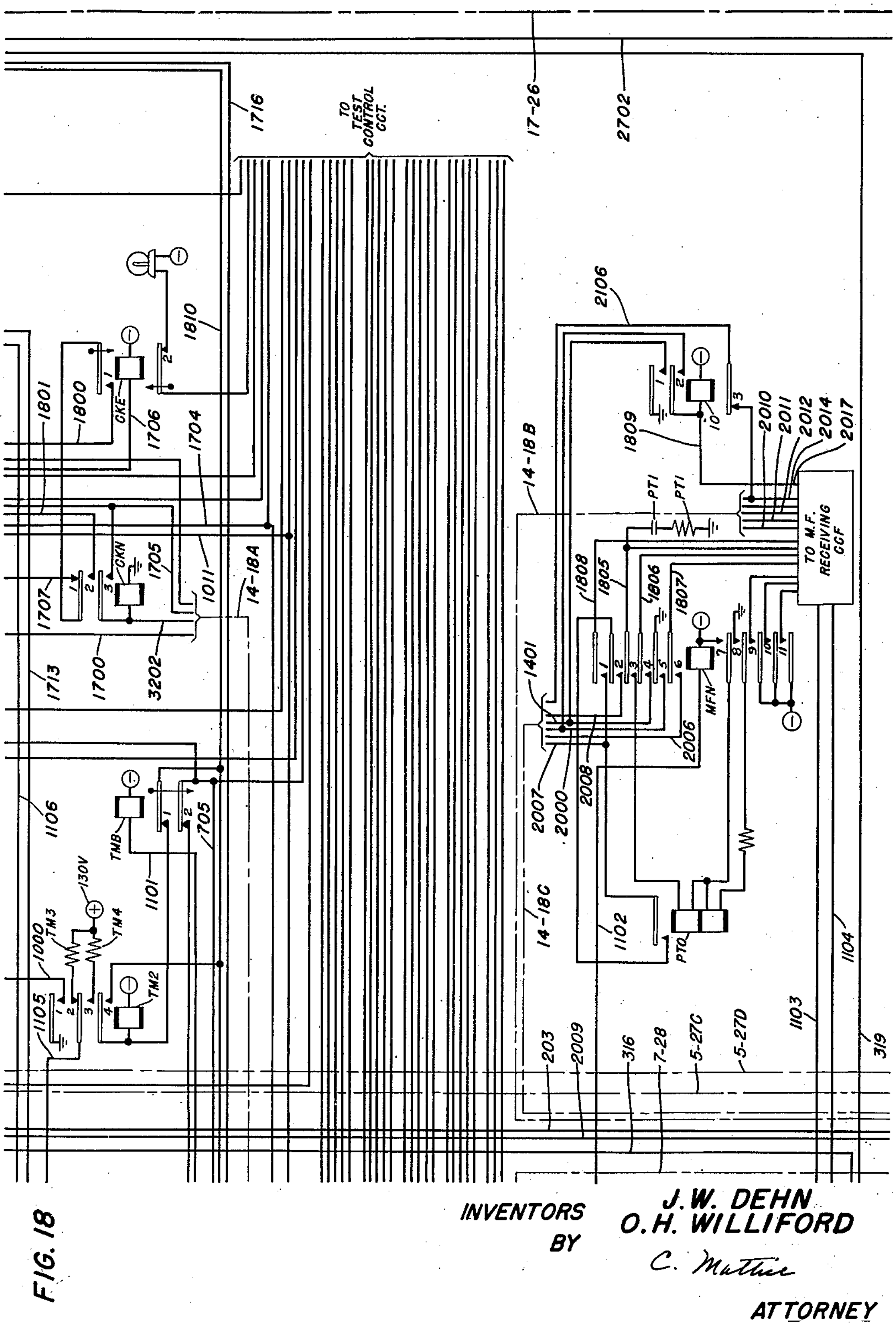
Figure 23:
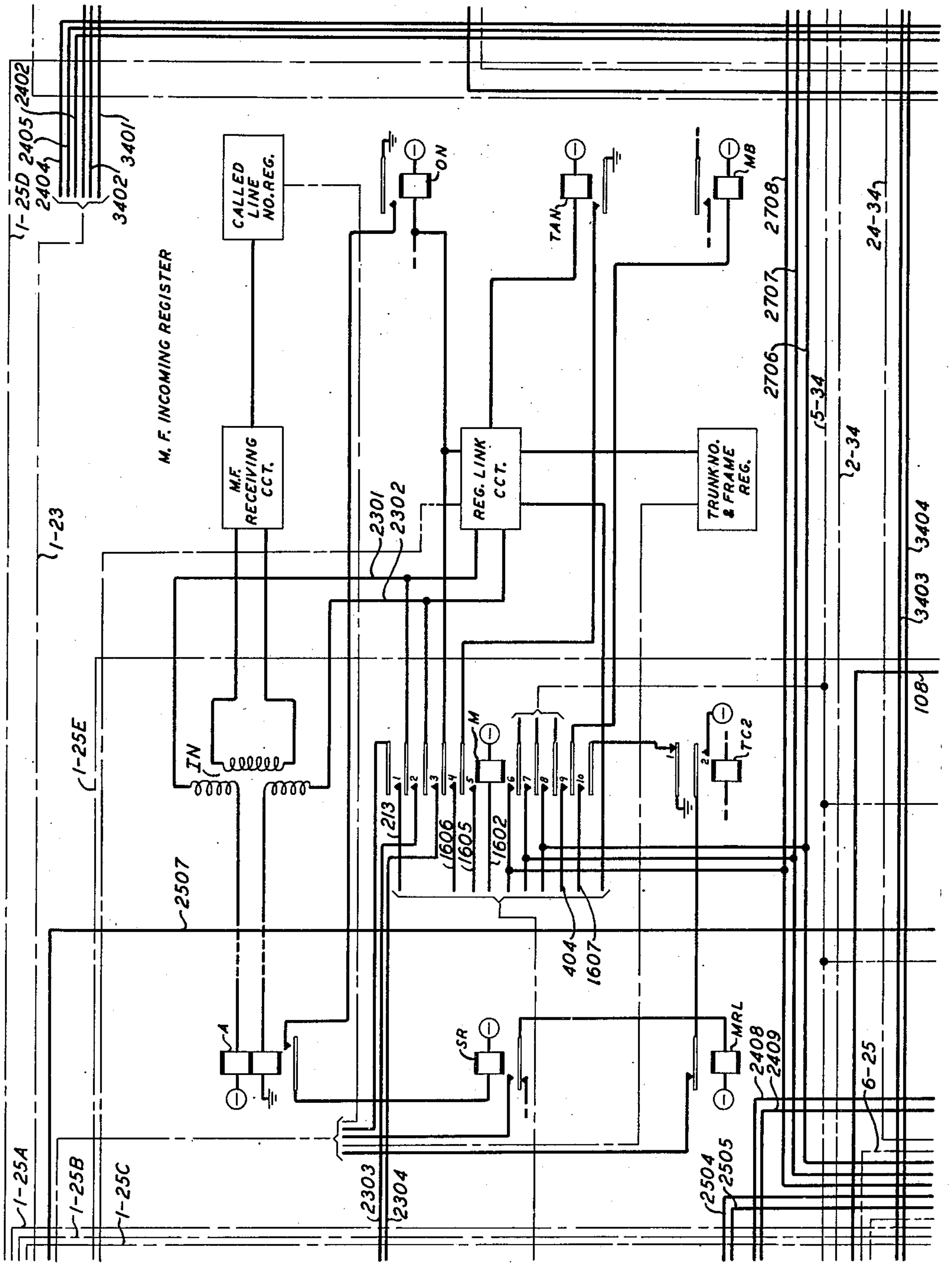
Figure 24:
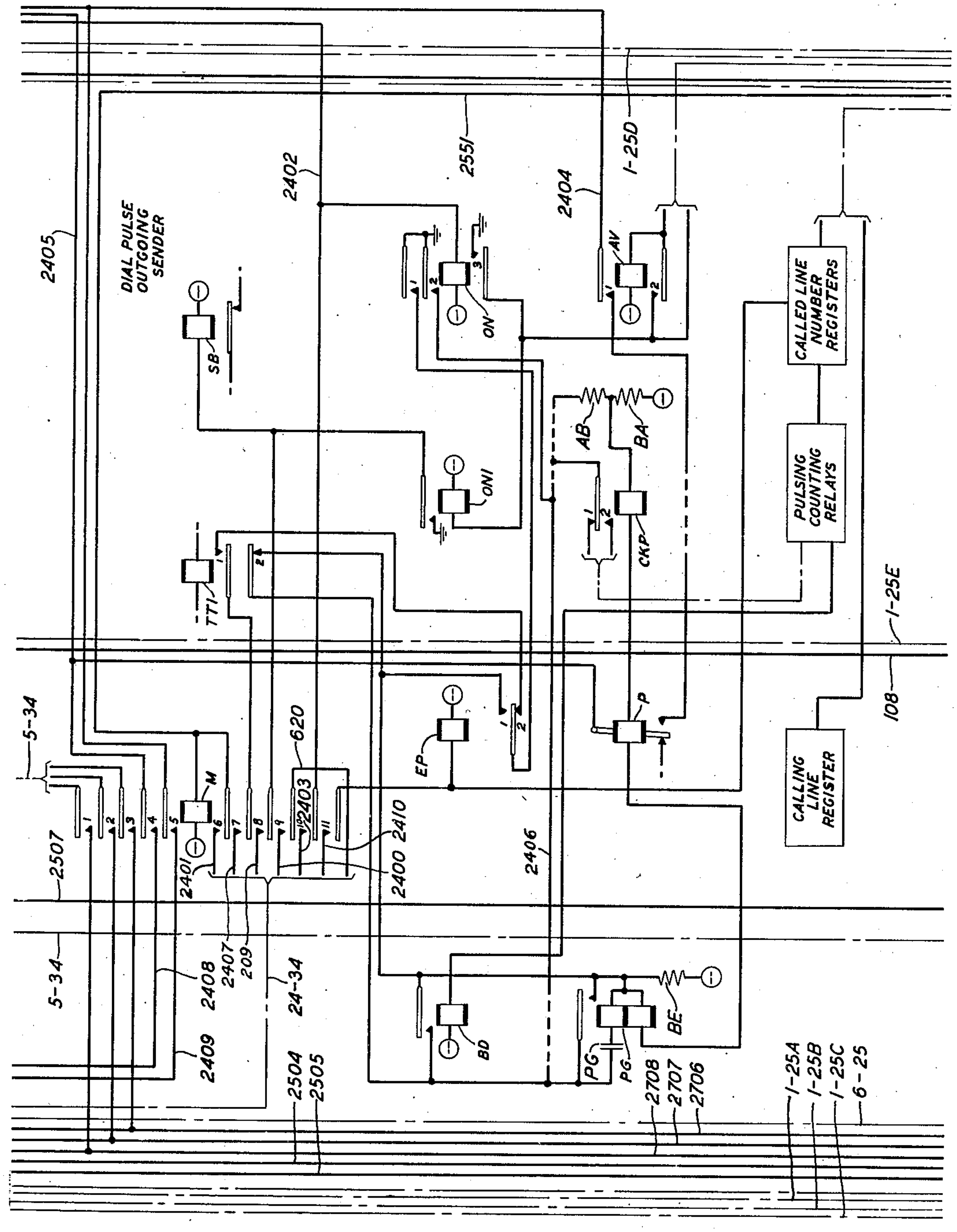
Figure 25:
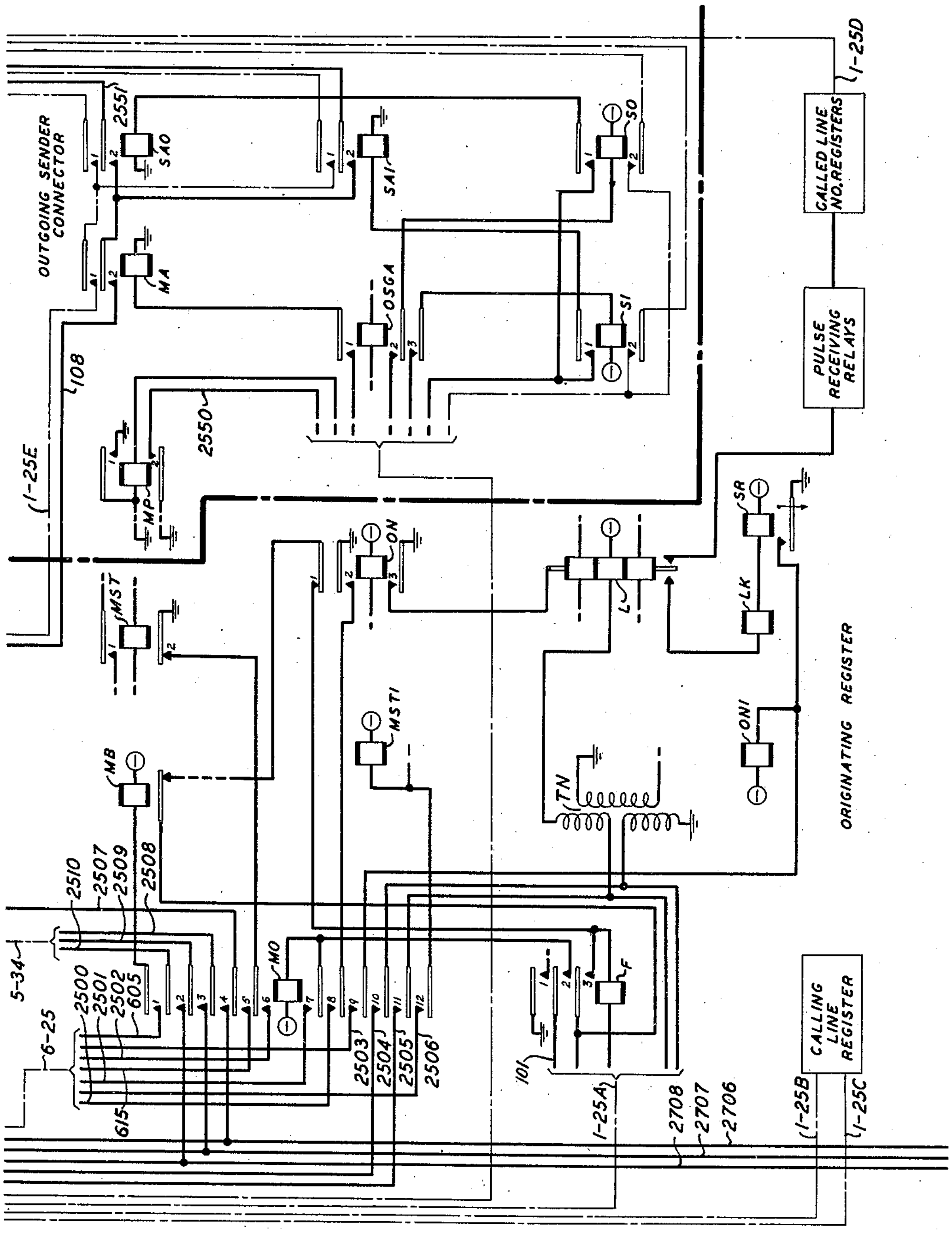
Figures 34, 35:
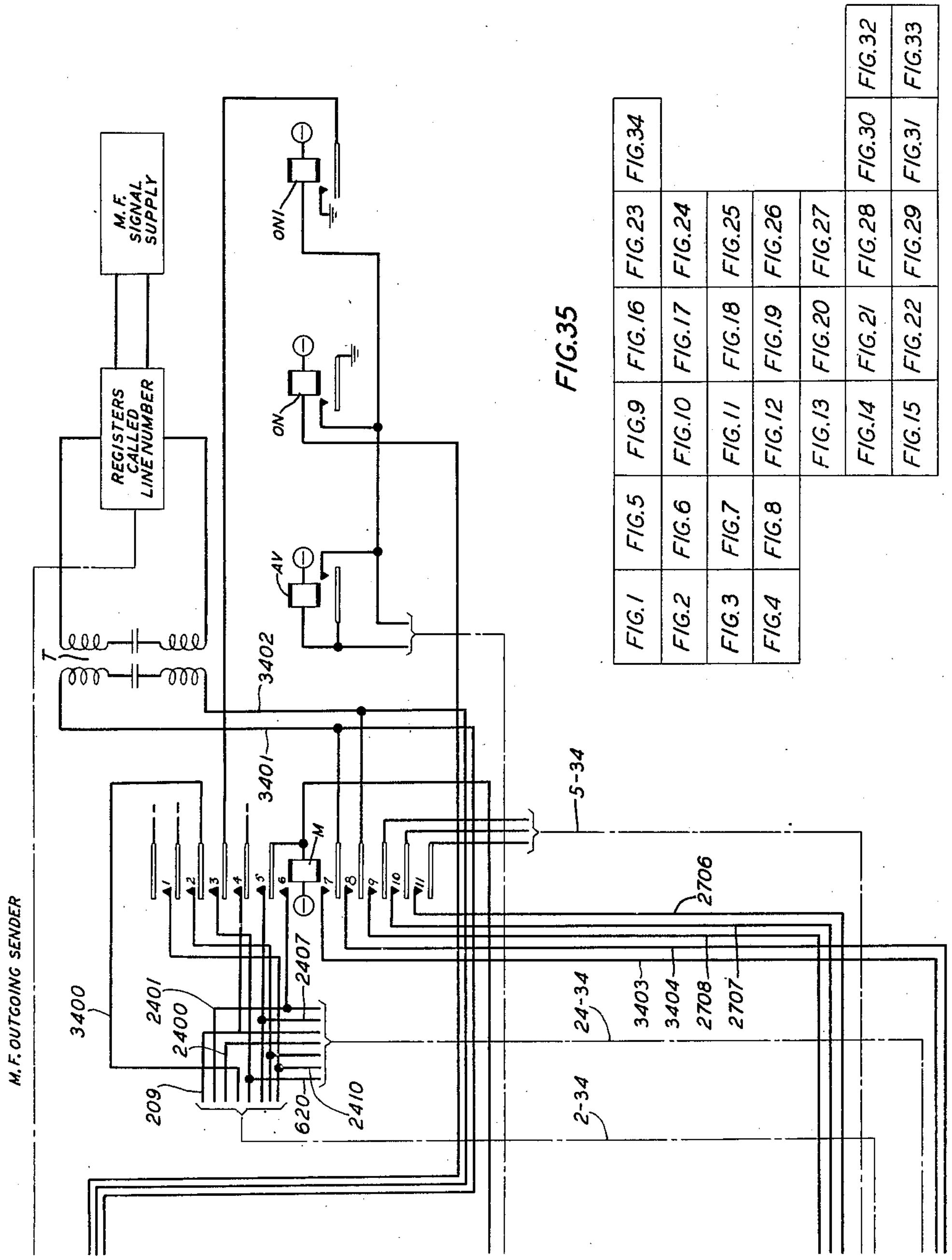

These and other features of the invention will be more apparent from a consideration of the following description in connection with the drawing in which:

Figs. 1, 5, 9, 16, 23, 24, 25 and 34 shown in schematic form, parts of the cross-bar telephone system with which the automatic monitor is adapted to function, Fig. 1 showing in diagrammatic form a line link frame and a trunk link frame, an originating register marker connector, an incoming register marker connector and a part of a marker;

Fig. 5 showing another part of marker and the master test frame connector;

Fig. 9 showing an incoming register link and part of a dial pulse incoming register;

Fig. 16 showing another part of the dial pulse incoming register;

Fig. 23 showing a multifrequency incoming register;

Fig. 24 showing a dial pulse outgoing sender;

Fig. 25 showing an originating register;

Fig. 34 showing a multifrequency outgoing sender;

Figs. 2 to 4, 6 to 8, 10 to 15, 17 to 22, and 26 to 33 show the automatic monitor in detail; and Fig. 35 is a diagram showing the manner in which Figs. 1 to 34 should be arranged.

In the drawing, conductors which pass through a number of sheets have been grouped into cables. In addition the multiplicity of conductors which connect the various registers have been represented by cables. In each case the cable is identified by the numbers of the figures in which they terminate connected by a hyphen. The various circuit elements such as relays, etc., are given a letter designation indicative of their function and since the same designation is required in different portions of the disclosure, they have been further distinguished by adding the figure number in parenthesis.

A general reference is made to the above-identified Busch application for a complete disclosure of the marker, the connectors and the originating register shown schematically in the present drawing and for typical disclosures of the incoming register and outgoing sender. Reference is also made to the copending application of O. H. Williford, Serial No. 57,391, filed October 29, 1948 for a more complete showing of the master test frame connector and trouble recorder.

To clarify the functions of the automatic monitor, a brief description of the operation of the telephone system with which it functions may be helpful. In such a system, when a subscriber originates a call, the line link frame, on which his line appears, is connected with an idle marker in which the calling line location is registered. The marker selects a trunk link frame having idle originating registers and an idle register, to which it is connected through the trunk link frame and then connects the calling line to the selected register over the line link frame and the trunk link frame, after which it is released. While connected with the originating register, the marker passes the calling line location to the register.

The subscriber dials the designation of the wanted line into the originating register after which the register seizes an idle marker through the originating register marker connector and passes to the marker both the calling line location and the called line number. The marker then selects either an intraoffice trunk or an outgoing trunk according to the location of the called line as derived from the number received, and connects the calling line to the trunk through the line link frame and trunk link frame.

If an outgoing call is set up, and an outgoing sender is required, the marker selects an idle outgoing sender capable of transmitting pulses of the proper type, connects with it through the outgoing sender connector and passes the called number through the sender connector to the sender. The marker also directs the connection of the sender to the selected trunk and releases. The sender then transmits the called number to the distant office.

An incoming call from a distant office causes the seizure of an incoming trunk which responds by connecting to an incoming register, capable of receiving pulses of the type generated at the distant office, through the incoming register link. The register receives the called line number from the distant office and receives a trunk link frame designation and in some cases a trunk number from the link. The register then seizes a marker through the incoming register marker connector and transfers the called line number, the frame designation and, if registered, the trunk number to the marker, which controls the connection of the incoming trunk with the called line through the trunk link frame and the line link frame and then releases.

*General description*

The automatic monitor serves to check the performance of the originating registers, incoming registers and outgoing senders of a cross bar office of the type disclosed in the above-identified application of A. J. Busch. It does this by automatically monitoring on service calls and by furnishing facilities with which the above circuits can be tested under control of a maintenance man. However, the test functions of the monitor have been omitted from the present disclosure. In monitoring, the station number transmitted to a register or sender is compared with the station number transmitted therefrom and if the two do not match a trouble record is made.

The monitor is arranged to monitor successively on originating registers, outgoing senders, and incoming registers. A ten step allotter circuit is provided which steps once per monitored call. A cross-connection from each step except the first determines what type of circuit will be monitored in that position. This permits the monitoring to be apportioned in relation to the number of each type of circuit in the office. However, the monitoring must start with originating registers and progress successively to outgoing senders and incoming registers and there must be at least one step for each type of circuit. An automatic advance of the allotter circuit is provided if no call is monitored for a period of one minute.

In addition to the general monitoring first described, monitoring can be confined to originating registers only, to outgoing senders only, or to incoming registers only. A further choice permits exclusive monitoring on a particular register or sender.

When the monitor is in a position to monitor on originating registers, a preference chain consisting of one relay per marker is made operative. At the time a marker establishes a dial tone connection it requests the use of the monitor on that call. The marker which is successful in selecting the monitor through the preference chain will connect the selected originating register to the monitor. The monitor then remains attached to that register during the period of register usage. A high impedance pulse amplifier of the monitor is connected across the incoming tip and ring to the register. During dialing the digits are recorded in the register and also independently in the monitor.

When all digits have been received, the register selects a marker and signals this fact to the monitor. In response to this signal the monitor selects the master test frame connector to gain access to the marker. A signal is also passed from the monitor through the register to the marker to inform it that it is a monitored call. In addition to performing other functions associated with monitoring, the marker cuts through a number of signaling leads between the monitor and marker. Over one of these leads the monitor operates several multicontact relays associated with that marker but located in the master test frame connector. These relays give the monitor access to the leads from register to marker which transmit the called number. Similar cut-in relays at the monitor end of the master test frame connector were operated when that circuit was selected by the monitor.

The number passed from the register to the marker is registered on relays in the monitor and after a sufficient registration interval the monitor releases the connection through the master test frame connector. The monitor then compares the number it recorded from the register input with the number passed from register to marker. If they are the same the monitor restores to normal and accepts the next call. If the numbers do not match the monitor again selects the master test frame connector, this time to gain access to the trouble recorder. A trouble record card is perforated, on which the more important items are the two numbers recorded by the monitor and the identification of the marker and of the register. Upon conclusion of the trouble record the monitor restores to normal.

To monitor on a particular register the marker preference chain is disabled and the master test control circuit used to seize a marker and direct it to the desired register. During this operation the register is connected to the monitor. The call is then abandoned restoring all circuits to normal but leaving the register connected to the monitor. All calls reaching that register are then monitored as previously described.

When the monitor is in a position to monitor on incoming registers a preference chain consisting of one relay per register is made operative. When a trunk selects a register the register requests the use of the monitor on that call. If the register successfully selects the monitor through the preference chain, the register will be connected to the monitor for the duration of register usage. The operation from this point on is the same as described for the originating register with the following exceptions. Information giving the location of the trunk involved in the call is recorded in the monitor and added to the trouble record information. A multifrequency receiver with a high impedance input is provided to monitor the input to multifrequency registers. To monitor on a particular register the operating paths of the preference relays of all other registers are opened.

When the monitor is in a position to monitor on outgoing senders the marker preference chain described under originating registers is made operative. In this case, however, the path to the preference relay is closed only when the marker starts to select an outgoing sender. When the marker selects the monitor through the preference chain, the marker is informed that it is a monitored call. The monitor then gains access to the marker through the master test frame connector as previously described.

The number passed from register to marker is then registered in the monitor. This is the number which is passed through the marker to the senders. At the same time information passed to the sender such as number of digits to delete and an arbitrary digit, if any, are recorded in the monitor. This latter information is used to modify the check path through the recorded digits to correspond to the digits to be outpulsed by the sender. When the marker first connects to the sender it connects the sender to the monitor, this latter connection remaining until the sender restores to normal.

During the time it is connected to the marker the monitor records the location of the trunk used on the call. When the marker has progressed to the point of connecting the trunk to the calling line, the monitor releases the connection through the master test frame connector to the marker, the marker releasing normally. The monitor then records the outpulsed number and upon a pulse-end signal from the sender compares the out pulsed member with that received from the marker. If they match the monitor release. If they do not match the monitor leaves a trouble record and then releases.

When monitoring on a particular sender the marker preference chain is not used. The sender is marked so that it tells the marker that it is a monitored call each time it is selected. The marker then selects the monitor directly and the call proceeds as previously described.

*Start of monitor*

To prepare the monitor for operation key MAC(19) is first operated. Key MAC(19) closes a circuit from battery through the winding of relay AC(19) to ground over the contact 2 of key MAC(19) operating relay AC(19), which closes the energizing circuit for the primary winding of transformer AC(19), thereby supplying current through the secondary windings of transformer AC(19) to the heating elements of various vacuum tubes the use of which will appear hereinafter, to full-wave rectifier tube R(19) and to full-wave dry rectifier V10(19). Relay NVA(19) which is connected to rectifier V10(19) operates as an indication that the automatic monitor is ready for operation. If relay NVA(19) fails to operate, or releases, following the operation of key MAC(19), lamp NVA(19) lights and battery connected over contact 2 of relay NVA(19), contact 1 of key MAC(19) and conductor 1900 to the alarm circuit causes a no-voltage alarm to sound.

With relay NVA(19) operated, the operation of the start monitor key STM(6) closes a circuit from ground over contact 1 of relay NVA(19), conductor 1901, contact 2 of key STM(6), conductor 600 to battery through the winding of relay STM(6). Relay STM(6) operates and closes a circuit from ground over its contact 6 and conductor 601 to battery through the winding of relay STM1(3) operating the latter relay. These two relays serve as off-normal relays for the monitoring operation, closing off-normal grounds where necessary and closing through leads from the senders, registers and markers to the monitoring control circuit. Relay STM1(3) at its contact 6 connects ground to conductor 313 to close an operating circuit for relay AON(19). Relay AON(19) at its contacts 10 and 11 closes a biasing circuit through the lower winding of relay P(19) to cause that relay to hold its contact open. At its contact 4, relay AON(19) closes a circuit from ground to conductor 1905 and through the middle winding of relay L(20), resistance L1(20), contact 3 of jack L(20) to battery to bias relay L(20) in a direction to close its contact 1.

With relay STM1(3) operated and none of the monitoring selection keys operated, a circuit is closed from ground over contact 4 of relay STM1(3), contact 3 of relay STM2(3), contact 3 of key ROR(3), contact 2 of key ROS(3), contact 3 of key RIR(3), contact 2 of relay IR(3) to battery through the winding of relay MBN(3). Relay MBN(3) connects ground to conductors 300 to 309 which extend through cable 3-4A to battery through the lower windings of the marker busy relays including relays MB0(4), MB5(4) and MB9(4), operating all of these relays. With all of the marker busy relays operated a chain circuit is closed from ground over contacts 3 of these relays to conductor 400, contact 1 of relay STM2(3), contact 2 of key OR(3), contact 2 of key OS(3), conductor 310 to the winding of relay APA(7) and battery. Relay APA(7) operates in this circuit locking over its contact 4, contact 5 of relay APB(7), conductor 700 to ground at contact 3 of relay STM1(3). Relay APA(7) closes a circuit from ground over its contact 7, conductor 701 to battery through the winding of relay OR(3). Relay OR(3) operates and closes a circuit from ground over its contact 3 to battery through the winding of relay STM2(3). Relay STM2(3) operates in this circuit, opening the circuit of relay MBN(3) which releases, opening the operating circuits for relays MB0(4) to MB9(4).

With relay OR(3) operated, ground is connected over contact 1 of relay IR(3) and contact 1 of relay OR(3) to conductor 311 which extends in multiple to all markers.

If any marker is serving a dial tone connection at this time, relays D(1), DT1(1), DT2(1) and DT3(1) will have been operated in that marker, under the control of the line link frame. With relay HMS1(1) operated to indicate that the marker has started to operate the hold magnets to set up the dial tone connection, ground on conductor 311 is extended over front contacts of relays DT3(1) and HMS1(1) to conductor 100 and the associated marker busy relay such as relay MB0(4) will be locked in a circuit from battery through its upper winding and over its contact 2 to ground on conductor 100 to prevent that marker from seizing the monitor at a point so late that the monitor may not be properly associated with the selected originating register.

Relay OR(3) at contact 4 connects ground over contact 1 of relay CMS(3) to conductor 312 to prepare for originating register monitoring. The circuit is now ready to monitor originating registers.

*Monitoring on originating registers*

Figure 2:
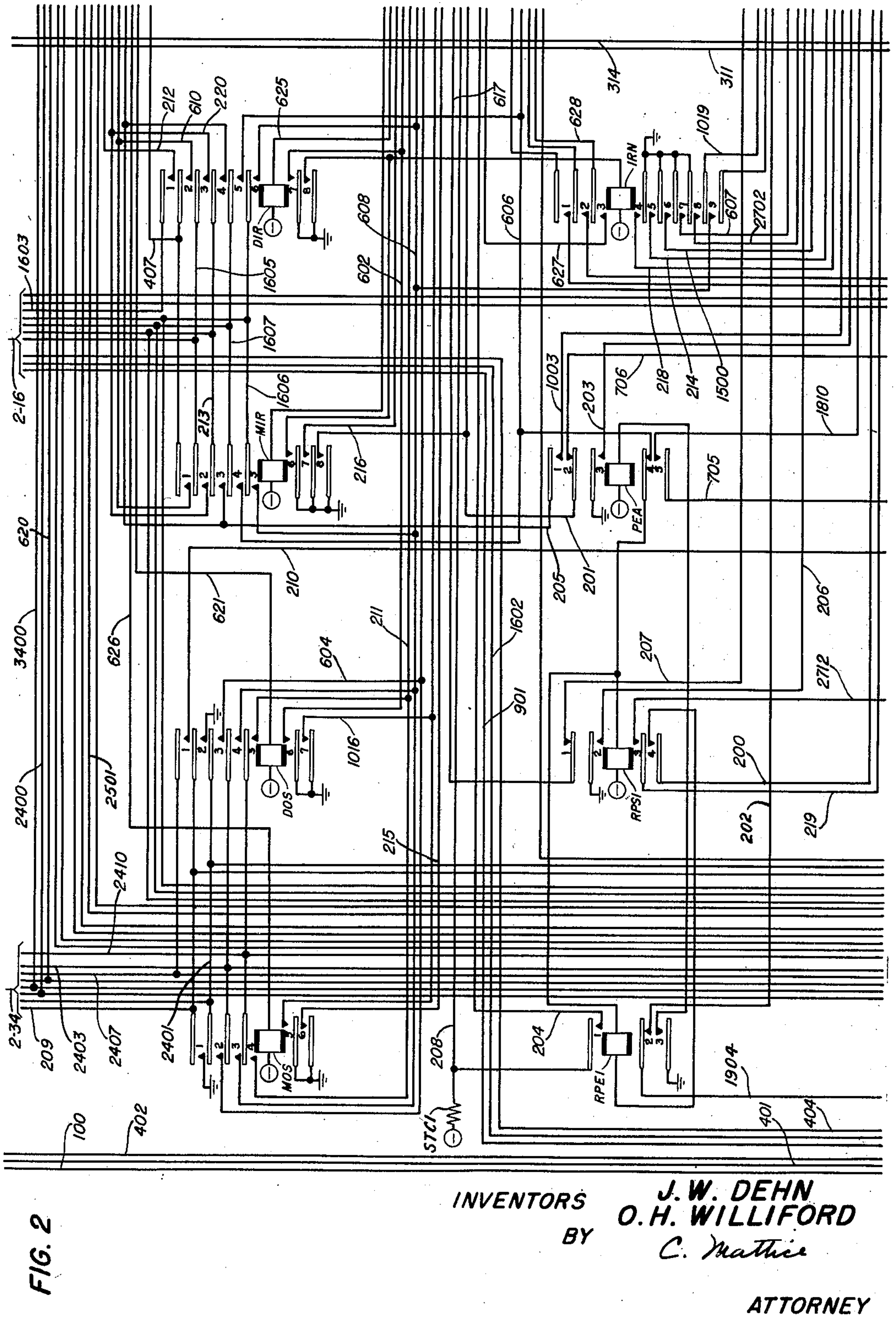
Figure 3:
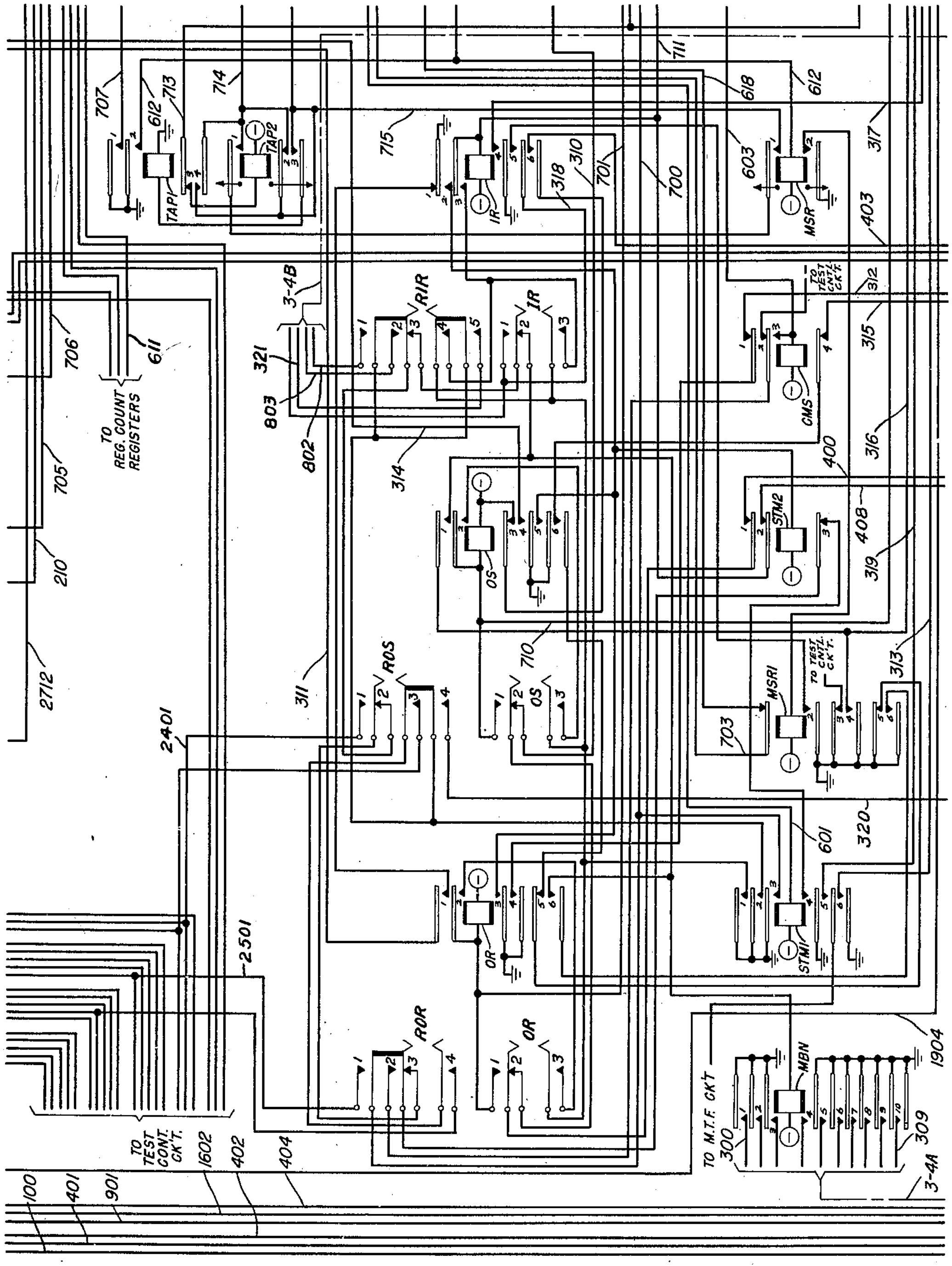
Figure 4:
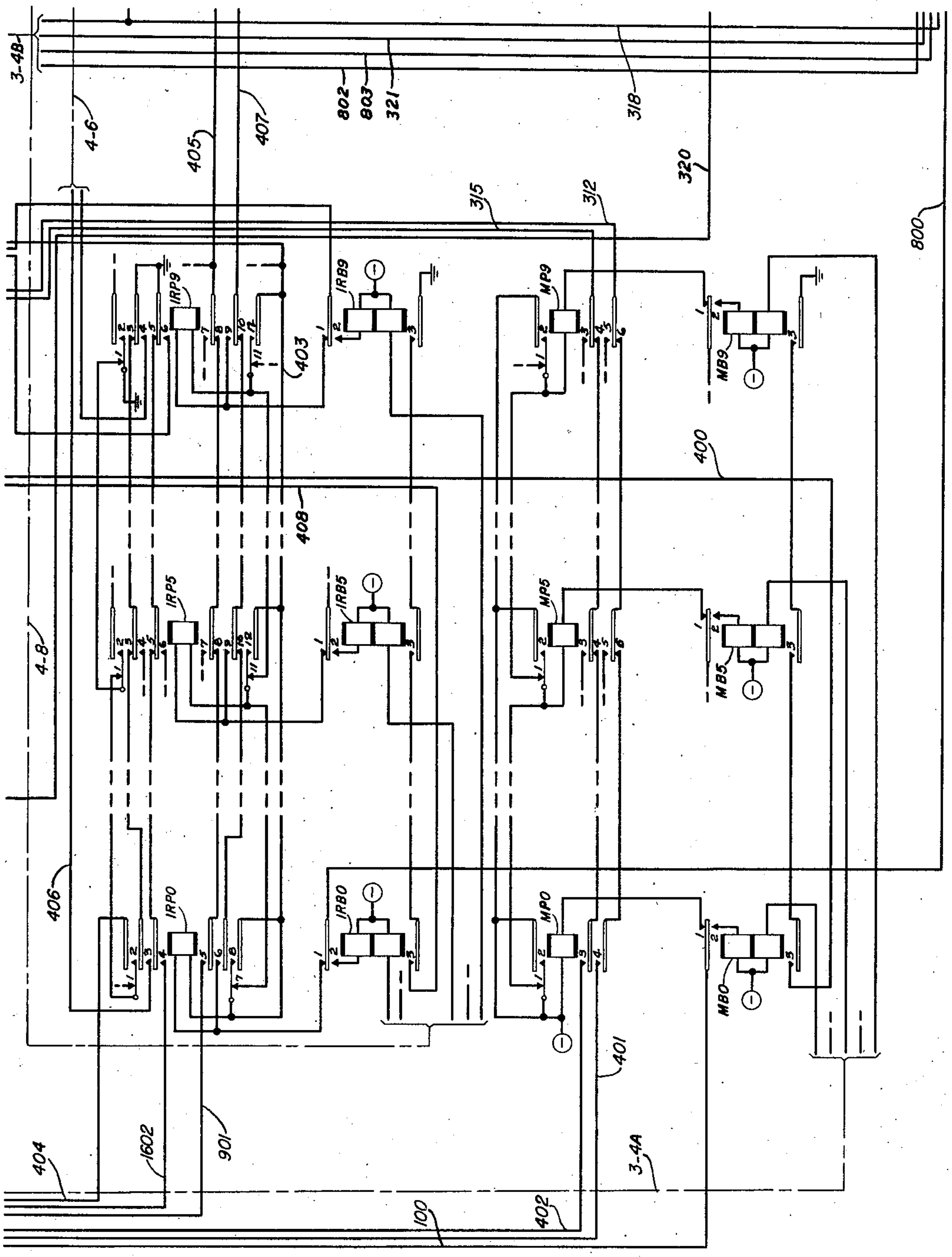

Assuming that the marker shown in Figs. 1 and 2 was not in use when the marker busy relays were operated as above described, but is now seized to handle a dial tone connection, as soon as relay HMS1(1) operates, conductor 100 is grounded as above described, and, with relay MB0(4) released, a circuit is completed over contact 1 of relay MB0(4) to battery through marker preference relay MP0(4), operating the latter relay. Relay MP0(4) operates, disconnecting battery, at its contact 1, from the other marker preference relays.

Relays MP0(4), MP5(4) and MP9(4) are parts of a chain circuit which permits only one marker at a time to gain access to the monitor. When an intermediate relay, such as relay MP5(4), operates, it locks directly to battery. Relays higher in the chain such as relay MP9(4) cannot operate because the battery supply has been opened. A relay lower in the chain such as relay MP0(4) can operate but performs no function since conductor 312 is disconnected from it at contact 6 of relay MP5(4). While a chain of ten marker preference relays has been indicated, the number of relays in the chain would correspond to the number of markers actually in use and might be more or less than ten.

Assuming that relay MP0(4) is operated alone, ground on conductor 312 is extended over contacts 6 of relays MP9(4), MP5(4) and the intermediate relays, contact 4 of relay MP0(4), conductor 401, to the associated marker, over contacts of the multicontact relays associated with the trunk link frame, by which the marker is connected with the selected originating register to conductor 101 which extends through cable 1-25A and over contact 2 of relay F(25), which is operated under the control of the marker when the originating register is seized, to battery through the winding of relay M0(25) in the selected originating register.

With relay ON(25) operated, which takes place shortly after the operation of relay F(25), the operation of relay M0(25) closes a circuit from ground at contact 2 of relay ON(25), contact 8 of relay M0(25), conductor 2500 through cable 6-25, contact 2 of relay STM(6) to battery through the upper winding of relay DOR(6). Relay DOR(6) operates in this circuit and closes a circuit from ground over its contact 10 to battery through the winding of relay ORN(6), operating the latter relay.

At its contact 11, relay DOR(6) connects ground to conductor 602, completing a circuit to battery through the winding of relay DON(20) operating the latter relay to prepare the dial pulse counting circuit for receiving pulses. At its contact 9, relay DOR(6) connects ground to conductor 603, completing a circuit to battery through the winding of relay CMS(3) to operate the latter relay and open the operating circuit for relay MON(1) in the marker.

At its contact 2, relay DOR(6) closes a locking circuit for the monitor relay M0(25) in the originating register which may be traced from battery through the winding of relay M0(25) and over contact 7 of relay M0(25), conductor 2501 through cable 6-25, contact 2 of relay DOR(6), conductor 604 to ground at contact 5 of relay RN(7).

Relay DOR(6) also closes a circuit from ground at contact 4 of relay RN(7), conductor 702, contact 7 of relay DOR(6), conductor 605 through cable 6-25, contact 1 of relay M0(25) to battery through the winding of relay MB(25) operating relay MB(25) to hold the circuit of relay F(25) open and prevent the reseizure of the originating register at the end of the call until the monitor has checked the number and made a trouble record, if necessary.

Relay ORN(6) when operated connects ground over its contact 8 and conductor 607 to battery through the windings of relays ONM1(7) and ONM2(7) which operate to provide a plurality of off-normal grounds for the monitor. Relay ONM1(7) at contact 10 closes a circuit from ground over conductor 612 to battery through the winding of relay MSR(3), operating the latter relay. Relay MSR(3) closes an obvious operating circuit for relay MSR1(3). Relay MSR1(3) closes a circuit from ground over its contact 6, contact 6 of relay OR(3), to battery through the winding of relay MBN(3). Relay MBN(3) operates, again operating all of the marker busy relays MB0(4) to MB9(4), releasing relay MP0(4) and preventing the operation of any other marker preference relay. In addition relay ORN(6) closes a circuit from ground over its contact 6, conductor 631 through cable 11-14A to battery through the winding of relay ORM1(14).

Ground is also connected over a back contact of relay MST(25) in the originating register, contact 6 of relay M0(25), conductor 2502 through cable 6-25, contact 4 of relay DOR(6), conductor 606, contact 4 of relay PEA(2) to battery through the winding of relay RPS1(2). Relay RPS1(2) operates and closes a locking circuit for itself through the winding of relay RPE1(2), contact 4 of relay RPS1(2), conductor 200 to ground at contact 1 of relay ONM2(7), but relay RPE1(2) cannot operate in this circuit, being shunted by the operating circuit for relay RPS1(2). Relay RPS1(2) opens the operating circuit for relay SON(6) to prevent the latter relay from operating if the call requires the use of an outgoing sender.

Relay DON(20), when operated as above described, closes a circuit from ground over its contact 5, conductor 2000 through cable 14-20A to battery through the winding of relay ONR(15) which supplies locking ground for the various register relays.

With relays ORN(6) and relay ONR(15) operated, a circuit is closed from battery through the windings of relays AS(21) and ASA(21) in parallel, over contact 4 of relay AS(21), conductor 2100, contacts 2 of relays DL6(30) and DL5(30), conductor 3000, contacts 2 of relays DL4(28), DL3(28) and DL2(28), conductor 2800, contacts 2 of relays DL1(21) and DCR(21), conductor 2101, contact 5 of relay CL1(14), back contact of relay MK(14), conductor 1400, contact 1 of relay ONR(15), conductor 1500 through cable 11-14A to ground at contact 7 of relay ORN(6). Relays AS(21) and ASA(21) operate in this circuit, relay AS(21) closing a locking circuit for itself and relay ASA(21) over its contact 5, conductor 2102, contact 5 of relay BS(28), conductor 2801 to ground at contact 4 of relay ONR(15). The operating ground for relays AS(21) and ASA(21) also extends from conductor 1400 to battery through the winding of relay MK(14). Relay MK(14) is slow to operate and therefore does not open its back contact to open the operating circuit for relays AS(21) and ASA(21) until after the latter relays have been locked. Relays AS(21) and ASA(21) prepare the steering circuits for the first digit.

The marker receives the calling line identification and transfers it to the originating register, sets up a connection between the calling line and the originating register and releases as described in the above-identified Busch application, thereby releasing relay F(25) in the originating register.

When the calling line is connected with the register, dial tone is transmitted to the line and line relay L(25) operates over the calling line, in turn operating relays LA(25) and SR(25), relay SR(25) in turn operating relay ON1(25). The operating ground for relay ON1(25) is extended over contact 9 of relay M0(25), conductor 2503 through cable 6-25, contact 5 of relay DOR(6), conductor 608, to battery through the winding of relay MAC1(6). Relay MAC1(6) operates and closes a circuit from battery through the winding of relay MAC2(6), contact 3 of relay MAC1(6), conductor 609 to ground at contact 5 of relay ONM1(7). Relay MAC2(6) operates and locks over its contact 2 to ground on conductor 609 preparing a circuit, which may be closed in response to a subsequent release of relay MAC1(6) to indicate to the monitor that the call has been abandoned.

Relay MAC2(6) closes a locking circuit for relay DOR(6) which may be traced from battery through the lower winding and over contact 6 of relay DOR(6), contact 1 of relay MAC2(6), conductor 610, contact 3 of relay RN(7), conductor 703 to ground at contact 7 of relay STM(6). The closure of this locking circuit is delayed until this time so that the monitor will not lock up until it is prepared to recognize an abandoned call.

When relay ONM1(7) operated as above described it connected ground to conductor 704, completing a circuit over the contact 2 of relay MPC1(6) to battery through the winding of relay MPC2(6). Relay MPC(6) operates and closes a circuit from battery through the winding of relay MPC1(6) over contact 3 of relay MPC2(6) to ground on conductor 704. Relay MPC1(6) operates and locks over its contact 1 to conductor 704, opening the circuit of relay MPC2(6). Relay MPC2(6) is slow to release and during its releasing time connects ground over its contact 1, contact 3 of relay ORN(6) to conductor 611 to operate a peg count meter indicating a monitoring operation on an originating register.

In addition relay ONM1(7) connects ground over its contact 4 to conductor 705, completing a circuit over contact 2 of relay TMB(18) to battery through the upper winding of relay TMA(11). Relay TMA(11) operates in this circuit and locks in a circuit from battery through its lower winding and over its contact 3, contact 6 of relay TM1(11), conductor 1100, contact 2 of relay TRR2(10), conductor 1000, contact 3 of relay OMN1(7), conductor 706, contact 2 of relay PEA(2), conductor 201, contact 7 of relay DON(20) to ground at contact 5 of relay PST(20). Relay TMA(11) extends this locking ground over its contact 4 and conductor 1101 to battery through the winding of relay TMB(18), operating the latter relay to open the operating circuit of relay TMA(11). Relay TMA(11) initiates a timing operation which will be described hereinafter.

Relay ONM1(7) also connects ground over its contact 9, conductor 707, contact 2, of relay APA(7), contact 3 of relay APK(7), contact 3 of relay APB(7) to battery through the winding of relay APB(7). Relay APB(7) operates in this circuit and locks over its contact 4 and contact 5 of relay APC(7) to ground on conductor 700. At its contacts 5 and 6, relay APB(7) transfers the locking circuit of relay APA(7) from conductor 700, which is grounded by the monitor start relay STM1(3) to conductor 707. Relays APA(7) to APK(7) constitute an allotter circuit for determining the number of monitoring operations to be made on each type of circuit and will be described in more detail hereinafter.

When relay MAC1(6) operates as above described it closes a circuit from ground over contact 8 of relay DOR(6), contact 1 of relay MAC1(6), conductor 612, to battery through the winding of relay ORM(12). Relay ORM(12) connects the pulsing circuit of the originating register to the dial pulse amplifier. The operation of relay ORM(12) is made dependent on the operation of relay L(25) in the originating register to ensure the establishment of the register pulsing circuit before the dial pulse amplifier is connected to it.

The tip conductor of the calling line, which is connected to ground through the lower left winding of tone coil TN(25) in the originating register extends over contact 10 of relay MO(25), and conductor 2504 through cable 12-16 to resistance B7(19) and condenser B5(19) associated with tube B2(19). The ring conductor which is connected to battery through the line winding of pulsing relay L(25) in the originating register is extended over contact 11 of relay MO(25), conductor 2505 through cable 12-16, over contact 3 of relay ORM(12) to conductor 1200 which is connected to the input of tube PA(12).

Figure 12:
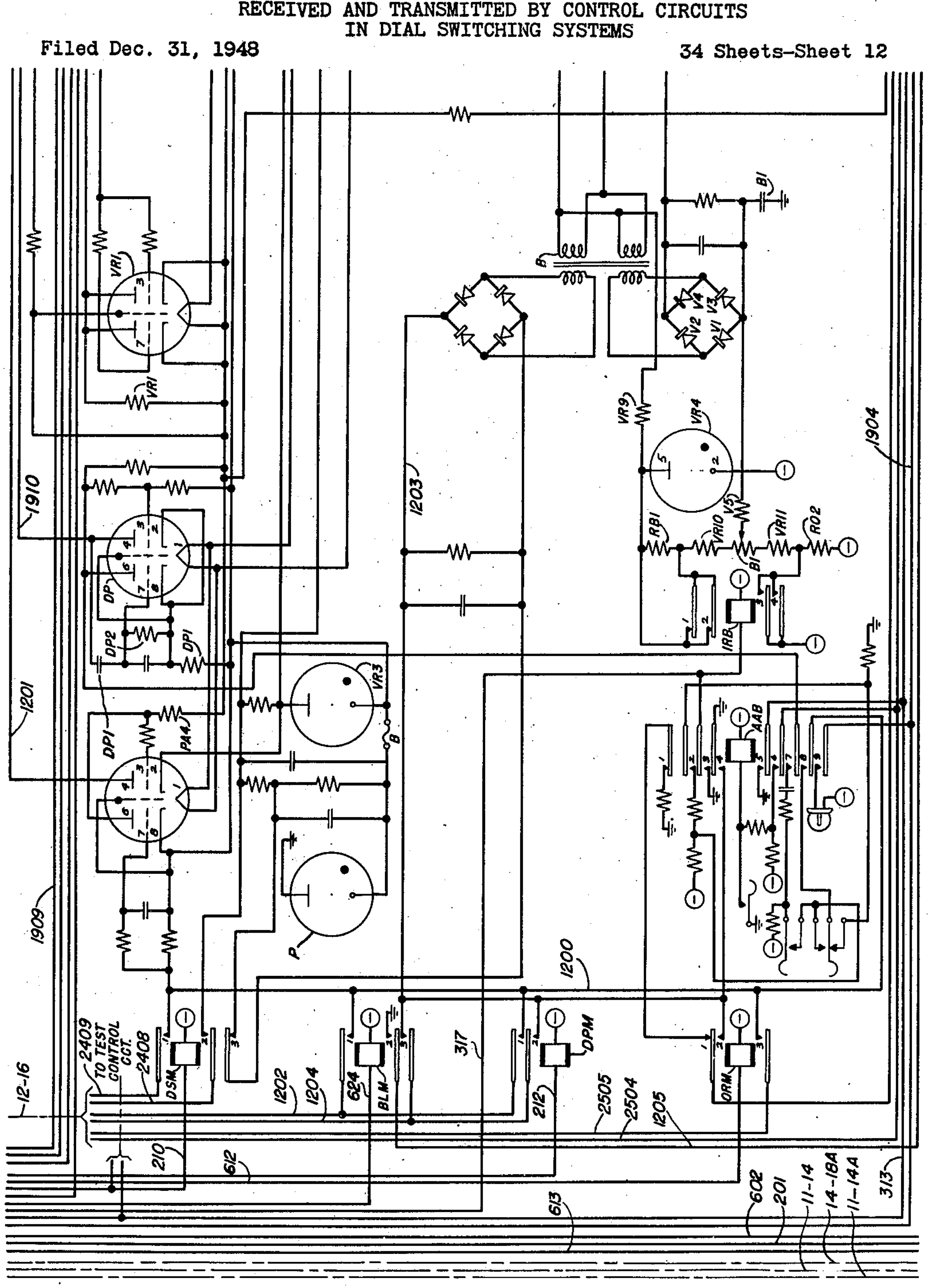
Figure 19:
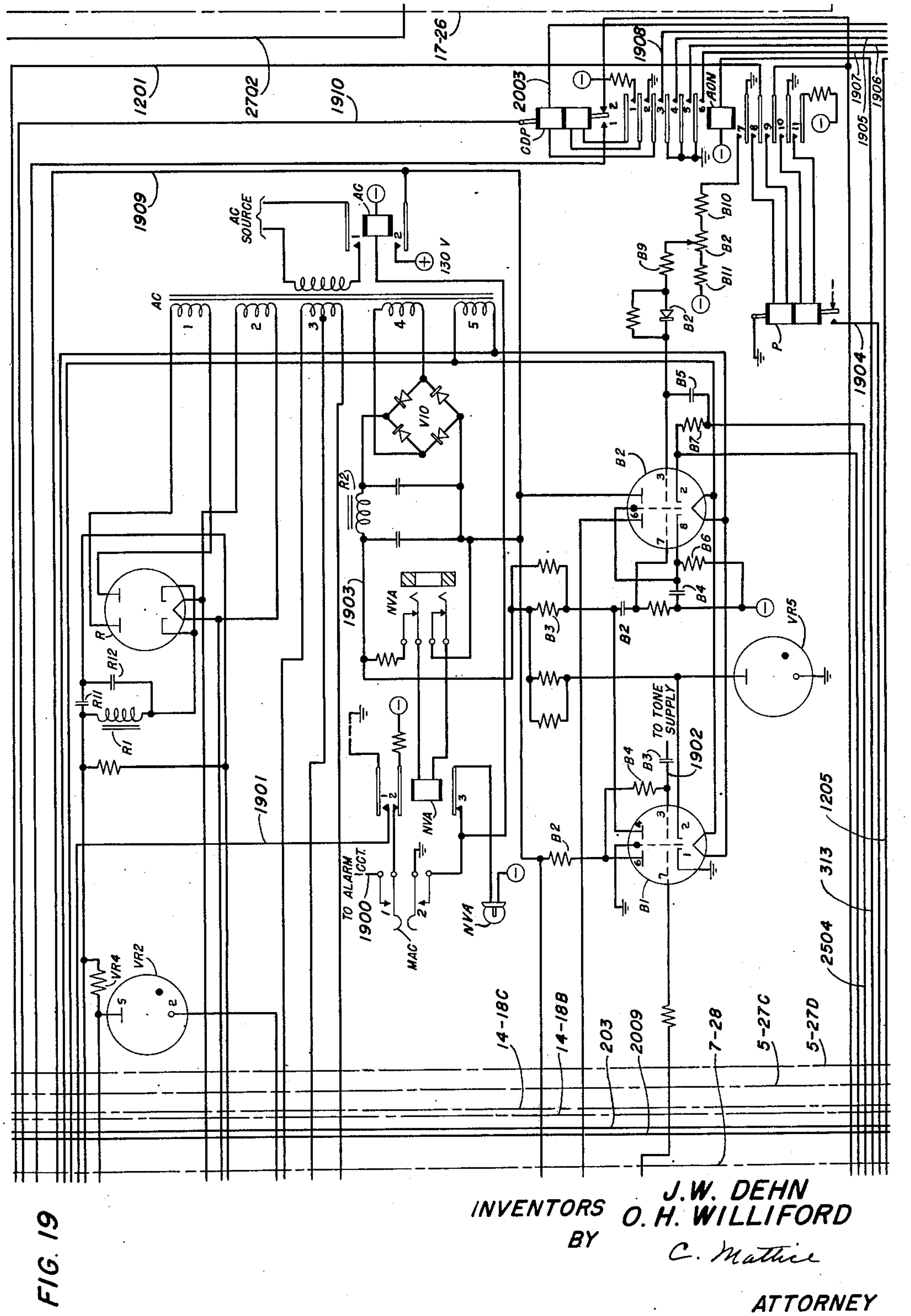

The dial pulse amplifier of Figs. 12 and 19 is used to repeat pulses incoming to the originating register. This circuit in conjunction with relay L(20) performs the same functions as the pulsing relay in the register circuit. In order that these functions be performed with a minimum of interference to the pulsing relays in the service circuits the connection is made to them by means of a high impedance circuit. Insufficient power is obtained through the high impedance connection for operating a relay directly, hence an amplifier is used to transform voltage changes, occuring across selected portions of the service circuit during pulsing, into changes in power of sufficient magnitude to operate a pulse repeating relay.

During pulsing into the register, current flows through a winding on relay L(25) and two windings on the tone coil TN(25) when the dial contact is closed and approaches zero when the dial contact is open. The voltage across the tip and ring therefore varies from a value approximately that of the office battery, which is connected to the ring conductor through relay L(25) and the tone coil windings to a value less than the office battery voltage by the amount of the voltage drop in the windings of that relay and tone coil. In order to operate on the change in voltage across the tip and ring obtained during pulsing, a counter voltage or bias voltage must be provided in the circuit connecting the amplifier to the register to offset the office battery potential and also to provide a positive bias for the amplifier tube. This voltage cannot be obtained directly from the office battery since the amplifier is ungrounded except for the connection through the tone coil winding in the tip side of the line. A fixed voltage cannot be used since the office battery voltage may vary over wide limits. Means is therefore provided for supplying an ungrounded biasing voltage with the magnitude controlled by the potential of the office battery.

Means is also provided for altering the bias voltage when monitoring on originating registers in accordance with the resistance of the connected dialing circuit. The control for this bias adjustment is obtained from the voltage drop obtaining across the tip tone coil winding. This change in bias is made to assist in eliminating double pulsing from oscillations set up when pulsing under certain line conditions.

To prevent recording as a ligitimate pulse a surge occurring due to switching conditions in P. B. X's and D. S. A. boards a blocking circuit is provided. Pulses shorter than a timed value are rejected. This and the pulse corrector relay L(20) also guard against false operations due to chattering dial contacts.

Relays L(20) and RAA(20) are condenser timed to assure obtaining a closure of adequate length for operating the register and to assure holding on very slow pulsing.

Two ungrounded sources of direct current power, in addition to alternating current for the heaters of the vacuum tubes, are required for the circuits mentioned above. An ungrounded source of direct current power is required owing to the operation of the amplifier circuit at a potential above ground determined by the conditions in the monitored circuit. The second ungrounded direct current supply supplements the 130-volt office battery potential. The amplifier is sensitive to small changes in direct current voltage, hence it is necessary to regulate the rectified alternating current supplied to it which may vary from the nominal value by + or −10 per cent. A connection is made from the alternating current supply to the transformer tap corresponding to the nominal supply voltage.

Vacuum tube R(19) rectifies and the filter comprising retard coil R1(19) and condensers R11(19) and R12(19) reduces the ripple in the direct current voltage supply to vacuum tube PA(12). The direct current voltage at the output of the filter fluctuates as the alternating current supply voltage fluctuates. The gas-filled voltage regulator tubes VR2(19) and VR3(12) and a 10,000-ohm resistance VR4(19) are connected in series across the direct current supply at the output of the filter. The current through the tubes and resistance will vary as the voltage fluctuates. The voltage drop across the voltage regulator tubes VR2(19) and VR3(12) will remain substantially constant however owing to the characteristics of the tubes. This property is also used for controlling the voltage of other parts of the circuit. The load current is passed through a circuit consisting of vacuum tube VR1(12) and a 33,000-ohm resistor VR1(12) in parallel.

The grids (elements 3 and 7) of tube VR1(12) are connected to terminal 5 of tube VR2(19). So long as tube VR1(12) operates between saturation and cut-off, a minimum voltage difference will be maintained between the grids and cathodes of tube VR1(12). For instance, if the input direct current voltage should go up, the direct current potential on the load would tend to go up. But since this would cause the grids to become more negative with respect to their cathodes, the current flowing through tube VR1(12) is reduced and a greater proportion of the load current will flow through resistance VR1(12) which is in parallel with tube VR1(12). The cathode voltage will therefore tend to remain at approximately the original value or very nearly that obtaining across the voltage regulator tubes VR2(19) and VR3(12).

The gas-filled tube P(12) and fuse B(12) are provided in order to prevent a dangerously high voltage from being connected to leads external to this circuit in the event that the high voltage section, direct current or alternating current, of the amplifier power supply became grounded. In operation, tube P(12) would fire when the voltage to ground exceeded approximately 180 volts. The resulting current through fuse B(12) would cause it to operate and open the circuit.

Plate supply for the bias control circuits is obtained from the office 130-volt supply and a booster voltage for plate 4 of vacuum tube B1(19) from rectified and filtered alternating current power. Grid bias for grid 3 of vacuum tube B2(19) is obtained from the office 48-volt battery through a voltage divider.

Alternating current power is connected to the primary of the alternating current transformer AC(19) through contacts on the relay AC(19) as above described, under control of key MAC(19).

The ungrounded biasing potential for the amplifier is obtained from rectified alternating current. The magnitude of the alternating current is controlled through an amplifier by a direct current voltage which is a fixed amount below (less negative than) the office battery potential and changes in potential as the office battery potential changes. A change in the office battery voltage will be reflected by a change of the same magnitude in the direct current bias voltage.

In this bias control circuit, the gas-filled voltage regulator tube VR4(12) with series resistor VR9(12) is connected between the 130-volt office supply and the negative reference voltage. Resistance VR9(12) limits the current which will flow and tube VR4(12) maintains a virtually constant voltage drop across its terminals. A voltage divider circuit is connected across terminals 2 and 5 of tube VR4(12). This consists of resistances RB1(12), VR10(12), VR11(12) and RB2(12) and potentiometer B1(12) connected in series. The slider of the potentiometer is connected through a filter circuit, a rectifier circuit and a resistance to grid 7 of vacuum tube B1(19). Resistance V5(12) and condenser B1(12) serve as a filter circuit for preventing low alternating current voltages superimposed on the office battery supply from affecting the operation of the bias control circuit. The rectifier is a duplicate of the rectifier supplying the bias voltage for the amplifier. The alternating current for the two rectifiers is obtained from duplicate windings on transformer B(12). The rectifiers' function is to introduce a voltage which is equal to the voltage difference between the reference voltage at the potentiometer slider and the voltage at grid 7 of tube B1(19). Both voltages are with respect to the reference ground. Means is provided for shunting the rectifier with the proper resistance to offset differences in the two rectifiers and make the change in output the same for both with a given change in the input alternating current voltage. Variations in the bias voltage of grid 7 of tube B1(19) cause the alternating current input to the rectifier to vary. Hence, the error voltage will be the increase or decrease in the grid 7 bias required to change the rectified alternating current output by an amount equal to the change in reference voltage.

Cathode 2 of tube B1(19) is connected to ground through gas-filled voltage regulator tube VR5(19). To keep the tube VR5(19) operating under optimum regulating conditions an additional connection is made from it to the 230-volt supply conductor 1903. The voltage at cathode 2 of tube B1(19) is approximately the same as at plate 6 of tube B1(19). The plate 6 and grid 3 of vacuum tube B1(19) are connected through resistance B4(19) to form a direct current amplifier. A 540 cycle alternating current voltage obtained on conductor 1902 from the tone supply circuit is connected through the condenser B3(19) to grid 3 of tube B1(19). Plate 6 of tube B1(19) is connected to +130 volts through resistance B2(19). Plate 4 of tube B1(19) is connected to +230 volts on conductor 1903 through resistance B3(19). Plate 4 of tube B1(19) is connected through condenser B2(19) to grid 7 of tube B2(19). Cathode 8 of tube B2(19) is connected to −48-volt battery through resistance B6(19) and condenser B4(19) in parallel. Plate 6 of tube B2(19) is connected through the right windings in parallel of the transformer B(12) to the office +130-volt supply.

To illustrate the operation of the circuit let us assume that the office battery voltage increases by 5 volts in a matter of three or four seconds. A change in amplifier input is required in order to change the rectified alternating current output voltage. Grid 7 of tube B1(19) will become more negative as a result of the change in battery voltage. Less current will therefore flow in the plate cathode circuit of that tube. The voltage drop across resistance B2(19) will also be reduced thus making grid 3 more positive. Making grid 3 more positive increases the effect the alternating current voltage superimposed on the grid has in causing the plate current to fluctuate. The fluctuations in voltage are transmitted to the third stage where it is amplified still further. The increase in rectified alternating current from the varistors V1(12), V2(12), V3(12) and V4(12) balances out the increase in the reference voltage except for the small change in the bias on grid 7 of tube B1(19) required to maintain the increased output. The adjustment in output will be made as rapidly as the input changes. If the voltage on the office battery supply leads was 47 initially and the voltage across the rectifier was 32 volts the final voltages would be 47+5 or 52 volts for the battery supply circuit and $$32+5-.1=36.9$$

volts for the rectifier output.

When relay ORM(12) is operated, as previously described, when an originating register is connected, it closes leads from the amplifier grid and the amplifier biasing circuit to conductors 2505 and 2504 leading to the ring and tip respectively of the line connection in the register. Relay IRB(12) is normal at this time. The amplifier bias is altered by the bias circuit in accordance with line conditions as will be described later. The bias voltage is of sufficient value to produce a low negative or positive voltage difference between grid 7 and cathode 8 of vacuum tube PA(12) with the subscriber's loop closed. Under this condition current flows through the tube and resistance PA4(12). The voltage obtaining on plate 6 and grid 3 connected thereto is therefore reduced. The drop across resistance PA4(12) is sufficient to reduce the voltage at grid 3 in relation to that obtaining on cathode 2 to a value where the current flow between cathode 2 and plate 4 of tube PA(12) is cut off. When the loop is opened by the dial, the current flow in the line drops to zero and the voltage on the ring conductor rises to the potential of the office battery. The voltage on the tip conductor drops to ground potential owing to the reduction in current through the tone coil. The voltage obtaining across the tip and ring under this condition is sufficient to offset the amplifier bias and produce a negative voltage on grid 7 with respect to cathode 8. This alters the current flowing in the cathode-plate circuit and hence the potential on grid 3. Current flows between cathode 2 and plate 4. Vacuum tube DP(12) operates when this occurs, as will be described later and reduces the potential at plate 4 to the point where it ceases to conduct. This condition is maintained for a timed interval as will be described later. At the end of the timed interval, if grid 3 is still at the value for obtaining conduction between cathode 2 and plate 4, current will flow and relay P(19) will be operated. Relay P(19), in operating, operates the pulse corrector relay L(20) in the register section of the automatic monitor. Relay L(20) in operating operates and holds operated relay CDP(19). Relay CDP(19) opens the operating circuit for the vacuum tube DP(12). This prevents vacuum tube DP(12) from delaying the operation of relay P(19) if it releases during a pulse period. At the end of the open period the voltage obtaining across tip and ring will return to normal and relays P(19) L(20) and CDP(20) will release. This cycle of events is repeated on each pulse.

Vacuum tube DP(12) functions as a single shot multivibrator. That is, a definite cycle of events will be started by a voltage impulse on the control lead, at the end of which the circuit will return to normal and remain in this condition until the next voltage impulse is received. Under the normal condition current flows in a circuit consisting of cathode 8, plate 6 of tube DP(12) and common cathode resistor DP1(12). Plate 6 is connected to grid 3 through a voltage divider circuit. This holds the grid at a negative potential with respect to its cathode 2, under normal conditions. No current will flow in the cathode 2, plate 4 circuit at this time. Plate 4 is connected through a condenser DP1(12), and resistance DP2(12) to cathode 8. The midpoint of this circuit is connected to grid 7. A voltage change at plate 4 at tube PA(12) is transmitted to grid 7 through condenser DP1(12) over a circuit extending over conductor 1201, contact 8 of relay AON(19) upper winding of relay P(19), contact 9 of relay AON(19), contact 2 of relay CDP(19) and conductor 1910. If the voltage change drives the grid negative, conduction will drop in the cathode 8, plate 6 circuit. The change in voltage at plate 6 will cause grid 3 to become positive with respect to its cathode. Current will then flow in the cathode 2, plate 4 circuit. Grid 7 will remain negative with respect to cathode 8 until the capacitance DP1(12) connected between grid 7 and plate 4 becomes charged through the series resistance DP2(12). The values of the resistance and capacitance determines the time. Conduction will then restart in the cathode 8, plate 6 circuit. The change in potential on plate 6 when current starts to flow will be reflected by a change in potential on grid 3. This will stop conduction in the cathode 2, plate 4 circuit thereby restoring the multivibrator circuit to normal.

If the cathode 2, plate 4 circuit of tube PA(12) is in the conducting condition and steady, tube DP(12) will remain in the normal condition. If however the current through plate 4 of tube PA(12) is low owing to changes in voltage on the line, the timing condenser DP1(12) connected between elements 4 and 7 of tube DP(12) will be rapidly charged through a path consisting of grid 7, cathode 8 of tube DP(12) in parallel with the 205,000-ohm resistor DP2(12). Tube DP(12) will then be ready to reoperate on a subsequent increase in the conduction through cathode 2, plate 4 of tube PA(12), thereby preventing relay P(19) from operating even though the change in line voltage is rapid.

The voltage change which occurs across the tip and ring of the line during pulsing is dependent on the resistance in the loop. The greatest change occurs with short loops. This permits a reduction in the amplifier bias to be made when the connected loop is of low resistance. Such a reduction is required on some short loop conditions in order to prevent splitting dial pulses. Corrections in bias voltage with changes in pulsing loop are controlled by the tube B2(19) (elements 2, 3 and 4) and associated circuit. Tube B2(19) in turn is controlled by the voltage drop across the tone coil in the subscriber's register. This voltage will vary in inverse ratio to the resistance of the connected loop. That is, with a short loop the voltage will be high and with a long loop it will be low. When the loop is opened during pulsing this voltage drops to zero. It is during this period when the voltage is zero that compensation is required, hence a memory circuit is used for retaining a condition which is based on the normal condition. The memory circuit consists of an 8-microfarad condenser B5(19), which is charged to the voltage obtaining across the tone coil winding in the period before pulsing starts. The charging circuit is non-linear (resistance not the same in the two directions of conduction owing to the use of rectifier B2(19) in this circuit), therefore the charge will be built up rapidly on the condenser but will be dissipated at a reduced rate. Grid 3 of tube B2(19) is normally biased in such a way that no current will flow in the cathode 2, plate 4 circuit until the potential on the memory condenser exceeds this value. The bias voltage is obtained from the office battery using a voltage divider. The divider consists of resistances B10(19) and B11(19) in series with potentiometer B2(19). Any increase in voltage beyond this value will be counterbalanced by the voltage drop across resistance B7(19) in the cathode 2, plate 4 circuit of tube B2(19). The cathode resistor is also in the input circuit for the amplifier hence potential drop across it will alter the effective bias of the amplifier.

Relay L(25) in the originating register responds to the operation of the calling subscriber's dial, in turn controlling the pulse receiving relays which cause the designation of the wanted line to be set up on the called line number register in the manner described in the above-identified Busch application.

At each opening of the line by the dial, relay P(19) in the monitor operates, closing a circuit from ground over its contact, conductor 1904, contact 2 of relay RPE1(2), conductor 202, back contact of relay EMP(6), conductor 613, contact 2 of jack L(20), upper winding of relay L(20) contact 1 of jack L(2) to battery.

When the biasing circuit for relay L(20) was closed, causing relay L(20) to close its contact 1, a circuit was completed from ground at contact 5 of relay AON(19), conductor 1906, contact 1 of relay L(20), conductor 2001, winding of relay LA(13), conductor 1300, resistance LA1(20) to battery, operating relay LA(13). Relay LA(13) in turn closes a circuit from ground at contact 6 of relay AON(19), conductor 1907, contact 1 of relay LA(13) to battery through the winding of relay LA1(13). Relay LA1(13) operates and locks over its contact 2 to ground on conductor 1907, independent of relay LA(13).

Ground on conductor 1907 also extends through resistance RAA(20), contact 1 of jack RA(20), upper winding of relay RAA(20), contact 3 of jack RA(20) to battery, biasing relay RAA(20) in a direction to close its contact 1. The lower winding of relay RAA(20) is included in a circuit which may be traced from battery over contact 3 of jack RA(20), lower winding of relay RAA(20), contact 5 of jack RA(20), conductor 2002, condenser RA(13), resistance RA(13) to ground, in which condenser RA(13) is normally charged.

When relay P(19) operates in response to a dial pulse, closing the above-traced circuit for relay L(20), relay L(20) opens its contact 1 and closes its contact 2. The opening of contact 1 causes relay LA(13) to release, completing a circuit from ground on conductor 1907 over contact 2 of relay LA(13), contact 3 of relay LA1(13) to conductor 2002 and the lower winding of relay RAA(20), causing relay RAA(20) to close its contact 2 and discharging condenser RA(13).

At the end of each dial pulse relay L(20) recloses its contact 1, reoperating relay LA(13) which opens the circuit through the lower winding of relay RAA(20). However, condenser RA(13) now charges in series with the lower winding of relay RAA(20) causing that relay to hold its contact 2 closed until the charging current decreases to the point where the biasing winding becomes effective to open contact 2 and close contact 1. The circuit elements in the circuits of relay RAA(20) are so chosen that relay RAA(20) will hold its contact 2 closed over the longest interval between pulses.

When relay RAA(20) closes its contact 2 in response to the first of a series of dial pulses, it completes a circuit from ground over contact 1 of relay LA1(13), conductor 1301, contact 2 of relay RAA(20), conductor 1302, contact 2 of relay DON(20), contact 3 of relay PST(20) to battery through the winding of the latter relay. Relay PST(20) operates in this circuit and locks over its contact 4 to ground at contact 8 of relay DON(20).

Relay PST(20) at its contact 5 opens the locking circuit for relay TMA(11) to recycle the timer. Relay PST(20) closes a circuit from ground over its contact 1, contact 1 of relay RA1(20) to battery through the winding of relay PH(20), operating that relay.

Relay L(20) of the monitor is provided with the same corrective devices as the pulsing relay of the originating register in order that it may produce good pulses at its contacts. These are discussed in detail in the above-mentioned Busch application.

When relay L(20) closes its contact 2, it connects ground on conductor 1906 over that contact, conductor 2003, upper winding of relay CDP(19), contact 3 of relay AON(19), to conductor 1908 leading to the pulse divider relays LC(13), LD(13) and LE(13). The first connection of ground to conductor 1908 completes a circuit over contact 1 of relay LE(13) to battery through the winding of relay LC(13). Relay LC(13) operates in this circuit and locks through the lower winding of relay LE(13), contact 2 of relay LD(13), contact 2 of relay LC(13) to ground connected to conductor 1302 by relay RAA(20), but relay LE(13) cannot operate, being shunted by the operating circuit of relay LC(13). At the end of the first pulse, when relay L(20) opens its contact 2 and removes ground from conductor 1908, relay LE(13) operates in this locking circuit.

When relay L(20) again grounds conductor 1908 in response to the second pulse, a circuit is closed from ground on conductor 1908 over contact 2 of relay LE(13), upper winding of that relay, upper winding of relay LD(13) to battery, holding relay LE(13) operated and operating relay LD(13). Relay LD(13) opens the circuit of relay LC(13) causing that relay to release. At the end of the second pulse, relays LE(13) and LD(13) release.

These operations are repeated in response to succeeding pulses so that, at the end of the first and each odd numbered pulse relay LE(13) is operated and at the end of the second and each even numbered pulse relay LE(13) is released. A locking circuit is provided from battery through the lower winding of relay LD(13) and over its contact 1 and contact 1 of relay LC(13) to ground on conductor 1302 to insure that relay LC(13) releases before relay LD(13) can release to reclose the operating circuit for relay LC(13).

With relay LE(13) operated, ground is connected from conductor 1302 over its contact 3 to the odd pulse conductor 1303 and with relay LE(13) released, ground on conductor 1302 is extended over contact 4 of relay LE(13) to the even pulse conductor 1304 leading to the pulse counting relays. At the first operation of relay LE(13), ground connected to conductor 1303 completes a circuit over contact 6 of relay P4(13), contact 6 of relay P2(13), contact 3 of relay P3(13), contact 2 of relay P5(13) to battery through the lower winding of relay P1(13). Relay P1(13) operates and locks in a circuit from battery through its upper winding and over its contact 3, and a chain circuit including contact 2 of relay P2(13), contact 4 of relay P3(13), contact 2 of relay P4(13), contact 4 of relay P5(13), conductor 1305, contact 1 of relay RA1(20) to ground at contact 1 of relay PST(20).

When ground is connected to conductor 1304 in response to a second pulse, it completes a circuit over contact 5 of relay P1(13) to battery through the winding of relay P2(13). Relay P2(13) operates, locking over its contact 3 to the above-traced chain circuit and then opening at its contact 2 the locking circuit for relay P1(13) which thereupon releases.

In response to a third pulse, ground is again connected to conductor 1303, completing a circuit over contact 6 of relay P4(13) and contact 5 of relay P2(13) to battery through the winding of relay P3(13). Relay P3(13) operates, locking over the chain circuit and releasing relay P2(13).

When conductor 1304 is grounded in response to a fourth pulse a circuit is completed from that conductor over contact 6 of relay P3(13) to battery through the winding of relay P4(13), relay P4(13) operating, locking over the chain circuit and releasing relay P3(13).

Ground connected to conductor 1303 in response to a fifth pulse completes a circuit over contact 5 of relay P4(13) to battery through the winding of relay P5(13). Relay P5(13) operates and locks in a circuit from battery through its winding, contact 6 of relay P1(13), contact 5 of relay P5(13) to ground over conductor 1305 as above traced. At its contact 4 relay P5(13) opens the locking circuit of relay P4(13) causing that relay to release.

A sixth pulse causes conductor 1304 to be grounded, completing a circuit over contact 6 of relay P5(13), conductor 1306 to battery through the lower winding of relay P6(20). Relay P6(20) operates and locks in a circuit from battery through its upper winding, over its contact 3 to ground on conductor 1305, thereby remaining operated throughout subsequent pulses. Relay P5(13) also remains operated through the sixth pulse. At its contact 4, relay P6(20) closes a circuit for operating relay P6A(20).

Pulses 7, 8, 9 and 10 cause the successive operation of relays P1(13), P2(13), P3(13) and P4(13) over the circuits traced for pulses 1, 2, 3 and 4 respectively. Relay P1(13) in operating releases relay P5(13). Since relay P5(13) is operated when P1(13) is operated to count a seventh pulse the operating circuit for relay P1(13) is closed at contact 1 of relay P6(20) instead of contact 2 of relay P5(13) and a supplementary locking circuit is provided for relay P1(13) extending from battery through its upper winding and over contact 3 of relay P1(13), contact 2 of relay P2(13), contact 4 of relay P3(13), contact 2 of relay P1(13), conductor 1307, contact 2 of relay P6(20) to ground over conductor 1305. With relay P5(13), released the previously traced chain locking circuit is reclosed for locking relays P2(13), P3(13), and P4(13).

Figure 22:
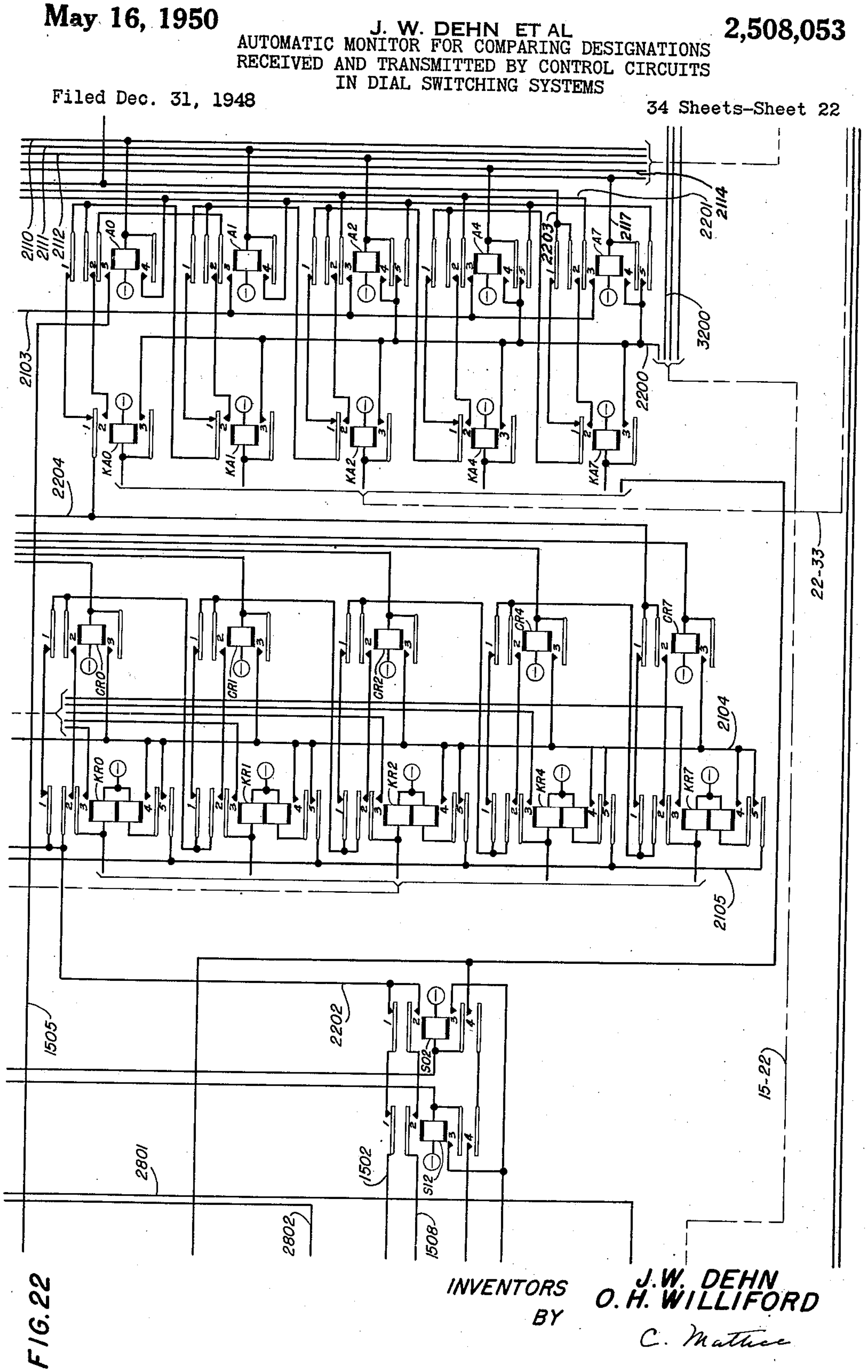
Figure 29:
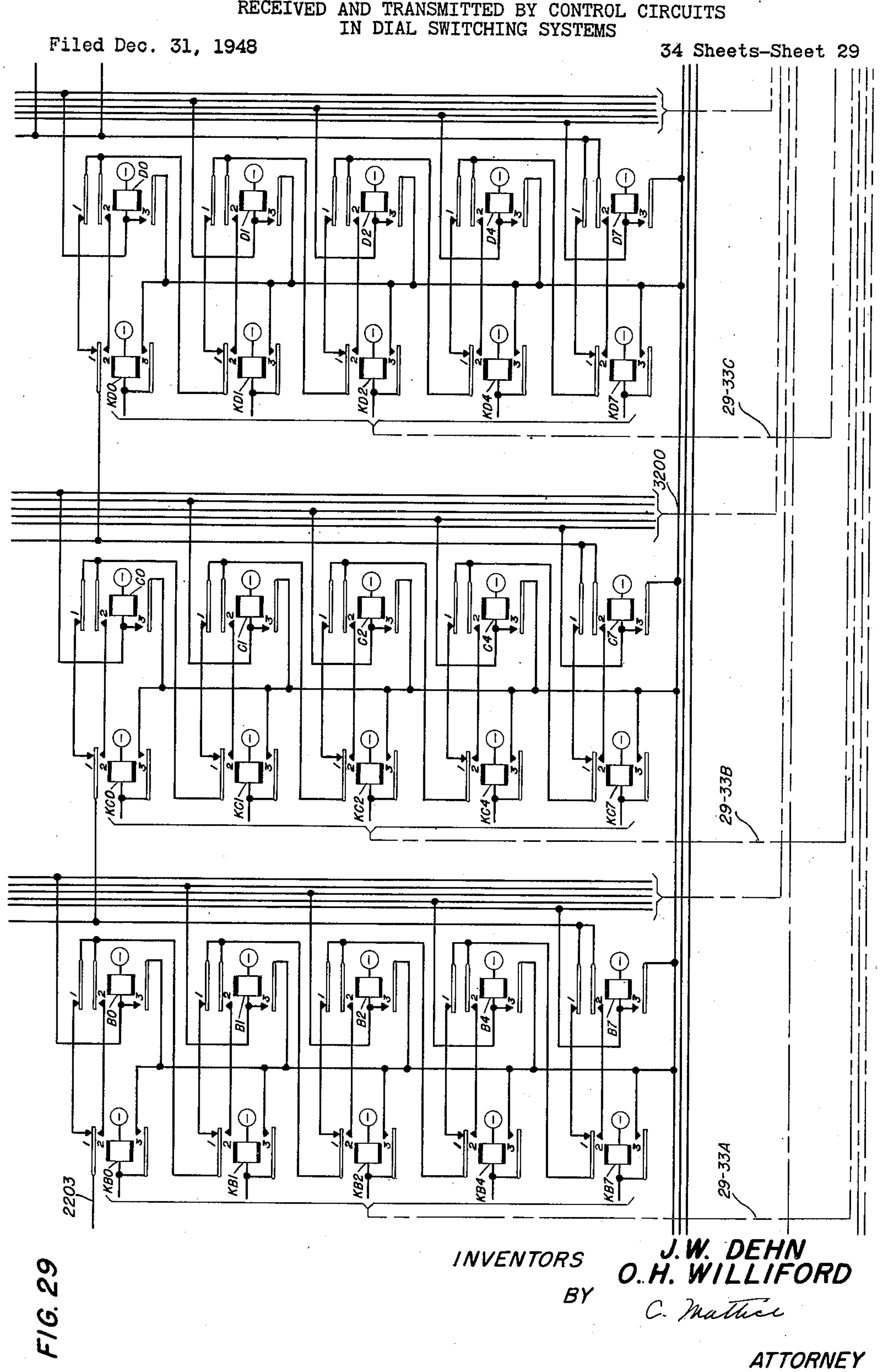
Figure 30:
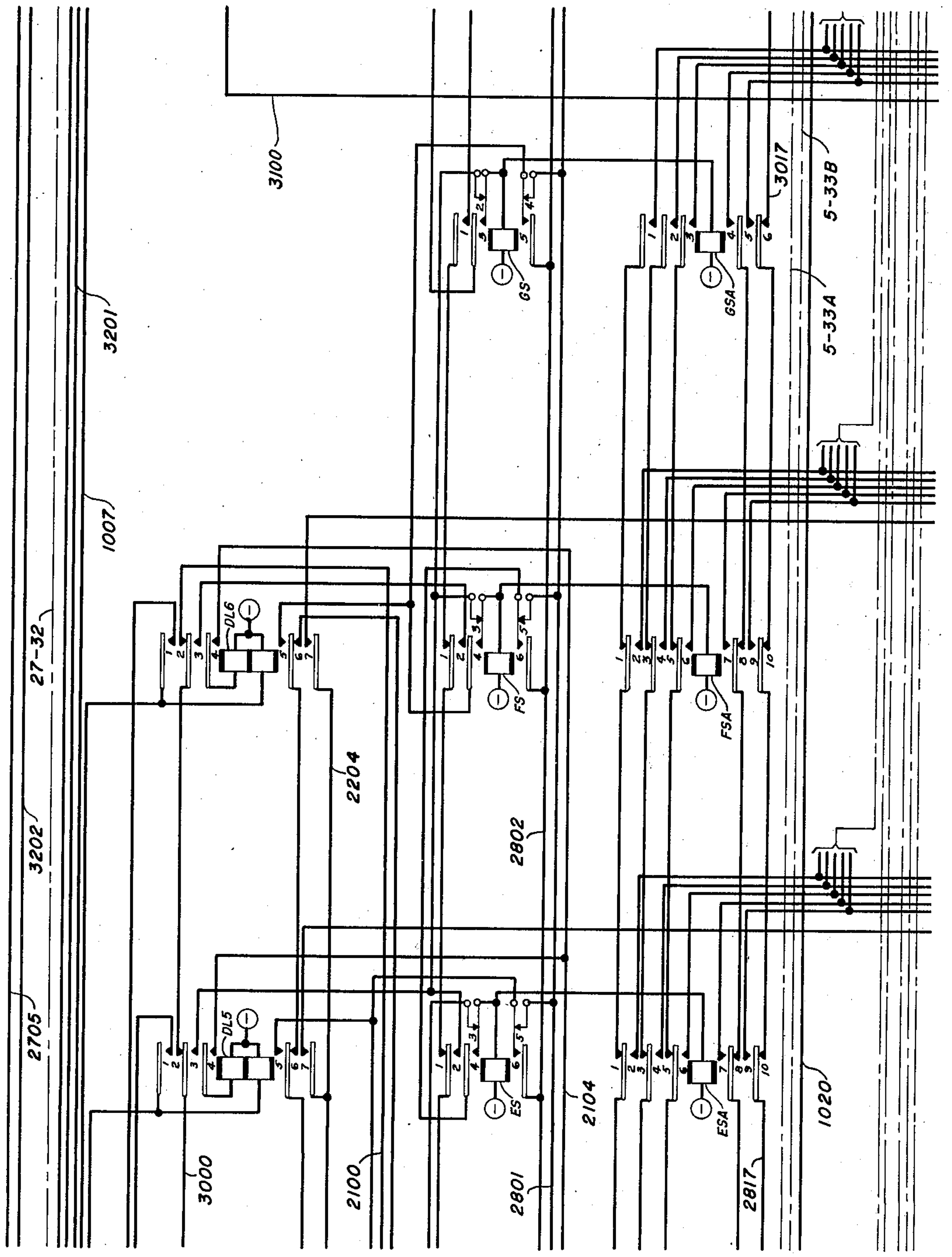
Figure 31:
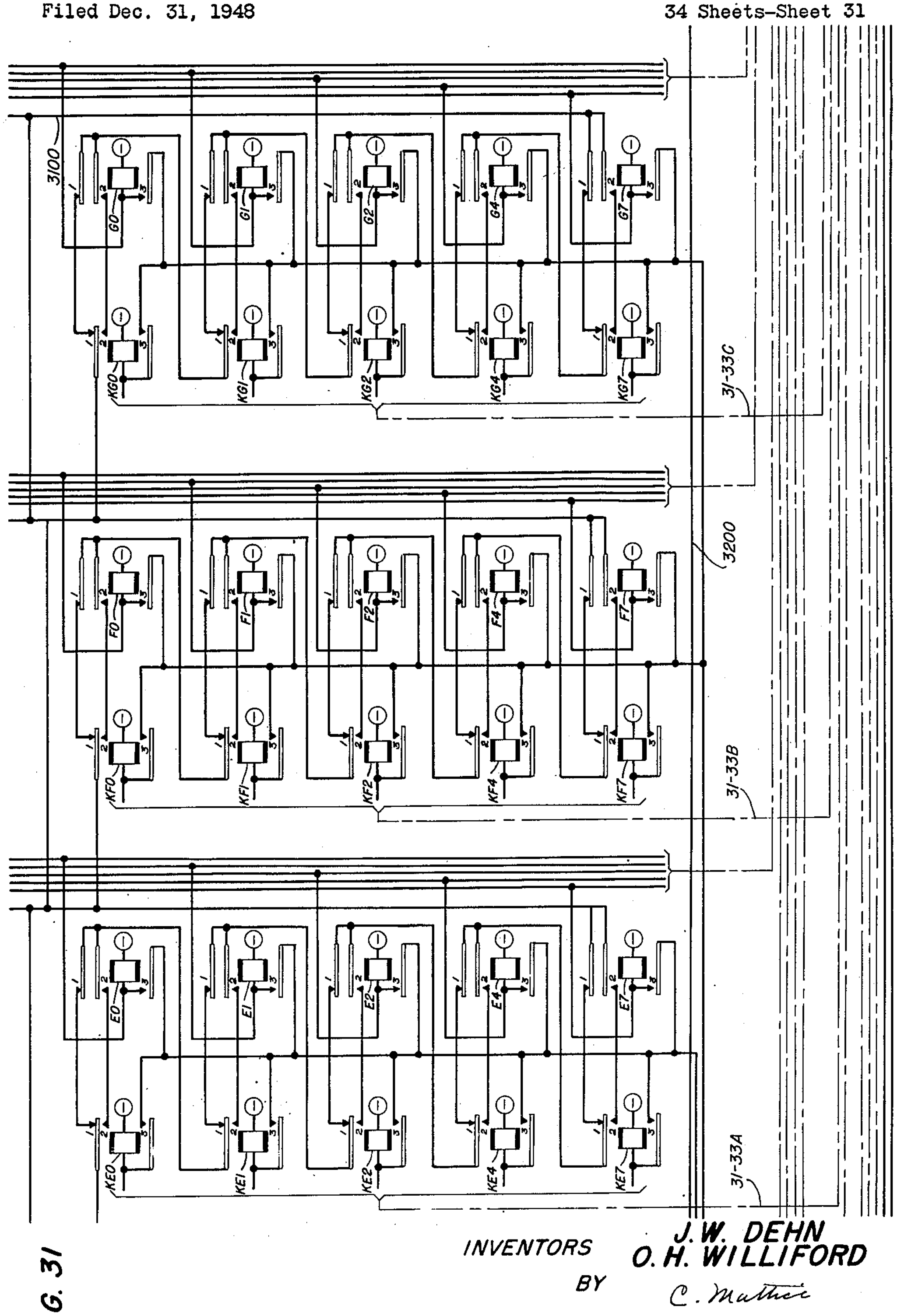

At the completion of a digit, these pulse counting relays serve to ground two out of the five conductors 2010, 2011, 2012, 2014, and 2017 for the purpose of transferring the digit counted to one of the registers of Figs. 22, 29 and 31. The relays operated after each pulse and the conductors grounded are as follows:

| Pulse No. | Relays Operated | Conductors Grounded |
|---|---|---|
| 1 | LC(13), LE(13) P1(13) | 2010, 2011 |
| 2 | P2(13) | 2010, 2012 |
| 3 | LC(13), LE(13) P3(13) | 2011, 2012 |
| 4 | P4(13) | 2010, 2014 |
| 5 | LC(13), LE(13) P5(13) | 2011, 2014 |
| 6 | P5(13), P6(20), P6A(20) | 2012, 2014 |
| 7 | LC(13), LE(13) P1(13), P6(20), P6A(20) | 2010, 2017 |
| 8 | P2(13), P6(20), P6A(20) | 2011, 2017 |
| 9 | LC(13), LE(13) P3(13), P6(20), P6A(20 | 2012, 2017 |
| 10 | P4(13), P6(20), P6A(20) | 2014, 2017 |

At the end of a digit, relay LA(13) remains operated long enough for relay RAA(20) to open its contact 2 and reclose its contact 1, completing a circuit from ground at contact 1 of relay LA1(13), conductor 1301, contact 1 of relay RAA(20), contact 2 of relay PST (20) to battery through the winding of relay RA1(20). This ground, supplied by relay RAA(20) also extends over contacts 1 and 2 of relay PH(20) to conductors 2004 and 2005 and contacts of the pulse counting relays, to ground conductors 2010 to 2017 in accordance with the above table.

For example, if the digit 3 were dialed, relay P3(13) would remain operate at the end of the digit and ground on conductor 2004 would be extended over contact 1 relay P3(13), conductor 1308, contact 2 of relay P6A(20) to conductor 2011, while ground on conductor 2005 would be extended over contact 2 of relay P3(13) to conductor 2012.

If the digit dialed were 9, in which case relay P6A(20) would be operated in addition to relay P3(13), conductor 2012 would be grounded as above, but conductor 1308 would be extended over contact 1 of relay P6A(20) to conductor 2017.

Conductors 2010 to 2017 extend through cable 14-20B to the armatures of relay CL1A(14) whence they extend over normally closed contacts on relays CL1A(14), CLSA(21) and CRSA-(21) to the armatures of relay ASA(21) and, with relay ASA(21) operated as above described, to the windings of relays A0(22), A1(22), A2(22), A4(22) and A7(22) which constitute the A digit register.

Assuming, to facilitate reference to the above-identified Busch application that the designation dialed by the calling subscriber is Media 6—7890, which is the equivalent of 636–7890, the circuits for operating the A register relays may be traced as follows: from ground on conductor 2004, contact 3 of relay P5(13), conductor 1309, contact 5 of relay P6A(20), conductor 2012, through cable 14-20B, contact 5 of relay CL1A(14), conductor 1412, contacts 5 of relays CLSA(21) and CRSA-(21), contact 6 of relay ASA(21), conductor 2112 to battery through the winding of relay A2(22); from ground on conductor 2005, contact 1 of relay P5(13), conductor 2014, through cable 14-20B, contact 6 of relay CL1A(14), conductor 1414, contact 6 of relay CLSA(21), contact 8 of relay CRSA(21), contact 7 of relay ASA(21), conductor 2114 to battery through the winding of relay A4(22). Relays A2(22) and A4(22) operate in these circuits, locking over their contacts 4 to conductor 2200, which extends through cable 15-22 to ground at contact 5 of relay ONR(15).

It may be noted that relays A0(22) and A1(22) may only lock when operated in combination with one of the relays A2(22), A4(22) or A7(22). This is to prevent locking in a registration of the digit 1 as the first digit dialled, since an initial digit 1 is a false pulse or the first digit of a service code which receives special treatment to be described hereinafter.

When relay RA1(20) operates, it opens at its contact 1 the locking circuit for relays P5(13) and P6(20), and the operating circuit of relay PH(20) but, before doing so, closes an alternative operating and locking circuit for these relays which may be traced from conductor 1305 over contact 6 of relay DON(20), conductor 2006 through cable 14-20A, contact 1 of relay TO(14), conductor 1401 through cable 14-20A, contact 3 of relay DON(20), contact 2 of relay RA1(20) to ground at contact 1 of relay PST(20), thereby holding relay PH(20) and the pulse counting relays operated.

Relay RA1(20) also closes a circuit from ground over contact 3 of relay PH(20), contact 3 of relay RA1(20), contact 4 of relay DON(20), to conductor 2007. From conductor 2007 the circuit extends in parallel through cable 14-20A through resistance TO(14) to conductor 2802 and over contact 1 of relay DON(20), conductor 2008 (through cable 14-20A) through the upper winding of relay TO(14) to conductor 2802, and thence over contact 1 of relay CL1(14), conductor 1402, contacts 1 of relay CLS(21) and CRS(21), contact 3 of relay AS(21), conductor 2103, contacts 3 of relays A2(22) and A4(22) in parallel, conductor 2201, contact 3 of relay BS(28) to battery through the windings of relays BS(28) and BSA-(28) in parallel. Relays BS(28) and BSA(28) operate in this circuit, relay BS(28) closing a locking circuit for the two relays over its contact 4, contact 5 of relay CS(28) to ground on conductor 2801. At its contacts 5 and 6, relay BS(28) transfers the locking circuit of relays AS(21) and ASA(21) from conductor 2801 to conductor 2802 which extends as above traced to ground at contact 3 of relay PH(20).

Relay TO(14) operates in the above-traced circuit and closes a locking circuit for itself from battery through resistance TO1(15), contact 3 of relay ONR(15), conductor 1501, lower winding and contact 2 of relay TO(14), conductor 1401, to ground at contact 1 of relay PST(20) as previously traced. At its contact 1, relay TO(14) opens the holding circuit for relays PH(20), P5-(13) and P6(13) permitting these relays to release. The release of relay PH(20) opens the holding circuit for relays AS(21) and ASA(21) and these relays release to extend the register operating conductors to relay BSA(28) and thence to the B code register. The circuit now awaits the next or B digit.

At the beginning of the next digit, relay RAA(20) opens its contact 1, releasing relays RA1(20) and TO(14) and at its contact 2 grounds conductor 1302 to prepare for counting the second digit.

The counting of the succeeding digits and the operation of steering relays CS(28) and CSA(28), to GS(30) and GSA(30) take place in substantially the manner described for the first digit. When relay RA1(20) operates at the end of the last digit, relay STS(32) is operated to prepare for an end of signal indication.

Since it was assumed that the called line destination was Media 6—7890, in addition to relays A2(22) and A4(22), relays B1(29), B2(29), C2(29), C4(29), D0(29), D7(29), E1(31), E7(31), F2(31), F7(31), G4(31) and G7(31) will be operated.

When the originating register recognizes that pulsing has been completed, it operates relay MST(25), operating the originating register marker connector to associate itself with an idle marker as described in detail in the above-identified Busch application.

The originating register then passes the calling line location over a plurality of conductors identified as cable 1-25C, through the originating register marker connector to the calling line location checking registers of the marker and passes the office code of the called line number over a plurality of conductors included in cable 1-25D through the originating register marker connector to the called code registers of the marker. The marker employs the office code registration to determine whether the call is to be terminated locally or is to be extended to a trunk outgoing to another office. If the call is to be completed locally, the marker seizes an intraoffice trunk, after which it operates a relay such as relay N(1) causing the numerical designation of the called line to be set up simultaneously on the called numerical registers and the called number transfer checking registers. The marker then calls in a number group circuit to determine the location of the called line and proceeds to connect the called line with the selected intraoffice trunk, after which it connects the calling line to the same trunk, thereby completing the connection between the calling line and the called line, after which the marker releases.

If the call is to be extended to a distant office, the marker seizes an idle trunk leading to that office and an idle outgoing sender to serve such trunk, after which it operates a set of relays represented by relay K(1) which connect the numerical conductors incoming from the originating register to a corresponding set of conductors, represented by cable 1-25E leading to the outgoing sender connector and therethrough to the outgoing sender. Relay K(1) also closes circuits for transmitting the called office code from the registers to the outgoing sender. At the same time the complete designation is set up on the called number transfer checking registers. The marker then connects the calling line with the selected trunk and releases, leaving the further extension of the connection under the control of the outgoing sender.

When relay MST(25) operates, it disconnects ground from conductor 2502 leading to the automatic monitor, thereby opening the operating circuit above traced for relay RPS1(2) and permitting pulsing ended relay RPE1(2) to operate in the locking circuit of relay RPS1(2).

Relay RPE1(2) in operating opens the circuit for relay L(20) to prevent the monitor from registering any further pulses. In case the register has to return a coin or make a two party or coin test before seizing a marker, it operates relay MST1(25) before these operations take place as described in the aforementioned Busch application, and the operating ground for relay MST1(25) is extended over contact 12 of relay MO(25), conductor 2506 through cable 6-25, contact 1 of relay DOR(6) to battery through the winding of relay EMP(6). In this case, relay EMP(6) operates to open the operating circuit for relay L(20) and prevent the registration of further pulses.

When relay RPE1(2) operates, it closes at its contact 3, an obvious circuit for operating the auxiliary pulsing ended relay PEA(2). Relay PEA(2), at its contact 4, further opens the operating circuit of relay RPS1(2). At its contact 3, relay PEA(2) connects ground to conductor 203, completing a circuit over contact 4 of relay PH(20), when that relay releases at the end of the last digit, conductor 2009 to battery through the winding of relay PE(17). Relay PE(17) connects ground over its contact 2 to conductor 1700 which extends through cable 14-18A, over contact 1 of relay AS(21) conductor 2106 through cable 14-18C, contact 3 of relay 10(18) to conductor 2017 and thence through cable 14-18B, over contact 7 of relay CL1A(14), conductor 1417, contact 7 of relay CLSA(21) contacts 10 of relays CRSA(21) and ASA(21), conductor 2127, contacts 10 of relays BSA(28), ESA(28) and DSA(28), conductor 2817, contacts 10 of relays ESA(30) and FSA(30), contact 6 of relay GSA(30), conductor 3017, contact 5 of relay STS(32) to battery through the winding of relay ST7(32). Relay ST7(32) operates in this circuit and locks over its contact 3 and conductor 3200 through cable 15-22 to ground at contacts 6 of relay ONR(15).

Relay PE(17) is made slow to operate and its circuit is carried over a back contact of relay PH(20) to insure that the steering circuit will have advanced before the circuit of relay ST7(32) is closed. If the designation dialed uses less than seven digits, the circuit closed by relay PE(17) operates the No. 7 register relay of the register following that used for the last dialed digit. For example, if the office called has a two digit code, steering relay GSA(30) would be operated following the dialing of the last digit, and the circuit closed by relay PE(17) would be directed to relay G7(31). The circuit closed by relay PE(17) is carried over a back contact of relay AS(21) to prevent operating relay A7(22) on a permanent signal, since the register does not operate the corresponding relay under a permanent signal condition.

When relay RPE1(2) operates, it closes a circuit from battery through resistance STC1(2), contact 1 of relay RPE1(2), conductor 204, contact 1 of relay RTC1(10), conductor 1001, contact 2 of relay NRR(17), contact 2 of relay TRB(17), conductor 1701, contact 1 of relay TRC(10), conductor 1002, through cable 5-10A to the winding of monitor preference relay MON(5) at the master test frame connector. This circuit extends to ground over contacts of a chain of marker preference relays so that the monitor cannot seize the test frame connector if a marker is also trying to seize the connector to make a trouble record. The circuits of the test frame connector are disclosed in more detail in the above identified application of O. H. Williford.

If the connector is idle, relay MON(5) operates, locking to ground at its contact 1.

With relay PEA(2) operated, a circuit is prepared extending from ground through the winding of relay MM(7), conductor 708, contact 8 of relay STM(6), conductor 614, contact 4 of relay MTR(10), conductor 1003, contact 1 of relay PEA(2), conductor 205, contact 3 of relay DOR(6), conductor 615 through cable 6-25, contact 5 of relay M0(25) to conductor 2507. When the originating register marker connector operates in response to the operation of relay MST(25) to connect the originating register with an idle marker, conductor 2507 is extended through the marker connector to the selected marker where it extends to battery through the winding of relay MON(1), operating that relay as an indication to the marker that the call is being monitored.

Relays MM(7) and MON(1) operate in this circuit, relay MON(1) closing a locking circuit for itself over its contact 4, conductor 102, contact of relay CKG1(5), which operates as soon as the marker is seized, conductor 614 through cable 5-10B to ground through the winding of relay MM(7).

The conductors of cable 5-10B are connected in multiple to all markers, but since the relay MON(1) can be operated in only one marker at a time, they constitute an individual direct connection between the marker associated with a monitored call and the monitor.

When relay MON(1) operates, it opens the circuit of relay OST2(5) which controls the timing of a registration transferred to an outgoing sender to prevent the start of this timing function until the monitor has received certain information from the marker. However, when monitoring on an originating register, the monitor does not require this information and therefore with relay RPS1(2) operated, a circuit is closed from ground at contact 2 of relay RPS1(2) over conductor 206 through cable 5-10B, over contact 1 of relay MON(1), conductor 103 to battery through the winding of relay SCT(5) which closes at its contact 1 an alternative circuit for relay OST2(5), permitting the latter relay to operate independent of relay MON(1).

Whenever the test frame connector is busy, relay ON(5) is operated, connecting ground over its contact 4 to conductor 501 through cable 5-10A to the automatic monitor where it extends over contact 3 of relay CI(10), conductor 1004, contact 2 of relay MTR1(17) to battery through the winding of relay TRB(17). Relay TRB(17) operates in this circuit and at its contact 2 opens the previously traced circuit for relay MON(5) for seizing the test frame connector. With relay TRB(17) operated, when relay MM(7) operates as above described, a circuit is closed from ground over contact 2 of relay ONM2(7), conductor 709, contact 1 of relay MM(7), conductor 710, contact 1 of relay RTC2(10), conductor 1005, contact 1 of relay TRB(17), to battery through the upper winding of relay NRR(17). Relay NRR(17) operates and locks over its contact 1 to ground on conductor 709, independent of relay TRB(17) and further opens the operating circuit of relay MON(5). Under this condition the monitor does not attempt to check the number, but releases as on an abandoned call as will be described hereinafter.

Assuming that the test frame connector is idle and relay MON(5) operates as above described, it closes a circuit over its contact 2, conductor 502 through cable 5-10A, to battery through the winding of relay CI(10). Relay CI(10) operates, opening the operating circuit for relay TRB(17). At its contact 5, relay CI(10) connects ground over conductor 1006 through cable 5-10A to battery through the winding of relay ON(5) to make the test frame connector busy to other circuits. At its contact 7, relay CI(10) closes an obvious circuit for relay CI1(10).

Relay CI1(10) at its contact 5 closes a circuit from ground over conductor 1007 through cable 11-14B to battery through the winding of multicontact relay MCB(33). At its contact 6, relay CI1(10) closes a circuit from ground over conductor 1008 through cable 17-26 to battery through the winding of multicontact relay MCA(27). Relays MCA(27) and MCB(33) operate to connect groups of leads from the monitor to the test frame connector.

Relay ON(5) closes an obvious circuit for relay RM1(5) which operates, connecting ground over its contact 3, conductor 503 though cable 5-10A, contact 2 of relay CI(10), conductor 1009 to battery through the winding of relay MTR1(17). Relay MTR1(17) operates, locking over its contact 1 to conductor 503, independent of relay CI(10). Relay MTR1(17) further opens the circuit of relay TRB(17).

In addition, relay CI(10) closes a circuit from ground over contact 1 of relay TRR1(17), conductor 1702, contact 1 of relay CI(10), conductor 1010, through cable 5-10B, contact 7 of relay MON(1) in the marker, over conductor 104 to battery through the winding of relay MKB(5) which is individual to this marker in the master test frame connector. Relay MKB(5) operates a plurality of multicontact relays, represented by relay BCD(5) to connect the marker with the test frame connector.

The physical location of the calling line is recorded over the leads closed by relay MCA(27) indicated by cable 5-27A, which extends through cable 5-27C to the master test frame connector where these conductors are connected over contacts of the multicontact relays represented by relay BCD(5) to a plurality of conductors represented by cable 1-5A which are branches of the circuits, represented by cable 1-25C, over which the originating register transfers the calling line location to the marker. This information is stored only for use in case a trouble record is required.

The calling line location is made up of five items, namely, the tens digit and the units digit of the line link frame number on which the line appears, and the vertical group, horizontal group and vertical file in which the line is located.

The tens digit of the frame number is recorded by operating one of four relays FT0 to FT3 (not shown). The units digit of the frame number is recorded by operating two of the five relays FU0(32), FU1(32), FU2(32), FU4(32) and FU7(32). Two of the six relays VG0(32), VG1(32), VG2(32), VG4(32), VG7(32) and VG10 (not shown) are operated to give the vertical group of the calling line. Two of the five relays HG0(32), HG1(32), HG2(32), HG4(32) and HG7(32) are operated to record the horizontal group, while one of the vertical file relays VF0(32) to VF4(32) are operated.

In addition, a record is made of the number of the marker which is handling the monitored call. For this purpose, relay MCA(27) closes a circuit from ground over its contact 45, conductor 2700, through cable 5-27D, to the master test frame connector, where it is extended over contact 8 of relay MBK(5), which is individual to the marker 0 of Figs. 1 and 5, to conductor 504 through cable 5-27D, contact 30 of relay MCA(27), conductor 2701 through cable 27-32 to battery through the winding of relay M0(32). Relay M0(32) operates and locks over its contacts and conductor 3201 through cable 7-28 to ground at contact 8 of relay ONM1(7). The calling line location relays also lock to conductor 3201.

The called line number is passed from the originating register to the marker by grounding certain of the conductors of cable 1-25D. These conductors are extended over the branch circuits indicated by conductor 1-5B to the master test frame connector where they are further extended over contacts of the multicontact relays represented by relay BCD(5) to cables 5-33A and 5-27C and thence over contacts of multicontact relay MCB(33), through cables 22-33, 29-33A, 29-33B, 29-33C, 31-33A, 31-33B and 31-33C to the checking registers of Figs. 22, 29 and 33. Assuming that the number has been correctly transmitted by the originating register, relays KA2(22), KA4(22), KB1(29), KB2(29), KC2(29), KC4(29), KD0(29), KD7(29), KE1(33), KE7(33), KF2(33), KF7(33), KG4(33) and KG7(33) will be operated. In addition, relay KST7(32) will be operated. All of these relays lock to conductor 3200.

When the marker has reached the point of operating the channel hold magnets, it connects ground to conductor 105 to operate relay HMS1(1) as previously mentioned. A branch of this conductor now extends over a contact on one of the multicontact relays at the master test frame connector represented by relay BCD(5), over conductor 505 through cable 5-27C, contact 44 of relay MCA(27) in the automatic monitor, conductor 2702 through cable 7-28, contact 4 of relay ORN(6), conductor 616, to battery through the upper winding of relay RTC1(10). Relay RTC1(10) operates in this circuit and closes a locking circuit for itself from battery through its lower winding and over its contact 3, conductor 1011 to ground at contact 5 of relay ONM2(7). At its contact 1, relay RTC1(10) opens the circuit of relay MON(5) in the master test frame connector, causing that relay to release. Relay MON(5) opens the circuit of relay CI(10) in the monitor, which in turn disconnects ground from conductors 1006 and 1010 to release relays ON(5), MKB(5) and the multicontact relays represented by relay BCD(5) in the test frame connector, to restore the connector to normal and disconnect the marker from the automatic monitor. The release of the marker proceeds as described in the above-mentioned Busch application.

Relay CI(10) also releases relays MCA(27) and MCB(33) to disconnect the registers of the monitor from the test frame connector. Relay ON(5) in the test frame connector releases relay RM1(5) which disconnects ground from conductor 503, thereby releasing relay MTR1(17) in the monitor.

Relay RTC1(10) at its contact 2 closes an obvious circuit for relay RTC2(10). Relay RTC2(10) operates and opens the circuit of relay NRR(17) to prevent that relay from operating if relay TRB(17) is operated in response to an immediate reseizure of the master test frame connector by a marker wishing to make a trouble record.

At its contact 2, relay RTC2(10) closes a circuit from battery through the winding of relay CKS(17), conductor 1703, contact 2 of relay RTC2(10), conductor 1012, contact 1 of relay PE(17), conductor 1704 to ground at contact 3 of relay ONM2(7). Relay CKS(17) operates in this circuit, locking over its contact 1 to ground on conductor 1704, and initiates the checking of the number as received by the originating register against the number as transmitted from the register to the marker.

In the registers of Figs. 22, 29 and 31, each relay used in registering the dialed number as received by the monitor is paired with a corresponding relay which records the number passed from register to marker. For instance, relays A0(22), A1(22), A2(22), A4(22) and A7(22) are paired, respectively, with relays KA0(22), KA1(22), KA2(22), KA4(22) and KA7(22). The checking path is wired either through the back contacts of a relay pair in series, or over a parallel path through the front contacts of the pair in series. Hence, completion of the check path requires that the two numbers be exactly the same. In the present case the checking circuit may be traced from battery through resistance CKS(17) over contact 4 of relay CKS(17), conductor 1705 through cable 14-18A, contact 1 of relay 1IR(14), conductor 1409, over contact 7 of relay TDM(15) or over contact 1 of relay 11'(15), contact 1 of relay 12'(15), contact 3 of relay P11(15), conductor 1507, normally closed contacts 1 of relays TD1(15), S11(15), S01(15), conductor 1502, contacts 1 of relays S12(22) and S02(22), which relays are not used in the call above outlined, conductor 2202, contact 1 of relay DCR(21), conductor 2204, back contacts 1 of relays KA0(22) and A0(22), KA1(22) and A1(22), front contacts 2 of relays KA2(22) and A2(22), KA4(22) and A4(22), back contacts 1 of relays KA7(22) and A7(22), conductor 2203, back contacts 1 of relays KB0(29) and B0(29), front contacts 2 of relays KB1(29) and B1(29), KB2(29) and B2(29), back contacts 1 of relays KB4(29) and B4(29), KB7(29) and B7(29) and in series over similar paths through the C, D, E, F and G registers to conductor 3100, front contact 2 of relay KST7(32) and front contact 1 of relay ST7(32), conductor 3202 through cable 14-18A to ground through the winding of relay CKN(18). Relay CKN(18) by operating indicates that the numbers received from the two sources are the same and locks over its contact 3 to battery on conductor 1705.

At the same time that relay CKS(17) connected battery to the above-traced checking circuit, it connected ground from conductor 1011 over its contact 5 and conductor 1706 to battery through the winding of relay CKE(18). Relay CKE(18) is slow to operate to permit relay CKN(18) to operate if the checking circuit is complete. If relay CKN(18) fails to operate, relay CKE(18) closes a circuit from ground at contact 4 of relay ONM2(7), conductor 1708, contact 5 of relay NRR(17), conductor 1800, contact 1 of relay CKE(18), contact 1 of relay CKN(18), conductor 1707 to battery through the winding of relay TRR1(17). Relay TRR1(17) operates in this circuit, locks over its contact 4 to ground on conductor 1708 and initiates the making of a trouble record.

If relay CKN(18) operates to indicate a successful check, relay CKE(18) closes a circuit from ground on conductor 1800 over its contact 1 and contact 2 of relay CKN(18), conductor 1801, contact 1 of relay TRR2(10), conductor 1013, contact 2 of relay MM(7), which released when the marker released, contact 11 of relay ONM1(7) to battery through the winding of relay RN(7).

The circuit of relay RN(7) is controlled by relay MM(7) to insure that the marker involved in the call releases before the monitor. Relay MON(1) of the marker is therefore held operated so that, if the marker encounters trouble, it can indicate on the trouble card that it was monitored. This arrangement also prevents simultaneous connection with more than one marker.

Relay RN(7) in operating, opens the locking circuit for relay DOR(6), which in turn opens the holding circuits for relays MO(25) and MB(25) in the originating register, thereby disconnecting the monitor from the register.

Relay DOR(6) also releases relay ORN(6), which in turn releases relays ONM1(7) and ONM2(7). Relay DOR(6) also releases relay MK(14) and relay DON(20). Relay ONM1(7) releases relay MAC2(6), MPC1(6) and the calling line register relays. Relay ONM2(7) releases relay CKS(17). Relay DON(20) releases relay ONR(15) which releases the called line number registers.

In addition relay ONM1(7) releases relay MSR(3). This relay is slow to release to permit all of the monitoring relays to release before releasing relay MSR1(3). When relay MSR1(3) releases, it opens the circuit of relay MBN(3) permitting that relay to release, in turn releasing those marker busy relays which are not held operated by busy markers to restore the circuits for the marker preference relays of idle markers and thereby to permit the monitor to receive another call.

*Allotter circuit*

The release of relay ONM1(7) disconnects ground from conductor 707, thereby opening the holding circuit for relay APA(7), permitting that relay to release and leaving relay APB(7) operated and locked under the control of relay STM1(3). Relay APB(7) holds relay OR(3) operated to cause the monitor to again monitor on an originating register.

When the monitor is next seized, and relay ONM1(7) operates as above described, ground connected to conductor 707 is extended over contact 1 of relay APA(7), contact 2 of relay APB(7), contact 3 and winding of relay APC(7) to battery. Relay APC(7) operates and locks over its contact 4, contact 5 of relay APD(7), conductor 700 to ground at contact 3 of relay STM1(3). At its contacts 5 and 6 it transfers the locking circuit of relay APB(7) from conductor 700 which is grounded under the control of relay STM1(3) to conductor 707, which is grounded under the control of relay ONM1(7). Therefore, at the end of this call relay APB(7) is released and relay APC(7) held operated.

In a similar manner relays APD(7) to APK(7) of the allotter chain are operated one at a time, successively at the beginning of subsequent calls, locking under the control of relay STM1(3) to remain operated over the interval between calls and transferring the locking circuit of the preceding relay in the chain to the control of relay ONM1(7) so that the preceding relay releases at the end of the call. Relay APK(7) locks over contacts on relay APA(7) and closes an operating circuit for relay APA(7) at its contact 1 so that the allotter chain operates continuously as long as the monitor is working.

Relays APA(7), APB(7), APC(7), APD(7), and APE(7) close an operating circuit for relay OR(3) so that for five steps of the allotter the monitor monitors on originating registers. With relays APF(7), APG(7) and APH(7) operated, ground is connected to conductor 710, operating relay OS(3) to prepare the monitor to monitor on outgoing senders, while with relays APJ(7) and APK(7) operated, ground is connected to conductor 711, operating relay IR(3) to prepare for monitoring on incoming registers. The progression is always in the order given, with at least one step for each type of circuit. However, with this limitation, contacts 7 of relays APB(7) to APJ(7) may be connected as desired to the windings of relays OR(3), OS(3) and IR(3) to correlate the monitoring with the traffic.

*Automatic advance allotter*

If the monitor is not used for a given time, for example one minute, means is provided to advance the allotter one step. This is to prevent the monitor remaining in the incoming register or out-sender monitoring positions during periods when interoffice traffic is light.

Whenever the monitor is in service, one of the allotter relays is operated and ground is connected to conductor 713, completing a circuit over contact 3 of relay TAP1(3) to battery through the winding of relay TAP2(3). Relay TAP2(3) operates and at its contact 2 removes a shunt from the timing condenser TAP(7) and at its contact 3 connects ground through the winding of relay TPA1(3) over conductor 715 to this condenser, which starts to charge in series with the timing resistance TAP3(7) and +130-volt battery. While the monitor is handling a call, relay MSR(3) is operated as previously described and a shunt is closed around condenser TAP(3) through resistance TAP2(7), conductor 714, contact 1 of relay TAP2(3), contact 1 of relay MSR(3) and conductor 715, discharging the condenser and holding it discharged until the end of the monitoring operation, at which time this shunt is opened and the condenser starts to charge.

If no call is received during the time interval for which condenser TAP(7) and resistance TAP3(7) are adjusted, the condenser voltage, applied to the control electrode of tube TAP(7) rises to the point where the tube will ionize and relay TAP1(3) operates across the main gap of the tube.

Relay TAP1(3), in operating, at its contact 4 connects conductor 714 to conductor 715 discharging condenser TAP(7). At its contact 3 it opens the circuit of relay TAP2(3) but the latter relay is slow to release and therefore remains operated for an interval. At its contact 1, relay TAP1(3) grounds conductor 707 to operate the next allotter relay and at its contact 2 it grounds conductor 612 to operate relay MSR(3). Relay MSR(3) operates relay MSR1(3) as previously described to simulate a call so that, if the monitor is progressing from one to another type of monitoring it will not be seized in connection with a call already in progress.

When relay TAP2(3) releases it releases relay TAP1(3) which releases the previously operated allotter relay, releases relay MSR(3) and recloses the circuit of relay TAP2(3) to initiate another timing cycle.

*Monitoring on outgoing senders*

When the allotter relay APF(7) operates, it operates relay OS(3) as above described, but relay OS(3) is generally ineffective until relays APE(7) and OR(3) release at the end of the last monitoring operation on the originating registers. However it immediately closes a supplementary holding circuit for relay STM2(3) at its contact 5. Relay OS(3) also connects ground over its contact 4 and conductor 314 to all markers, where, in the markers in which relay SON(1) is operated because that marker is handling an out sender class of call, this ground is extended over a contact on relay SON(1) to conductor 100 to provide a locking circuit for the associated marker busy relay when relay MBN(3) releases at the end of the previous call, to prevent the late seizure of that marker as described above.

When relay OR(3) releases, it disconnects ground from conductor 311 to terminate requests from the markers for originating register monitoring.

When a marker, for example the marker of Figs. 1 and 5 now is seized to handle a call which requires the use of an outgoing sender, the route relay R(1) which determines that a sender is required, operates the out sender group relay OSG(1) which in turn operates relay SON(1) connecting ground from conductor 314 to conductor 100, thereby operating the associated marker preference relay MP0(4) in the manner previously described.

Since relay OR(3) is now released and relay OS(3) operated, relay MP0(4) closes a circuit from ground over contact 5 of relay MSR1(3), contact 5 of relay OR(3), contact 6 of relay OS(3), contact 4 of relay CMS(3), conductor 315, contacts 4 of relays MP9(4), MP5(4) and the intermediate marker preference relays, contact 3 of relay MP0(4), conductor 402, to battery through the winding of relay MON(1) in the associated marker. Relay MON(1) operates, locking over its contact 4, conductor 102, contact of relay CKG1(5) conductor 614 through cable 5-10B, contact 8 of relay STM(6), conductor 708 to ground through the winding of relay MM(7). Relay MM(7) does not operate at this time since it is shunted by the operating ground for relay MON(1). Relay MON(1) closes a circuit from battery through the winding of relay MON1(5), conductor 506, contact 6 of relay MON(1), conductor 106 through cable 5-10B, contact 4 of relay RTC1(10), conductor 1014, contact 4 of relay NRR(17), conductor 1709 to ground at contact 3 of relay TM1(11). Relays MON(1) and MON1(5) prepare the marker for monitoring.

Relay MON(1) at its contact 3, extends the operating ground for relay SON(1) of the marker, over conductor 107, contact 1 of relay STM(6), conductor 617, contact 1 of relay RPS1(2), conductor 207 to battery through the upper winding of relay SON(6) of the monitor. Relay SON(6) operates in this circuit and locks in a circuit from battery through its lower winding and over its contact 8, conductor 618, contact 1 of relay MSR1(3), conductor 703, to ground at contact 7 of relay STM(6).

Relay SON(6) at its contact 1, grounds conductor 603 to operate relay CMS(3) and open the operating circuit for relay MON(1) in the marker, that relay being held operated over its locking circuit. Relay MM(7) now operates.

At its contact 4 relay SON(6) grounds conductor 607 to operate relays ONM1(7) and ONM2(7), in turn operating relay MSR(3), which in turn operates relay MSR1(3). Relay MSR1(3) closes a circuit from battery through the winding of relay MBN(3) contact 1 of relay OS(3) to ground at contact 4 of relay MSR1(3). Relay MBN(3) operates, to in turn operate the marker busy relays and open the operating circuits of the marker preference relay MP0(4) as above described.

Relay CMS(3) is operated early so that, if the marker abandons the call before the marker busy relays operate, a second marker cannot operate its MON(1) relay, and relay SON(6) is locked over a back contact of relay MSR1(3) so that, once the monitor is seized on an out sender call, it will advance to the point of operating the marker busy relays to test the markers for calls in progress before accepting new calls.

Relay ONM1(7) operates relays TMA(11) and TMB(18) to start timing and grounds conductor 707 to operate the next relay in the allotter chain, relay APG(7), as above described.

Relay SON(6) at its contact 7 connects battery supplied through resistance STC1(2) and over conductor 208 to conductor 204 to complete the previously traced circuit for operating relay MON(5) at the master test frame connector to seize that circuit as previously described.

In the meantime the marker has been selecting an idle outgoing sender and operating the outgoing sender connector, which is shown in skeleton form in Fig. 25, to connect the selected sender with the marker.

These operations, which are described in detail in the previously identified Busch application, include the operation of a marker preference relay MP(25) on the outgoing sender connector associated with the selected sender, which locks and grounds conductor 2550 to inform the marker that the connector has been seized, and the operation of a sender group relay OSGA, followed by the operation of a multicontact relay MA(25) individual to the marker, a multicontact relay SA0(25) individual to the group of senders including the selected sender and an auxiliary relay S0(25) individual to the marker and sender. These sender relays are associated with the dial type out sender shown in Fig. 24.

While, in service, a seperate connector would be used for different types of senders, for convenience, multicontact relay SA1(25) and S1(25) associated with the multifrequency type out sender shown in Fig. 34, have been shown as a part of the same connector.

With relays MA(25) and SA0(25) operated the called line number registers of the sender are connected over a plurality of conductors represented by cable 1-25E to the marker where these conductors are further extended over the contacts of relays K(1) to the code registers of the marker and to to the conductors incoming from the called line number registers of the originating register.

Relay S0(25) extends a number of control conductors between the marker and the outgoing sender, including operating circuits for relays ON1(24) and AV(24). Relay ON1(24) is operated as soon as the sender is connected with the marker, in turn operating relay SB(24) to make the sender busy and to supply off-normal grounds for the sender. Relay AV(24) is operated when the marker has completed its function, to advance the sender to transmit the called line number to the distant office.

In addition, relays MA(25) and SA0(25) complete a circuit from ground over contact 3 of relay SON(6), conductor 619, contact 5 of relay SON1(10), conductor 1015, through cable 5-10B, contact 8 of relay MON(1) of the marker, conductor 108, over contacts of relays MA(25) and SA0(25) in the sender connector, conductor 2551 to battery through the winding of relay M(24) in the selected sender. Relay M(24) connects the selected sender with the monitor.

With relay M(24) operated a circuit is closed from ground at contact 7 of relay STM(6), conductor 703, contact 3 of relay RN(610), conductor 610, contact 6 of relay SON(6), contact 5 of relay STM(6), conductor 620 through cables 2-34 and 24-34, contact 9 of relay M(24), conductor 2400 through cables 24-34 and 2-34, contact 4 of relay STM (6), conductor 621 to battery through the winding of relay DOS(2). Relay DOS(2) operates in this circuit, and closes a locking circuit for relay M(24) which may be traced from battery through the winding of relay M(24) over its contact 6, conductor 2401 through cables 24-34 and 2-34, contact 3 of relay DOS(2), conductor 604 to ground at contact 5 of relay RN(7).

Relay DOS(2) also connects ground over its contact 2, conductor 209 through cables 2-34 and 24-34, contact 8 of relay M(24) to battery through the winding of the sender busy relay SB(24) to supplement the ground supplied by relay ON1(24) and to hold the sender busy after relay ON1(24) releases at the end of the call.

When the sender has been connected to the outgoing trunk through the outgoing sender link (Fig. 1), ground is connected to conductor 2402 through cable 1-23 from the outgoing sender link, operating relay ON(24). A branch of this conductor is extended over contact 10 of relay M(24), conductor 2403 through cables 24-34 and 2-34, contact 4 of relay DOS(2), conductor 608 to battery through the winding of relay MAC1(6). Relay MAC1(6) operates relay MAC2(6) which locks as previously described, closing a locking circuit for relay SON(6) from battery through the lower winding of relay SON(6), contact 8 of relay SON(6) conductor 618, contact 4 of relay MAC2(6), conductor 622, contact 2 of relay RN(7) to ground on conductor 703.

Relay DOS(2) when operated, as above described, also closes a circuit from ground at its contact 7 to conductor 1016 and battery through the winding of relay SON1(10). Relay SON1(10) operates, opening at its contact 5 the operating circuit for relay M(24) leaving the latter relay locked under the control of relay DOS(2). Relay DOS(2) at its contact grounds conductor 602 to operate relay DON(20) which in turn operates relay ORN(15) as before described.

When the monitor is set to montitor on outgoing senders, that is with relay OS(3) operated, the operation of TRB(17) as an indication that the master test frame connector is busy, as above described, closes a holding circuit for relay MBN(3) which may be traced from battery through the winding of that relay, contact 1 of relay OS(3), conductor 316 to ground at contact 3 of relay TRB(17) to prevent seizure of the monitor if the frame connector is busy.

Assuming that the master test frame connector is idle, the operation of relay MON(5) as above described, in response to the operation of relay SON(6) seizes the connector for use by the monitor, and is followed by the operation of relay CI(10) and ON(2) as described for monitoring on an orginating register. As in that case, relay CI(10) operates relay CI1(10) which also operates relays MCA(27) and MCB(33). In addition, with relay SON1(10) operated, a circuit is closed from ground over contact 4 of relay SON1(10) contact 2 of relay CI1(10), conductor 1017 through cable 17-26 to battery through the winding of relay MCC(27) which connects the registers of Fig. 26 over cable 5-27B through cable 5-27C with the master test frame connector. In addition, ground over contact 2 of relay SON(6) and conductor 623 is extended over contact 3 of relay CI1(10) and conductor 1018 through cable 11-14B to battery through the windings of relays MCJ(14) and MCI(14) which provide for the registration of additional items of information which the marker may transmit to an outgoing sender.

Relay CI(10) also operates relay MKB(5) individual to the marker at the master test frame connector, which in turn operates the multicontact relays represented by relay BCD(5) to connect branches of the conductors, over which the marker transfers the calling line number, the called line number and other information to the sender, to the conductors leading to the automatic monitor.

The calling line location, which is passed to the outgoing sender only for the purpose of controlling automatic accounting equipment, is passed to the automatic monitor only for use in case a trouble record is to be made.

Figure 26:
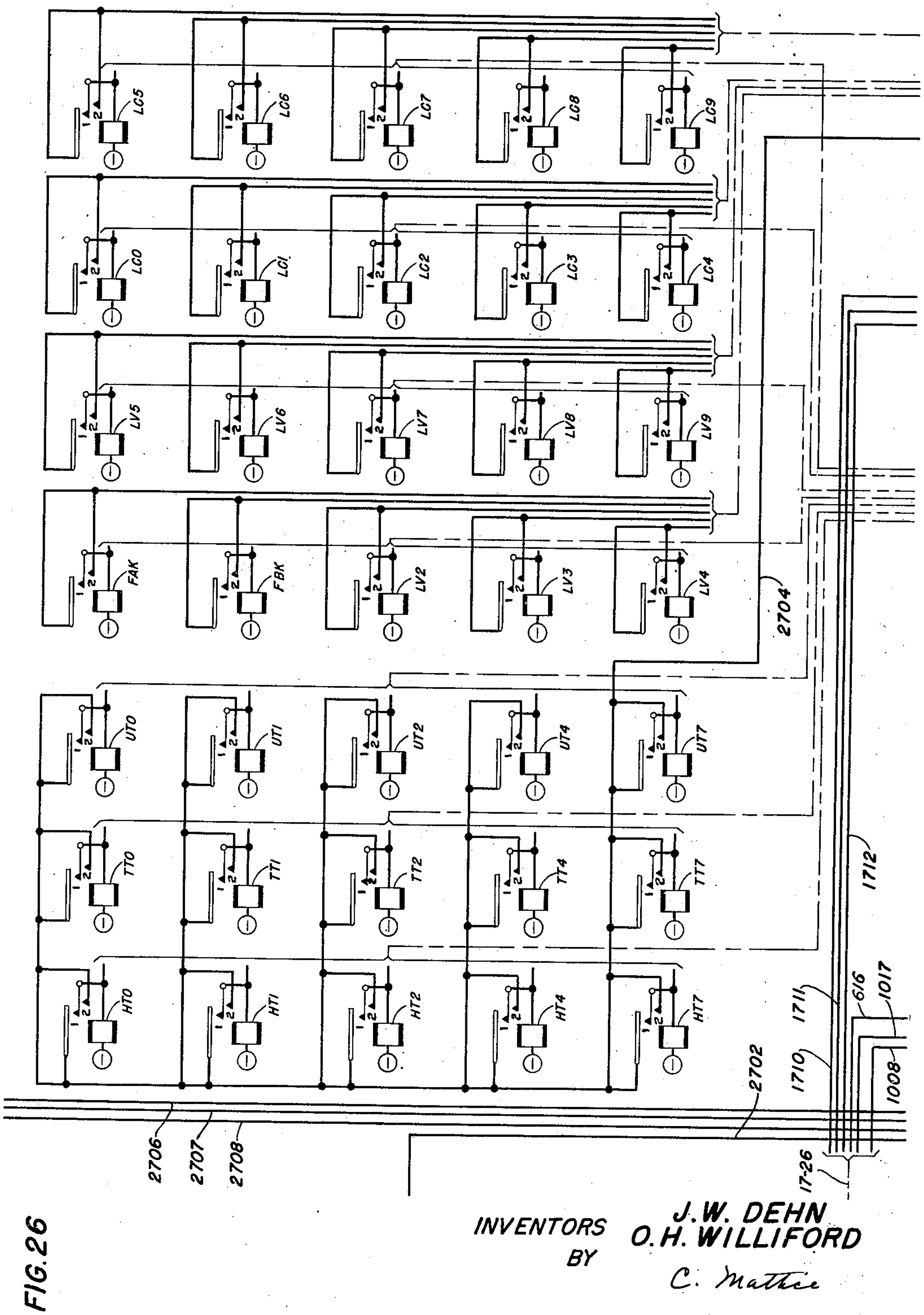
Figure 27:
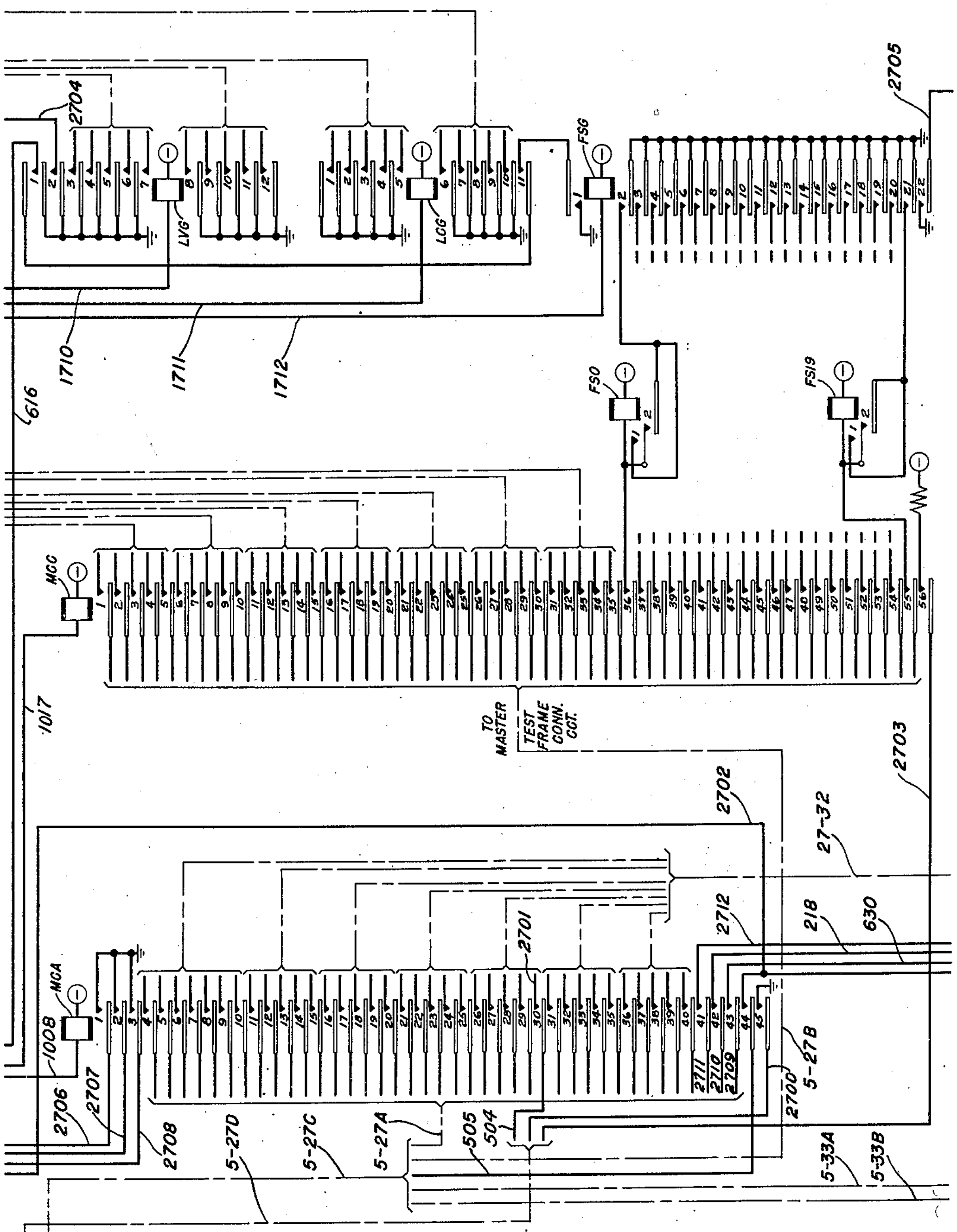
Figure 28:
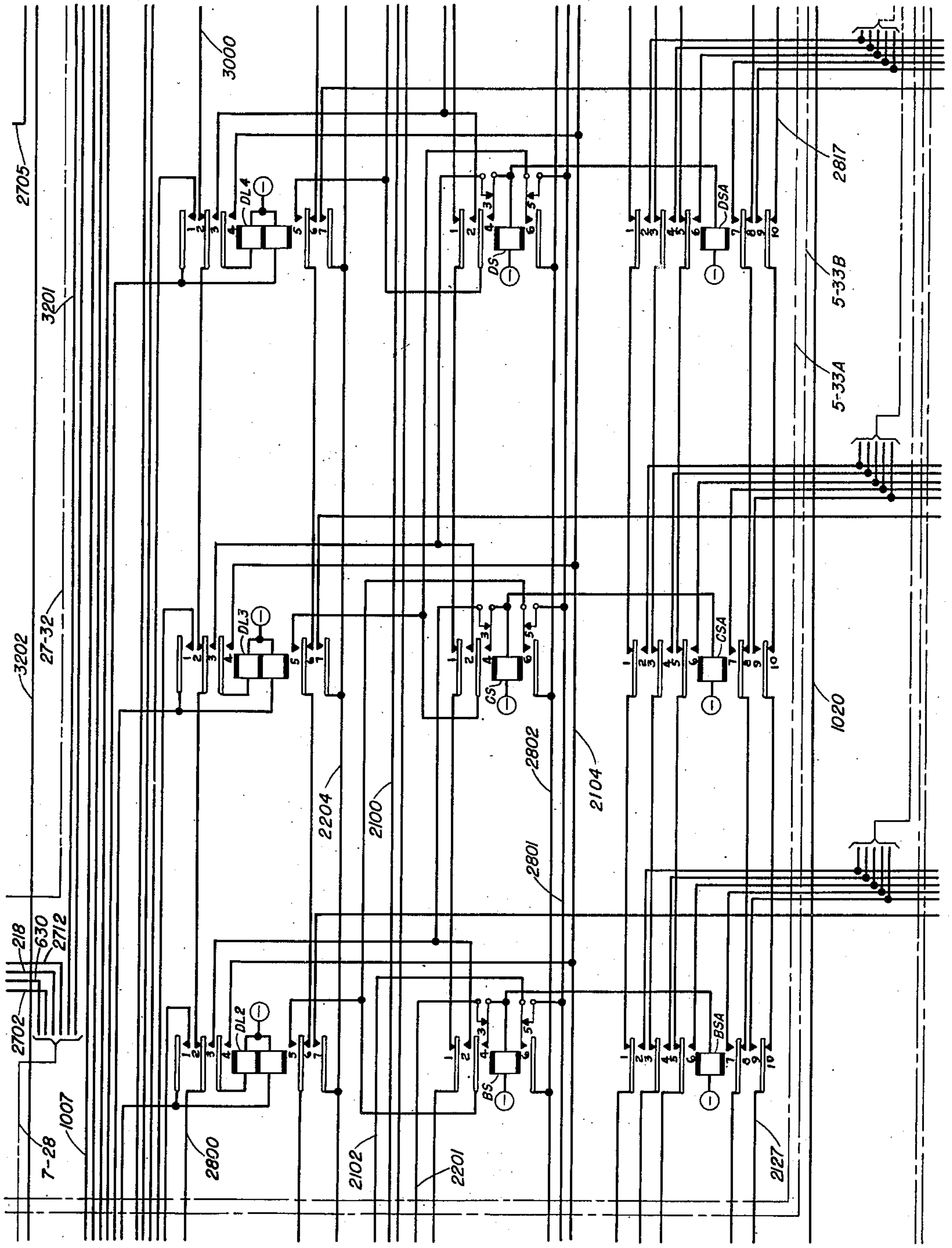

With relay MCC(27) operated the location of the selected trunk is registered on the registers of Fig. 26. For this purpose, relay MCC(27) connects battery through resistance TRA, over its contact 56, conductor 2703 through cable 5-27D to the master test frame connector, contact 10 of relay MKB(5), conductor 507 to the trunk line frame and over contacts of relays used in connecting the selected trunk with the marker to conductors included in cable 1-5C, over contacts of the multicontact relays represented by relay BCD(5) conductors of cable 5-27B, contacts of relay MCC(27) to registers in Fig. 26. The switch on which the trunk appears is identified by operating one of the relays LC0(26) to LC9(26); the level of the switch by operating one of the relays LV2(26) to LV9(26) and the appearance of the trunk in that level by operating either relay FAK(26) or FBK(26). The marker also closes a circuit for operating one of the frame relays FS0(27) to FS19(27).

The called line number is transferred over the conductors of cable 1-5B, contacts of relay BCD(5), cables 5-33A and 5-27C, contacts of relay MCB(33) to operate the relays KA0(22) to KG7(31) and KST7(32) of the checking registers in the manner previously described. However, the marker may instruct the sender to modify this number before it is pulsed out and for this purpose transmits to the sender a class indication, a digit deletion indication and an arbitrary digit indication as described in the aforementioned Busch application.

These indications are also passed through the master test frame connector to the automatic monitor over circuits not shown and contacts of relays MCJ(14), MCI(14). Most of the class indications do not affect the monitor. However one class indication requires the sender to transmit a prefix 11 and in that case the marker grounds conductor 1403, completing a circuit over contact 7 of relay MCI(14), conductor 1404, contact 5 of relay TD1(15), conductor 1503 to battery through the lower winding of relay CL1(14). Relay CL1(14) operates and locks in a circuit from battery through its upper winding and over its contact 3, conductor 1405, contact 5 of relay CLS(21), conductor 2104 through cable 11-14B to ground at contact 7 of relay SON1(10). Relay CL1A(14) also operates over this locking circuit. Relay CL1(14) and CL1A(14) prepare the monitor to receive the preliminary digits 11 from the outgoing sender.

If an arbitrary digit is to be transmitted by the sender the marker grounds two of the conductors 1420 to 1427 to operate two of the relays KR0(22) to KR7(22). With any one of the relays KR0(22) to KRT(22) operated, a circuit is closed from battery through the winding of relay DCR(21), conductor 2105, contacts of the operated ones of the relays KR0(22) to KR7(22), conductor 2104 through cable 11-14B to ground at contact 7 of relay SON1(10). Relay DCR(21) prepares the digit steering circuit for the reception of the arbitrary digit and opens a by-pass in the checking circuit around the contacts of the KR and CR register relays.

If any digits are not to be dialed, the marker grounds one of the conductors 1431 to 1436, operating one of the relays DL1(21) to DL6(30). Relay DL1(21) is associated with the A digit and relay DL6(30) is associated with the next to last or F digit. If one of these relays is operated it indicates that the sender has been instructed not to send out that digit or any previous digit.

Assuming that the call being monitored does not require the transmission of any preliminary digits, either 11 or an arbitrary digit, and that the office code is also not to be sent out, relay CL1(14) will not be operated. Nor will any of the relays KR0(22) to KR7(22) be operated, and relay DL3(28) will be operated. Relay DL3(28) locks in a circuit from battery through its upper winding and over its contact 4 to ground over conductor 2104 as above traced.

The multicontact relays MA(25) and SA0(25) of the outgoing sender connector are normally held by the marker only for a timed interval long enough to register and check the information passed to the out going sender. In order to be sure that the monitor obtains the information passed to the sender, relay MON(1) opens the circuit of relay OST2(5) which controls the start of the timed interval as above described.

When relays MCI(14) and MCJ(14) operate they close a circuit from ground connected to conductor 1406 by the marker when ready to transmit this information to the sender, contact 8 of relay MCI(14), contact 7 of relay MCJ(14) to conductor 206 to complete the circuit previously traced for operating relay SCT(5) which re-closes the circuit for relay OST2(5) to permit the time interval to be measured and the multicontact relays of the outgoing sender connector to be released.

When the marker is ready to operate the hold magnets to complete the connection between the calling trunk and the selected outgoing trunk, relay HMS1(1) is operated. The operating circuit for relay HMS1(1) is extended as previously traced to conductor 2702. With relay SON1(10) operated this ground is further extended over contact 6 of relay SON1(10) and conductor 1019 to battery through the upper winding of relay TLG(17). Relay TLG(17) operates and locks over its contact 4 and conductor 1011 to ground at contact 5 of relay ONM2(7). At its contacts 1, 2 and 3, relay TLG(17) connects ground to conductors 1710, 1711 and 1712 which extend through cable 17-26 to battery through the windings of relay LVG(27), LCG(27) and FSG(27) respectively. These relays operate to provide individual locking grounds for the operated ones of relays FAK(26), FBK(26), LV2(26) to LV9(26), LC0(26) to LC9(26) and FS0(27) to FS19(27). Relay FSG(27) at its contact 21 also grounds conductor 2705 to provide a locking ground for the operated ones of relays TF0(32) to TF7(32), FG0(32) and FG1(32).

With relays FSG(27), LCG(27) and LVG(27) operated, a circuit is closed from ground over contact 1 of relay FSG(27), contact 11 of relay LCG(27), contact 1 of relay LVG(27), conductor 616 to battery through the upper winding of relay RTC1(10), operating relay RTC1(10). Relay RTC1(10) operates relay RTC2(10) and brings about the release of the master test frame connector, disconnecting the monitor from the marker as previously described.

Figure 13:
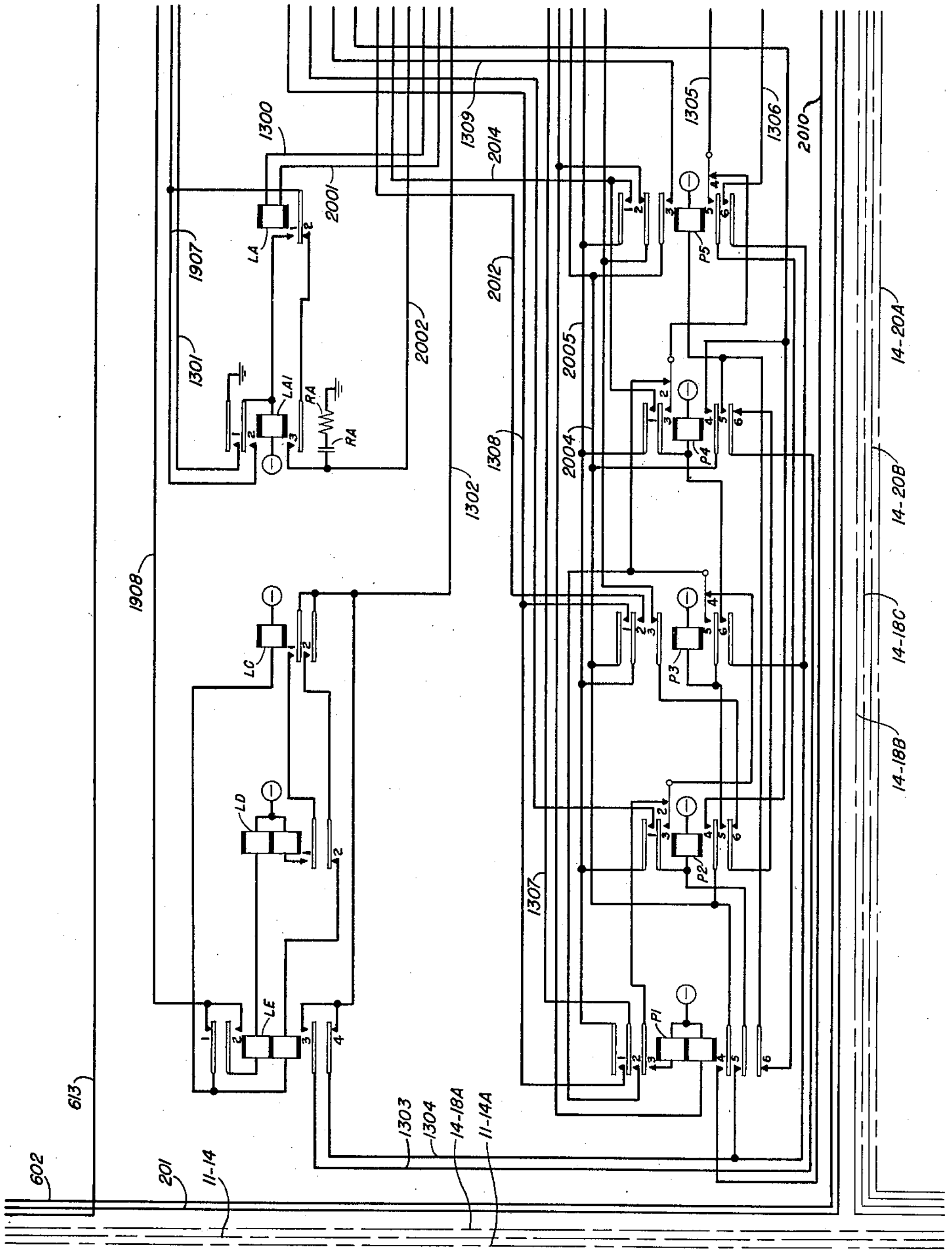
Figure 14:
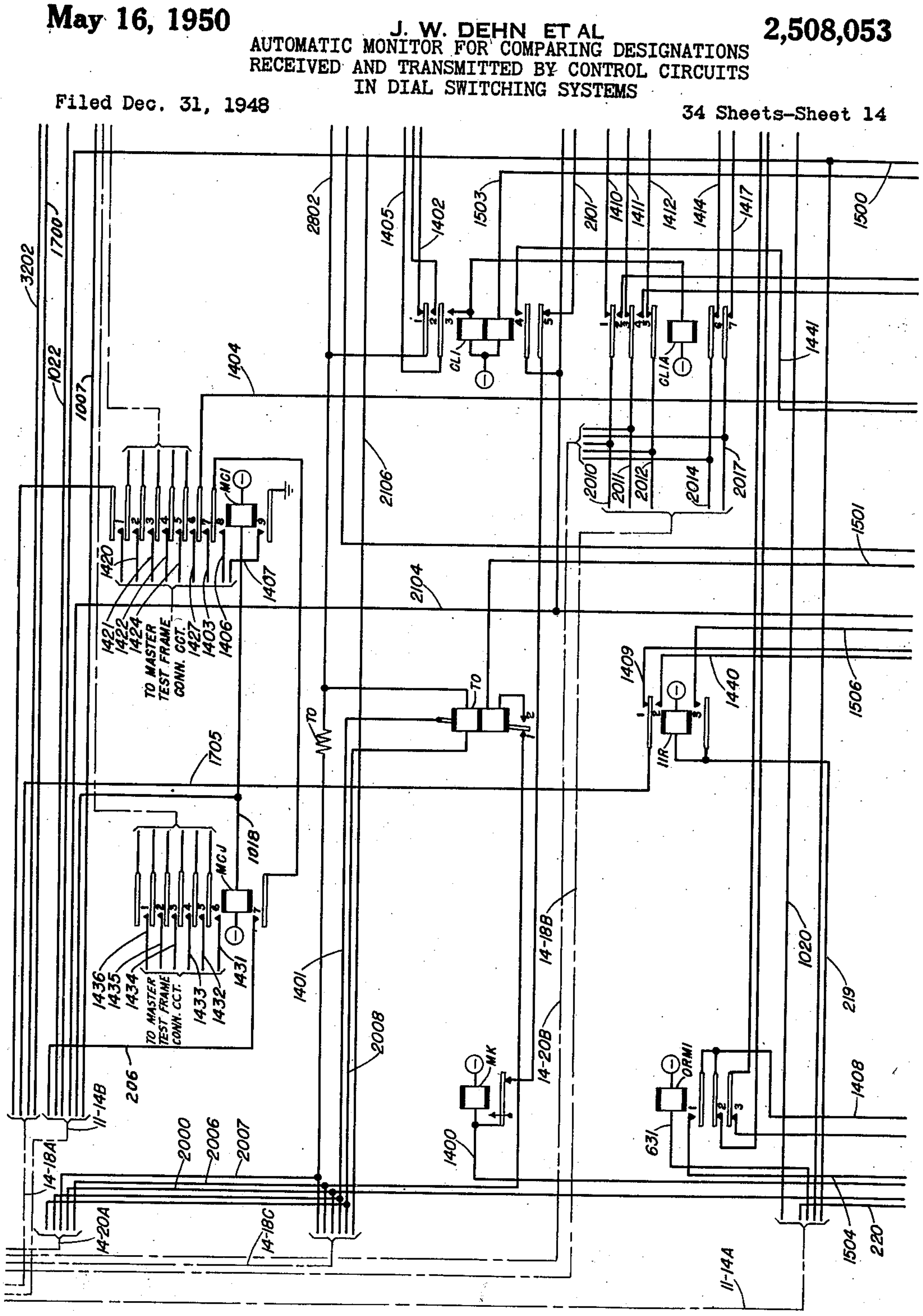
Figure 15:
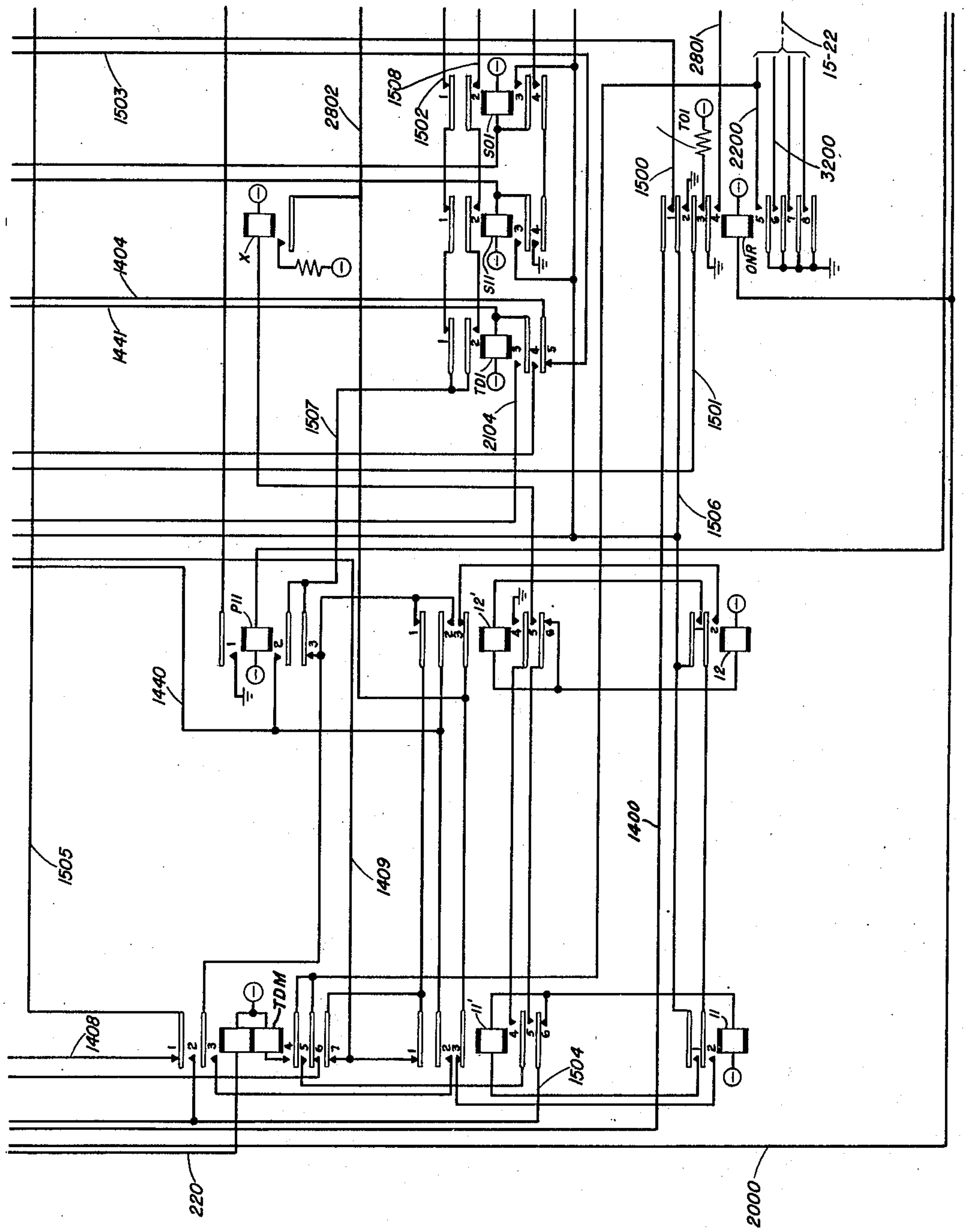
Figure 20:
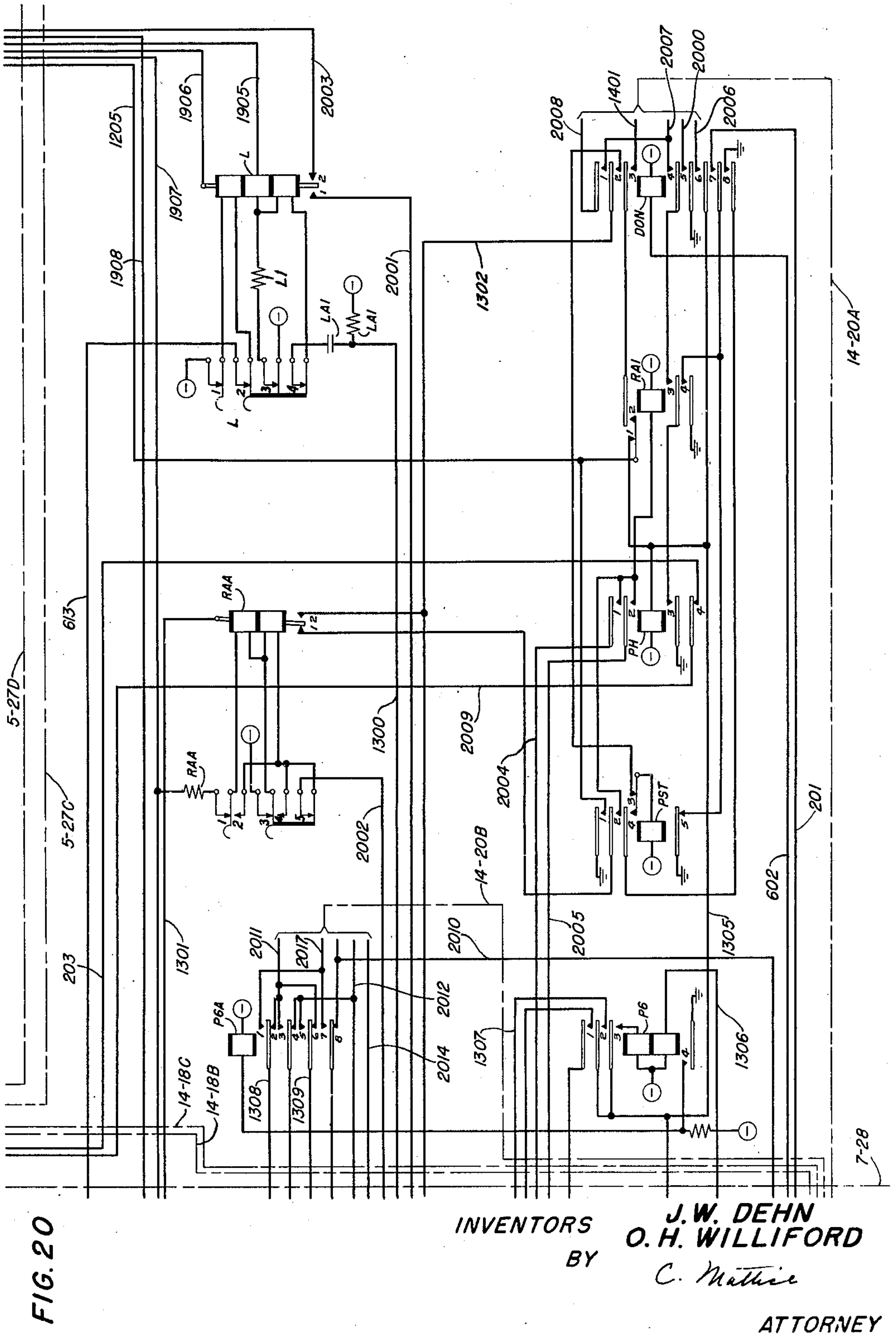
Figure 21:
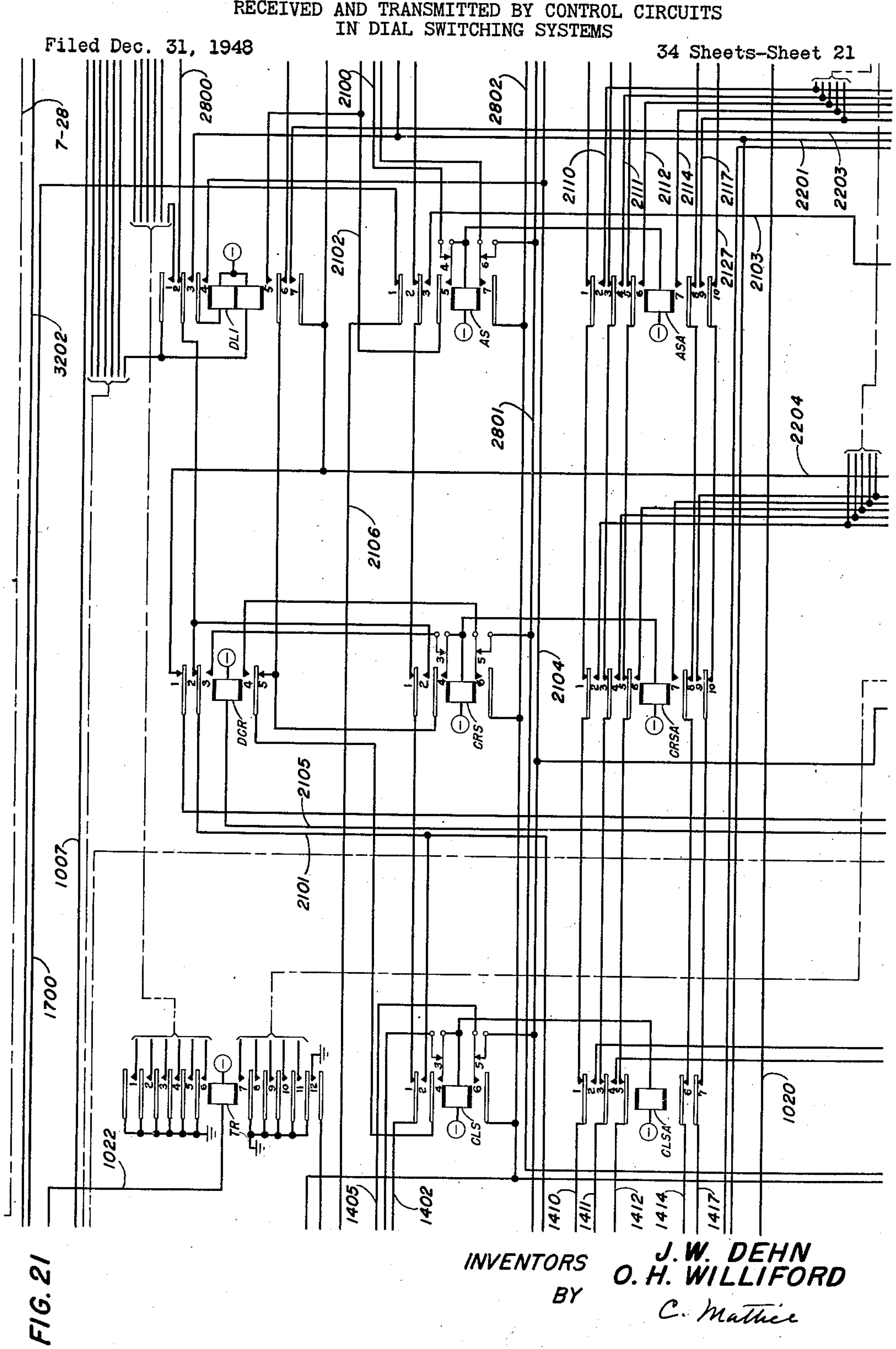

With relay RTC2(10) operated, a circuit is closed from ground over contact 6 of relay RTC2(10), contact 2 of relay SON1(10), conductor 1500 through cable 11-14B, contact 1 of relay ONR(15), conductor 1400 to battery through the winding of relay MK(14) and in parallel with relay MK(14) over the back contact of that relay, contact 5 of relay CL1(14), conductor 2101, contact 2 of relay DCR(2), contact 2 of relay DL1(21), conductor 2800, contact 2 of relay DL2(28), contact 3 of relay DL3(28), contact 3 of relay DS(28) to battery through the windings of relays DS(28) and DSA(28) in parallel, operating the latter relays. With relay DSA(28) operated the pulse registering conductors from the pulse counting relays of Figs. 13 and 20 are extended to relays D0(29) to D7(29) to register the first digit received from the sender on the D register. Since relay PE(17) has not operated, relay RTC2(10) is not effective to start the checking of the number as when monitoring the originating register.

When the marker has connected the calling line with the outgoing trunk and is ready to release, it closes a circuit for operating relay AV(24) in the outgoing sender. Relay AV(24) locks to ground supplied by relay ON(24) and establishes a connection between conductors 2404 and 2405, which are connected through the outgoing sender link to the outgoing end of the trunk circuit, to indicate to the distant office that the sender is ready to transmit pulses and to test whether the equipment at the distant office is ready to receive them. When the trunk test is completed, the trunk test equipment is removed and relay TT1(24) is operated. The trunk test equipment has not been shown since it is well-known in the art and performs no function in connection with the automatic monitor.

When relay ON(24) operates as above described, it connects ground to conductor 2406 closing a circuit through the voltage divider resistances AB(24) and BA(24) and connecting ground over contact 2 of relay TT1(24) to the windings of relay PG(24) in shunt of battery through resistance BE(24). This ground is also connected to condenser PG(24) which is connected in series with the upper winding of relay PG(24), and to the armature of relay PG(24). Therefore a circuit exists from reduced battery potential from the voltage divider, through the windings of relays CKP(24) and P(24) and the lower winding of relay PG(24) to ground on conductor 2406. Relays P(24) and CKP(24) are polarized and are so energized in this circuit that relay P(24) holds its contact closed and relay CKP(24) holds its contact 2 closed. Relay PG(24) is a non-biased polar relay and is energized to hold its contact open.

When relay TT1(24) operates it disconnects ground from resistance BE(24) and the energization of relays PG(24), P(24) and CKP(24) is reversed, relay CKP(24) closing its contact 1 and relay P(24) opening its contact to transmit a simulated dial pulse over the trunk to the distant office. Relay PG(24) is energized in a direction to close its contact but is delayed by the current flowing through its upper winding while condenser PG(24) charges from battery through resistance BE(24). When the current in the upper winding decreases sufficiently, relay PG(24) closes its contact, connecting ground to resistance BE(24) and reversing the current flow through the three relays to cause relay CKP(24) to reclose its contact 2, relay P(24) to reclose the line and relay PG(24) to attempt to open its contact. Relay PG(24) is again delayed by the discharge current from condenser PG(24) so that a series of timed pulses are transmitted over conductors 2404 and 2405 to the distant office. The closures of its contact 1 by relay CKP(24) are counted by a set of pulse counting relays and when a number of pulses has been sent corresponding to the registration set up on the called line number registers, relay BD(24) is operated to connect ground to resistance BE(24) and stop the transmission of pulses.

The manner in which the number of pulses is controlled and the advance from digit to digit is well-known and has not been shown. When the last digit registered has been sent out, relay EP(24) is operated, connecting ground to resistance BE(24) to stop the pulsing.

When relay TT1(24) operates to initiate pulsing, it closes a circuit from ground at contact 1 of relay ON(24), contact 2 of relay EP(24), contact 1 of relay TT1(24), contact 7 of relay M(24), conductor 2407 through cables 24-34 and 2-34, contact 1 of relay DOS(2), conductor 219 to battery through the winding of relay DSM(12).

Relay DSM(12) connects the tip and ring conductors 2404 and 2405 over contacts 4 and 5 of relay M(24), conductors 2408 and 2409, through cable 12-16 and contacts 2 and 1 of relay DSM(12) to the dial pulse amplifier. The pulses are counted as described for the originating register. Since relay DSA(28) is the first steering relay operated, the first digit is registered on the D register and the advance to subsequent registers takes place as above described.

When relay EP(24) is operated in the outgoing sender, its operating ground is extended over contact 11 of relay M(24) conductor 2410 through cables 24-34 and 2-34, contact 5 of relay DOS(2), conductor 211 to battery through the lower winding of relay SPE1(17). Relay SPE1(17) operates in this circuit and closes a locking circuit for itself from battery through its upper winding and over its contact 2, conductor 1011 to ground at contact 5 of relay ONM2(7).

Relay SPE1(17) connects ground to conductor 203, completing a circuit as above traced for operating relay PE(17) as soon as relay PH(29) releases following the registration of the last digit. Relay PE(17) operates relay ST7(32) as above described. With relay PE(17) operated the circuit of relay CKS(17) is closed and that relay operates to close the number checking circuit. This circuit may be traced from battery through resistance CKS(17) over contact 4 of relay CKS(17), conductor 1705 through cable 14-18A and thence to conductor 2204 as previously traced, over contact 7 of relay DL3(28), thereby by-passing the A, B and C registers on which no registration was made, over corresponding contacts on the relays of the numerical registers and the corresponding checking registers to conductor 3100 and over contact 2 of relay KST7(32) and contact 1 of relay ST7(32) to conductor 3202 and ground through the winding of relay CKN(18).

Relay CKE(18) is operated as previously described and, if relay CKN(18) operates to indicate a satisfactory check and relay MM(7) is released to indicate that the marker has released, relay RN(7) operates and locks.

Relay RN(7) releases relay M(24) in the sender and relay SON(6) and DOS(2) in the monitor. The further release of the monitor is the same as described for the operation with the originating register.

The allotter is advanced as above described and is set to monitor on outgoing senders in the next two positions, with relays APG(7) and APH(7) operated.

When relay APJ(7) operates at the beginning of the sender monitoring operation controlled by allotter relay APH(7), a circuit is closed from battery through the winding of relay IR(3), conductor 711 to ground at contact 7 of relay APJ(7).

Relay IR(3) at its contact 2 closes a holding circuit for relay STM2(3). At its contact 4, relay IR(3) closes a circuit from ground to conductor 317 and battery through the winding of relay IRB(12) which prepares the amplifier circuit for incoming register monitoring. When relay MSR1(3) operates in response to the operation of relay SON(6) it closes a circuit from ground over its contact 2, contact 5 of relay IR(3), conductor 318 through cable 3-4 to battery through the winding of relay RBN(8). Relay RBN(8) connects ground through the conductors of cable 4-8 to battery through the lower windings of the incoming register busy relays IRB0(4) to IRB9(4) to prevent the seizure of the monitor by an incoming register at this time. It may be noted that, although for convenience the number of incoming registers has been indicated as ten, the actual number would probably be greater.

When relay MSR1(3) releases at the end of the outgoing sender monitoring operation, relay RBN(8) is released, in turn releasing relays IRB0(4) to IRB9(4) if none of these relays is held operated from an associated busy incoming register. When relay APH(7) releases, relay OS(3) releases, leaving the monitor ready to monitor on incoming registers.

*Monitoring incoming registers*

When a call comes into the office from a distant dial office, the incoming trunk causes the operation of the incoming register link to associate an idle incoming register of the proper type with the trunk. These operations are described in detail in the previously identified Busch application. Referring to the abbreviated showing of an incoming register link in Fig. 9, the trunk operates a trunk preference relay TP(9) which in turn operates the register preference relay RP(9) of the first idle register of the associated group over the back contact of the register busy relay individual to that register. Relay RP(9) operates, locks and grounds conductor 911 to operate relays ON(16) and RB(9) in the selected register. Relay ON(16) supplies off-normal ground for use by the register, while relay RB(9) closes battery through a resistance to the operating circuit for relays RB0(9) etc. in the various incoming register links to mark the register unavailable. With relay RP(9) operated, ground from the back contact of relay RLK(9) is extended over contact 6 of relay RP(9) to the winding of the register busy relay RB0(9) in the register link over which the register was seized to prevent the operation of relay RB0(9) and the opening of the circuit for the register preference relay RP(9).

Relay RP(9) closes the circuit for operating the select magnet SEL(9) corresponding to the selected register in the link switch, the select magnet closing a circuit under the control of relay TP(9) for operating the hold magnet HOLD(9) individual to the incoming trunk in the link switch, thereby closing cross-point 900 to connect the trunk to the register, after which relay RLK(9) operates, permitting relay RB0(9) to operate, and preference relays TP(9) and RP(9) are released. Relay RLK(9) closes a locking circuit for relay ON(9).

While relay RP(9) is operated, it operates the trunk frame and trunk number cut-in relays TF(9) and TN(9). Relay TP(9) grounds cross-connecting terminals TN1(9) and TF(9) individual to the incoming trunk. Terminal TF(9) is cross-connected to contacts of relay TF(9) to set up a registration over conductors, extending through cable 9-16, of the trunk frame number at the trunk number register of Fig. 16. For local trunks terminal TN1(9) is connected to terminal TN2(9) to transmit a class indication over contacts of relay TF(9) and through cable 9—16 to registers included in the trunk number registers of Fig. 16. For certain trunks such as tandem trunks the number of the trunk is required by the marker and for such trunks, terminal TN1(9) is cross-connected to terminal TN3(9) to operate an auxiliary preferance relay AP(9) which supplies both the trunk number and the class indication to the trunk number register in the incoming register.

The register is arranged to receive pulsing from two different types of trunks, namely by-link trunks and direct dialing trunks. By-link trunks are those on which pulsing may start soon after the trunk is seized, whereas direct dialing trunks are those on which pulsing will not start until a start dialing signal is given. To indicate to the register the type of pulsing to be expected, ground is connected over contact 3 of relay TF(9) to terminal D(9) which is connected either over terminal BL(9) to conductor 901 to operate the by-link relay BL(16) or over terminal DP(9) to conductor 902 to operate the direct dialing relay DP(9), all the trunks connected to a particular register link being of one type.

If the incoming trunk is a by-link trunk a preliminary pulsing circuit or by-link is established which extends from the trunk, where it is grounded by a pulsing relay connected to the incoming trunk, over conductor 903, contact 4 of relay TP(9), contact 3 of relay RP(9), conductor 1600, contact 5 of relay DP(9), resistance BL(9), conductor 904, through the upper left winding of repeating coil TN(16) to battery through the middle winding of pulsing relay L(16). If pulsing starts before the operation of the link switch, the pulses are repeated over this by-link to the incoming register.

When the link switch cross-point 900 is closed with relay BL(16) operated, conductor 905, which is connected to the pulsing conductor 903 in the trunk circuit is extended over contact 2 of cross-point 900, contact 2 of relay ON(16), conductor 906, contact 3 of relay BL(16), conductor 1600, contact 5 of relay DP(9), resistance BL(9) to conductor 904 and thence as above traced to the winding of relay L(16). Relay BL(16) connects battery through resistance R, over its contact 1, conductor 1601, contact 1 of relay ON(9), contact 1 of cross-point 900 to conductor 907 which in a by-link trunk holds a relay operated to maintain the pulsing circuit.

If the incoming trunk is a direct pulsing trunk, the closure of cross-point 900, with relay DP(9) operated, connects the tip conductor 907 of the trunk over contact 1 of cross-point 900, contact 1 of relay ON(16), contact 1 of relay DP(9), contact 1 of relay RV(16), conductor 904, upper left winding of repeating coil TN(16) to battery through the middle winding of relay L(16). The ring conductor 905 of the trunk is extended over contact 2 of cross-point 900, conductor 906, contact 2 of relay ON(16), contact 2 of relay DP(9), contact 3 of relay RV(16), conductor 908, lower left winding of repeating coil TN(16) to ground through the lower winding of relay L(16). The closure of this circuit indicates to the distant office that the register has been connected.

Relay DP(9) connects relay RV(16) to a timing circuit which operates relay RV(16) after a measured interval. Relay RV(9) reverses the connection of battery and ground through the windings of relay L(16) to the trunk conductors as a start dialing signal. Relay RV(16) also operates relay RV1(16) to transmit dial tone over the trunk as an audible start dialing signal to an operator who may be waiting to dial.

The pulses received over the trunk are responded to by relay L(16), are counted by the pulse receiving relays and stored on the called line number registers in a manner similar to the operation of the originating register of the previously-identified Busch application.

When the number has been received, relay MST(16) is operated to cause the incoming register marker connector to connect the register with an idle marker and the called line number, the trunk number and associated information are transmitted over cables 1-16A and 1-16B through the incoming register marker connector to the marker, the connector operating relay INC(1) to prepare the marker for handling an incoming call.

With the monitor prepared to monitor on incoming registers, when the incoming register of Figs. 9 and 16 is seized by the incoming register link, operating relay RP(9), ground is connected over contact 8 of relay RP(9) and conductor 909 to the monitor, where it extends over a normally closed contact on relay SPR(8), conductor 800, contact 1 of the associated incoming register busy relay IRB0(4), winding of the register preference relay IRP0(4), conductor 403, contact 6 of relay IR(3), contact 3 of relay OS(3) to battery. Relay IRP0(4) occupies the preferred position in the preference chain and operates, disconnecting battery from the other preference relays to prevent their subsequent operation.

With relay IRP0(4) operated, a circuit is closed from battery through the winding of relay M(16) in the incoming register, conductor 1602 through cable 2-16, contact 4 of relay IRP0(4), contacts 5 of the other preference relays, including relays IRP5(4) and IRP9(4), to ground. Relay M(16) operates to connect the incoming register with the monitor. Ground is connected over contacts 1 of the other preference relays, IRP9(4), IRP5(4), etc., contact 2 of relay IRP0(4), conductor 404 through cable 2-16, to battery through the winding of relay MB(16). Relay MB(16) operates, disconnecting relay RB(9) from the operating circuit in parallel with relay ON(16) and closing a direct operating circuit for relay RB(9) to hold the register busy under the control of the monitor.

In addition, if conductor 991 is grounded to operate relay BL(16) in the register to prepare it for by-link operation, a branch of this conductor is extended through cable 2-16, over contact 5 of relay IRP0(4), contacts 8 of relays IRP5(4), IRP9(4) etc., conductor 405, contact 10 of relay STM(6), conductor 624, to battery through the winding of relay BLM(12), operating that relay to connect the dial pulse amplifier to the pulsing circuit of the incoming register. This circuit is closed at this time since by-link pulsing may start very soon after the trunk is connected to the register. Relay BLM(12) also closes a circuit from ground over its contact 2, conductor 1205, contact 1 of relay RA1(20) to battery through the winding of relay PH(20).

Since the preference relays are individual to the registers they also serve to selectively operate relays DIR(2) or MIR(2) in accordance with the type of pulsing to be expected. Since the incoming register of Figs. 9 and 16 receives dial type pulses, relay IRP0(4) closes a circuit from ground over contacts 3 of relays IRP9(4), IRP5(4), etc., contact 3 of relay IRP0(4), conductor 406 through cable 4-6, contact 11 of relay STM(6), conductor 625 to battery through the winding of relay DIR(2) to prepare the monitor for monitoring on a dial type incoming register.

Relay DIR(2) closes a locking circuit for relay IRP0(4) which may be traced as above from battery through the winding of relay IRP0(4), contact 6 of that relay, contacts 10 of relays IRP5(4), IRP9(4) etc., conductor 407, contact 2 of relay DIR(2), conductor 610, contact 3 of relay RN(7), conductor 703 to ground at contact 7 of relay STM(6). Relay DIR(2), at its contact 8, closes an obvious circuit for operating relay IRN(2). At its contact 7, relay DIR(2) connects ground to conductor 602, operating relay DON(20) to prepare the dial pulse counting circuit for receiving pulses.

If the incoming register has been seized by a direct pulsing trunk, when relay RV(8) operates to transmit the start dialing circuit to the calling office, it also connects ground over its contact 6, conductor 910, contact 3 of relay M(16), conductor 1603 through cable 2-16, contact 1 of relay DIR(2), conductor 212 to battery through the winding of relay DPM(12). Relay DPM(12) operates to connect the dial pulse amplifier to the incoming register.

With either relay BLM(12) or DPM(12) operated, conductor 1200 leading to the pulse amplifier is connected to conductor 1202, through cable 12-16, contact 1 of relay M(16) to conductor 904, in parallel with the middle winding of relay L(16), while voltage compensating conductor 1203 is connected to conductor 1204 through cable 12-16 over contact 2 of relay M(16) to conductor 908 in parallel with the lower winding of relay L(16).

When relay IRN(2) operates in response to the operation of relay DIR(2) as above described, it connects ground over its contact 7 to conductor 607 to operate relays ONM1(7) and ONM2(7) and over its contact 6 to conductor 1500 to operate relays MK(14), AS(21) and ASA(21).

Relay ONM1(7) operates relays TMA(11) and TMB(18) to start the timing operation, connects ground to conductor 707 to advance the allotter, and operates relays MSR(3), which function as previously described.

When relay M(16) is operated in the incoming register, it extends conductor 911, over which relay ON(16) is operated and locked, over contact 5 of relay M(16), conductor 1606, through cable 2-16, contact 6 of relay DIR(2) to conductor 608 to operate relays MAC1(6) and MAC2(6). A circuit is also closed from ground at contact 3 of relay ON(16) over the back contact of the marker start relay MST(16), conductor 912, contact 8 of relay M(16), conductor 1607 through cable 2-16, contact 5 of relay DIR(2) to conductor 606 to operate relay RPS1(2). The reception, counting and registration of the digits of the called line number take place as described for the originating register.

When relay MST(16) in the incoming register is operated to call in a marker, relay RPE1(2) operates in the locking circuit of relay RPS1(2) as previously described, in turn operating relay PEA(2). At the end of the last digit relay PH(20) releases, operating relay PE(17) which operates relay ST7(32) or the No. 7 relay in one of the registers if less than seven digits are received.

Relay RPE1(2) initiates the connection of the monitor with the master test frame connector, resulting in the operation of relays MON(5), ON(5) and RM1(5) in the connector and relays CI(10), CI1(10), MCA(27) and MCB(33) in the monitor as previously described.

Relay PEA(2) closes a circuit from ground through the winding of relay MM(7), conductor 706, contact 9 of relay STM(6), conductor 614, contact 4 of relay MTR(10), conductor 1003, contact 1 of relay PEA(2), conductor 205, contact 4 of relay DIR(2), conductor 213 through cable 2-16, contact 4 of relay M(16) in the incoming register, conductor 1608, through the incoming register marker connector to battery through the winding of relay MON(2) in the marker. With relay MON(2) operated, relays MKB(5), BCD(5) and SCT(5) are operated as before. With relay IRN(2) operated, relay CI1(10) closes a circuit from ground at contact 5 of relay IRN(2), conductor 214, contact 2 of relay CI1(10), conductor 1017 through cable 17-26 to battery through the winding of relay MCC(27).

The called number is passed from the marker to the monitor over contacts of relay MCB(33) and is registered on the checking registers as previously described. No calling line location is registered in the marker and therefore no such registration is made in the monitor. However, the number of the trunk link frame is passed over certain conductors of cable 1-5A, contacts of multicontact relays represented by relay BCD(5), conductors of cable 5-27A and contacts of relay MCA(26) to registers in Fig. 32. The units digit of the frame number is registered by operating two of the relays TF0(32) to TF7(32) and the tens digit by operating either FG0(32) or FG1(32).

In addition the location of the incoming trunk on the trunk link frame, is registered on relays FAK(26) or FBK(26), one of the relays LV2(26) to LV9(26), one of the relays LC0(26) to LC9(26) and one of the relays FS0(27) to FS19(27) as previously described.

In the case of a tandem trunk, the trunk number, indicating the line link appearance of that trunk, is stored in the trunk number register of the incoming register, is passed to the marker over conductors of cable 1-16B through the incoming register marker connector and is further passed to the monitor over cable 1-5C, contacts of the multicontact relays represented by relay BCD(5), conductors of cable 5-27B, through cable 5-27C, contacts of relay MCC(27) to the registers of Fig. 26. This number is a three-digit number and two of the relays HT0 to HT7, two of the relays TT0 to TT7 and two of the relays UT0 to UT7 are operated.

When the marker is ready to operate the hold magnets to complete the connection between the incoming trunk and the called line, it operates relay HMS1(1) and the operating ground for that relay is extended as previously traced to conductor 2702 and over contact 8 of relay IRN(2) to conductor 1019 and to battery through the upper winding of relay TLG(17). Relay TLG(17) operates relays LVG(27), LCG(27) and FSG(27) to lock in the trunk location registration. In addition relay LVG(27) connects ground over its contact 2 to conductor 2704 to provide a locking circuit for the trunk number register relays if such a number has been registered.

As previously described, relays LVG(27), LCG(27) and FSG(27) operate relay RTC1(13) to start the release of the master test frame connector which takes place as described for monitoring the originating register.

For a local incoming trunk the number checking operation also takes place as described for monitoring the originating register, resulting in the operation of relay RN(7).

Relay RN(7) locks under the control of relay ONM1(7) as previously described and opens the locking circuit for relay IRP0(4), releasing that relay. Relay IRP0(4) in releasing opens the circuit of relay M(16) in the incoming register to disconnect the register from the monitor and permit the register to release. Relay IRP0(4) also releases relay MB(16) in the incoming register and the latter relay releases, in turn releasing relay RB(9) to restore the register to service.

In addition, relay IRP0(4) releases relay DIR(2) which in turn releases relay IRN(2) and relays ONM1(7) and ONM2(7), followed by relay RN(7). Relay ONM1(7) releases relay APJ(7) and the allotter advances to prepare the monitor for again monitoring on an incoming register.

*Monitoring on multifrequency senders and registers*

In general, monitoring on multifrequency senders and registers differs from the operations above described chiefly in the means used for receiving the multifrequency pulses. For a disclosure of arrangements for receiving and for transmitting line designations by means of multifrequency pulses, reference may be made to Patent 2,382,893, granted August 14, 1945, to B. McKim and O. Myers.

A multifrequency outgoing sender is shown in Fig. 34. The selection of the sender by the marker and the transmission of the called line number to the sender and to the monitor takes place as described for the dial type sender, relays S1(25) and SA1(25) being operated in the outgoing sender connector, and relay M(34) being operated in the outgoing sender to indicate that the call is being monitored and to connect the sender with the monitor.

When relay SON(6) operates, it closes a circuit from ground at contact 7 of relay STM(6), conductor 703, contact 3 of relay RN(7), conductor 610, contact 6 of relay SON(6), contact 5 of relay STM(6), conductor 620 to the attached outgoing sender, over contact 3 of relay M(34), conductor 3400 through cable 2-34, contact 3 of relay STM(6), conductor 626 to battery through the winding of relay MOS(2). Relay MOS(2) performs the same functions as relay DOS(2) except that, at contact 6 it connects ground over conductor 215 to battery through the winding of relay MFS(11), where relay DOS(2) operated relay DON(20).

In the outgoing sender the pulses generated by the multifrequency signal supply under the control of the called line number register are transmitted through repeating coil T(34) to conductors 3401 and 3402 leading through cable 1-23 to the outgoing sender link and thence to the tip and ring conductors of the trunk outgoing to the distant office.

With relay M(34) operated, conductors 3401 and 3402 are connected over contacts 7 and 8 of relay M(34) to conductors 3403 and 3404 leading to the monitor.

When relay MFS(11) operates as above described, it connects ground over its contact 1 and conductor 1102 to battery through the winding of relay MFN(18). Relay MFN(18) at its contact 5 connects ground to conductor 2000 to operate relay ONR(15). At its contacts 9, 10 and 11, relay MFN(18) connects off-normal batteries to the multifrequency receiving circuit. At its contacts 7 and 8 relay MFN(18) closes a circuit through the lower winding of relay PT0(18) in a direction to operate it and at its contacts 7 and 3 closes a circuit through the upper winding of relay PT0(18) in series with condenser PT1(18) and resistance PT1(18) in the non-operate direction. Ground is normally connected to conductor 1805 by the multifrequency receiving circuit in shunt of condenser PT1(18) to energize the upper winding of relay PT0(18) and this circuit is effective to hold the contact of relay PT0(18) open.

Relay MFS(11) connects conductors 3403 and 3404, over its contacts 3 and 5 and contacts 2 and 4 of relay MFR(11) to the right windings of repeating coil MF2(11). It also connects the right, or output winding, of repeating coil MF1(11) over contacts 7 and 9 of relay MFR(11) through pad MF(11) over its contacts 6 and 7 to conductors 1103 and 1104 leading to the multifrequency receiving circuit.

The left or output winding of repeating coil MF2(11) is connected through condenser MF3(11) to the grids 3 and 7 of the vacuum tube MF(11). Current flows in a circuit from +130 volt battery over contact 2 of relay AC(19), conductor 1909, resistance MF5(11), left or input winding of repeating coil MF1(11), through the plate to cathode circuit of the vacuum tube MF(11), resistance MF1(11) to ground, producing a voltage drop across resistance MF1(11). This voltage drop is impressed across the grid-cathode circuit and serves to automatically adjust the plate current. Condenser MF1(11) is shunted across resistance MF1(11) in order to maintain the grid bias at a constant average value when a modulating alternating current voltage is impressed on the grid during pulsing. A fraction of the alternating current voltage at the plates of tube MF(11) is fed back to the grid through the voltage divider circuit which consists of condenser MF2(11), resistance MF2(11) and resistance MF3(11).

Each signal sent by the multifrequency sender consists of two out of five audio frequencies which may be designated 0, 1, 2, 4 and 7. In addition, a key pulse signal using frequency 2 and a sixth frequency designated 10 is sent first as a gate opener signal and a start signal consisting of frequencies 7 and 10 is sent after the last digit. The entire code used is as follows:

| Digit | Frequencies |
|---|---|
| 0 | 4, 7 |
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |
| KP | 2, 10 |
| ST | 7, 10 |

Actual frequencies are as follows:

| Designation | Cycles per Second |
|---|---|
| 0 | 700 |
| 1 | 900 |
| 2 | 1,100 |
| 4 | 1,300 |
| 7 | 1,500 |
| 10 | 1,700 |

The key pulse signal is absorbed by the multifrequency receiver. As each subsequent digit is received the receiver grounds two of the conductors 2010, 2011, 2012, 2014 and 2017 which extend through cable 14-18B to the steering relays of Figs. 14, 21, 28 and 30.

When two frequencies representing a digit are received, the multifrequency receiving circuit grounds conductor 1806, completing a circuit over contact 4 of relay MFN(18), conductor 1401 through cable 14-18C, contact 1 of relay TO(14), conductor 2006 through cable 14-18C, contact 6 of relay MFN(18), conductor 1807 to the receiving circuit to operate the channel relays.

Assuming that no prefix digits were to be sent out and no digits are to be deleted, so that relays AS(21) and ASA(21) are operated in response to the operation of relay SON1(10) in the manner previously described, the two operated channel relays will ground two of the conductors 2010 to 2017, and operate two of the register relays A0(22) to A7(22).

When two frequencies have been counted the multifrequency receiving circuit connects ground to conductor 1808 and over contact 1 of relay MFN(18) to conductor 2007 to operate relays BS(28) and BSA(28), relay BS(28) locking and transferring the locking circuit for relays AS(21) and ASA(21) in the manner previously described.

At the same time that the multifrequency receiving circuit grounds conductor 1808, it removes ground from conductor 1805, permitting condenser PT1(18) to start charging in series with the upper winding of relay PT0(18). This charging current holds the contact of relay PT0(18) open until the charging current has reduced sufficiently to permit the current in the lower winding to cause the contact to close. When the contact of relay PT0(18) closes, it connects conductor 2007 over contact 2 of relay MFN(18) to conductor 2008, thereby connecting the upper winding of relay TO(14) in parallel with resistance TO(14) and operating relay TO(14). Relay TO(14) disconnects conductor 1401 from conductor 2006, releasing the channel relays and locks to conductor 1401 as above described. When the channel relays release, ground is removed from conductors 1401 and 1808 and is again connected to conductor 1805 causing relays AS(21) and ASA(21) and TO(14) to release and causing relay PT0(18) to reopen its contact.

If less than seven digits are to be sent out, for example, an operator's code, a start signal is sent, in response to which the 7 relay of the associated register will be operated and the channel 10 relay will connect ground to conductor 1809, operating relay 10(18), which locks to conductor 2000 and connects ground to conductor 1401 to hold relay TO(14) operated. If a complete designation is sent out, relay PE(17) operates relay ST7(32) as previously described.

A multifrequency incoming register is shown in Fig. 23. An incoming call from an office equipped to transmit multifrequency pulses causes the trunk to operate the associated register link circuit to select an incoming register equipped to receive multifrequency pulses in the manner described for selecting the dial type register. When the hold magnet of the link switch operates, relay ON(23) is operated. With the link switch operated the tip and ring conductors of the trunk are connected to conductors 2301 and 2302 which extend through the left windings of the repeating coil IN(23) to battery and ground through the windings of relay A(23). The multifrequency pulses incoming over the trunk are transmitted through the right winding of repeating coil IN(23) to the multifrequency receiving circuit (Fig. 23) which sets the called line number register. The trunk frame number is registered, and, in the case of a tandem trunk, a tandem indication is given by operating relay TAN(23) and the trunk number is also recorded.

If the monitor is set to monitor on incoming registers, the operation of the register link circuit operates the associated preference relay for example, relay IPR9(4) as previously described, which, in turn, operates relay MIR(2) to inform the monitor that it has been seized by a multifrequency incoming register and operates relay M(23) in the incoming register to connect the register with the monitor.

In general, the functions of relay MIR(2) are the same as those of relay DIR(2) previously described, but relay MIR(2) at contact 8 connects ground to conductor 201 to provide a locking circuit for relay TMA(11) and an operating circuit for relay TMB(18) to start the timing operation. At its contact 7, relay MIR(2) connects ground to conductor 216 completing an operating circuit for relay MFR(11). Relay MFR(11) at its contacts 6 and 8 connects the output of the multifrequency amplifier to conductors 1103 and 1104 leading to the multifrequency receiving circuit.

With relay M(23) operated, the incoming tip and ring conductors 2301 and 2302 are connected over contacts 2 and 3 of relay M(23) to conductors 2303 and 2304 which are extended, with relay MFR(11) operated, over contacts 3 and 5 of the latter relay to the input of the multifrequency amplifier.

Relay MFR(11) also operates relay MFN(18) to prepare the multifrequency receiving circuit for operation. The reception and registration of the digits takes place as above described for the outgoing sender, while the registration of the number as transmitted to the marker, the checking of the two numbers received and the further operation of the monitor are as described for the dial pulse type incoming register.

While the monitor as disclosed provides for monitoring only on dial type and multifrequency incoming registers and outgoing senders, it is obvious that it may readily be modified to monitor on other types of such circuits.

*Abandoned calls*

If a call, which is being monitored, is abandoned, the monitor is arranged to release without attempting to make a check of the numbers to a trouble record.

It will be remembered that relay MAC1(6) was operated in parallel with an off-normal relay of the circuit being monitored, in turn operating relay MAC2(6) which locked, independent of relay MAC1(6).

When the circuit being monitored releases in response to abandonment of the call, the operating circuit for the associated off-normal relay is opened and relay MAC1(6) releases.

In the case of an originating register the release of relay MAC1(6) closes a circuit from ground over contact 3 of relay MAC2(6), contact 2 of relay MAC1(6), conductor 627, contact 1 of relay ORN(6), conductor 628, contact 5 of relay RTC2(10), conductor 1801, contact 1 of relay TRR2(10), conductor 1013, contact 2 of relay MM(7), contact 11 of relay ONM1(7) to battery through the winding of relay RN(7). Relay RN(7) locks under the control of relay ONM1(7) and causes the release of the monitor as previously described.

When monitoring on incoming registers, relay IRN(2) connects conductor 627 to conductor 628 to permit the release of relay MAC1(6) to close the above traced circuit for operating relay RN(7). This circuit for relay RN(7) is opened by relay RTC2(10) to prevent the normal release of the register from releasing the monitor.

When monitoring on outgoing senders, the release of relay MAC1(6) connects ground to conductor 627 as above traced, completing a circuit over contact 11 of relay SON(6), conductor 629, contact 1 of relay SPE1(17), conductor 1801 and thence as above traced to battery through the winding of relay RN(7). Relay SPE1(17) opens this circuit to prevent the normal release of the sender from releasing the monitor.

Any one of the above traced circuits is opened by relay TRR2(10) to prevent an abandoned call from releasing the monitor while the monitor is making a trouble record as a result of a time out prior to the operation of relay RTC2(10), or relay SPE1(17).

*11X codes*

If service codes using the digits 11 followed by one of the digits 0 to 8 are used in the office, and a calling subscriber dials such a code into the originating register while it is being monitored, relay P1(13) remains operated at the end of the first digit, and conductors 2010 and 2011 are grounded as above described, operating relays A0(22) and A1)22). Relays A0(22) and A1(22) operated, cannot lock, as previously mentioned, but when relay RA1(20) operates at the end of the digit a circuit is closed from ground at contact 3 of relay PH(20), contact 3 of relay RA1(20) and thence as previously traced to contact 3 of relay AS(21) and over conductor 2103, contact 3 of relay A1(22), contact 3 of relay A0(22), conductor 1505, contact 1 of relay TDM(15), conductor 1408, contact 1 of relay ORM1(14), conductor 1504, contact 6 of relay 11'(15) to battery through the winding of relay 11(15). Relay 11(15) operates and closes a locking circuit for itself through the winding of relay 11'(15), contact 1 of relay 11(15), conductor 1506, contact 2 of relay ONR(15), to ground. Relay 11'(15) cannot operate, being shunted by the operating circuit of relay 11(15). When relay RA1(20) releases at the beginning of the second digit, relay 11'(15) operates.

Relays A0(22) and A1(22) are again operated by the second digit, grounding conductor 1505 when relay RA1(20) reoperates, to complete a circuit over contact 1 of relay TDM(15), conductor 1408, contact 1 of relay ORM1(14), conductor 1504, contact 5 of relay 11'(15), contact 6 of relay 12'(15) to battery through the winding of relay 12(15). Relay 12(15) operates, locking through the winding of relay 12'(15) to ground over conductor 1506 and contact 2 of relay ONR(15). Relay 12'(15) operates at the beginning of the third digit which is registered in the manner previously described.

The originating register passes the information that a 11 prefix has been dialed by grounding a conductor leading to the marker, which, when the marker is ready to pass the called line number to the monitor, is connected to conductor 2711, and over contact 41 of relay MCA(27), conductor 2712 through a cable 7-28, contact 3 of relay RPS1(2), conductor 219 through cable 11-14A, to battery through the winding of relay 11R(14). Relay 11R(14) operates and locks over its contact 3 and conductor 1506 to ground at contact 2 of relay ONR(15).

Under this condition, the checking circuit extends from conductor 1705 to conductor 1507 over contact 2 of relay 11R(14), conductor 1440, contact 2 of relay 12'(15) and contact 3 of relay P11(15).

If an incoming register is equipped to register 11 prefix codes, a class indication registered in the trunk frame register connects ground over a contact of the monitor relay in the register to conductor 1605 and thence over contact 3 of relay DIR(2) or contact 2 of relay MIR(2), conductor 220 through cable 11-14A to battery through the winding of relay TDM(15). Relay TDM(15) operates and locks to ground over conductor 2290.

The reception of the digits 11 by the monitor takes place as described for the originating register, resulting in the operation of relays 11(15), 11'(15), 12(15) and 12'(15). Relay 11R(14) is also operated as for the originating register. Under these conditions the checking circuit extends from conductor 1705, over contact 2 of relay 11R(14), conductor 1440, either over contact 2 of relay 12'(15) or over contact 2 of relay 11'(15) and contact 3 of relay TDM(15), contact 3 of relay P11(15) to conductor 1507 and thence over the other registers in the manner previously traced.

If the outgoing sender has to transmit a preliminary 11 digit, as previously mentioned, relays CL1(14) and CL1A(14) are operated to control the registration of these digits. With relay CL1A(14) operated, ground on conductors 2010 and 2011 operate relays S11(15) and SO1(15). At the end of the first digit relay RA1(20) operates relays CLS(21) and CLSA(21) and at the beginning of the second digit relays CL1(14)

and CL1A(14) release in the manner described for the other steering relays. With relays CLS(21) and CLSA(21) operated, ground connected to conductors 2010 and 2011 in response to the second digit 1, operates relays S12(22) and SO2(22).

With relay SON1(10) operated to indicate that an outgoing sender is being monitored, and CL1(14) operated to indicate that a 1,1 prefix is to be expected, a circuit is closed from ground over contact 7 of relay SON1(10), conductor 2104 through cable 11-14B, contact 4 of relay CL1(14), conductor 1441 to battery through the winding of relay TD1(15). Relay TD1(15) operates and locks over its contact 3 to ground over conductor 2104, independent of relay CL1(14).

Therefore, when the checking circuit is closed it extends from conductor 1705 over contact 1 of relay 11R(14), conductor 1409, contact 1 of relay 11'(15), contact 1 of relay 12'(15), contact 3 of relay P11(15) conductor 1507, contacts 2 of relays TD1(15), S11(15) and SO1(15), conductor 1508, contacts 2 of relays S12(22) and SO2(22) to conductor 2202 and thence to the preliminary digit register or to another digit register as determined by the operation or nonoperation of relay DCR(21) and of relays DL1(21) to DL6(30).

*Timing during monitored calls*

When relay ONM1(7) operates, it operates relays TMA(11) and TMB(18) as previously described. Relay TMA(11) at its contact 1 opens a shunt around condenser TM(11) and at its contact 2 connects ground through the winding of relay TM(17) over conductor 1713 to condenser TM(11) establishing a charging circuit for the condenser which extends from the condenser over conductor 1105, contact 2 of relay TM2(18), through resistance TM3(18) to 130-volt battery. When the potential on condenser TM(11), which is applied across the control gap of tube TM(10), reaches the breakdown potential, tube TM(10) becomes conducting and relay TM(17) operates over the main gap of tube TM(10). The values of condenser TM(11) and resistance TM3(18) are so chosen that it will require from forty to seventy seconds to operate relay TM(17). This time is made long enough to permit a register to time out and restore to normal before the monitor times out. This prevents the monitor from timing out on partially dialed calls.

As previously described, relay TMA(11) locks over contact 6 of relay TM1(11) and conductor 1100 and operates relay TMB(18) over the same conductor, relay TMB(18) opening the operating circuit for relay TMA(11). For dial type registers conductor 1100 extends as previously traced to ground over contact 5 of relay PST(20). At the beginning of the first digit, relay PST(20) is operated, opening this locking circuit, releasing relays TMA(11) and TMB(18). Relay TMA(11) recloses the shunt through resistance TM2(11) around condenser TM(11) to discharge it. When relay TMB(18), which is slow to release to allow time for complete discharge of the condenser, releases, the operating circuit for relay TMA(11) is reclosed. At the end of the digit, relay RA1(20) operates, and at contact 4 supplies a new locking ground for relay TMA(11) and an operating circuit for relay TMB(18) which opens the operating circuit for relay TMA(11). At the beginning of the next digit, relay RA1(20) releases, in turn releasing relays TMA(11) and TMB(18) to restart the timing operation. This cycle of operations is repeated as each digit is received.

For multifrequency registers, relay MIR(2) is operated, connecting ground over its contact 8 to lock relay TMA(11) and operate relay TMB(18) throughout the monitoring operation.

The locking circuit for relay TMA(11) also extends over the normally closed contact 2 of relay PEA(2). When the register initiates the operation of the marker connector to summon a marker relay RPE1(2) is operated as described, in turn operating relay PTA(2) to stop the timing. With relay PEA(2) operated, the release of relay TMB(18) closes a circuit from battery through the winding of relay TM2(18), contact 1 of relay TMB(18), conductor 1810, contact 5 of relay PEA(2) to ground over conductor 705. Relay TM2(18) operates, locking over its contact 4 to conductor 1810, independent of relay TMB(18). Relay TM2(18) at its contacts 2 and 3 substitutes resistances TM4(18) for resistance TM3(18) in the charging circuit for condenser TM(11). At its contact 1, relay TM2(18) connects ground to conductor 1000 to supply a new locking circuit for relay TMA(11) and operating circuit for relay TMB(18). This time interval is made less than the time-out period of the register to permit the monitor to make a trouble record if the register fails to get a marker.

In the case of a failure of the numbers to match, relay TRR1(17) is operated as described and closes a circuit from ground over its contact 7, conductor 1714 to battery through the winding of relay TRR2(10). Relay TRR2(10) also opens the locking circuit for relay TMA(11) and the operating circuit for relay TMB(18) after which relay TMA(11) reoperates to start a timing interval for completion of the trouble record.

When monitoring on outgoing senders, relay TMA(11) is operated as before in response to the operation of relay ONM1(7), and the locking circuit for relay TMA(11) extends as previously traced over contacts of relays TM1(11), TRR2(10) and PEA(2) to conductor 201, which is grounded at contact 5 of relay SON(9). Since relay PEA(2) is not operated while monitoring an outgoing sender, the timing is not recycled except in the case of a failure to match, resulting in the operation of relay TRR2(10).

If relay TM(17) is operated as a result of the completion of the timing operation, it closes a circuit from ground supplied from the master test frame, over contact 5 of relay STM1(3), conductor 319, contact 2 of relay TM(17) to conductor 1715 leading back to the master test frame to light a lamp and sound a minor alarm. At its contact 1, relay TM(17) closes a circuit from ground on conductor 705, contact 1 of relay TM(17), contact 3 of relay TRR1(17), conductor 1716 to battery through the winding of relay TM1(11). Relay TM1(11) operates and locks to conductor 705, opening at its contact 6 the locking circuit of relay TMA(11) to recycle the timing. Relay TMA(11) opens the circuit of relay TM(17) and that relay releases, closing a circuit from ground over contact 6 of relay ONM2(7), conductor 716, contact 1 of relay TM1(11), conductor 1106, contact 4 of relay TM(17), conductor 1707 to battery through the winding of relay TRR1(17) to initiate a trouble record.

When relay TMB(18) releases, relay TMA(11) reoperates, but with relay TM1(11) operated relay TMB(18) cannot be operated. However, with relay TRR1(17) operated, a circuit is closed from battery through the winding of relay TM2(18), contact 1 of relay TMB(18), conductor 1810, contact 10 of relay TRR1(17) to ground over conductor 705. With relay TM2(18) operated the time interval to be measured by the timing circuit is reduced as above described.

*Trouble record*

A trouble record is initiated by the operation of relay TRR1(17) which may take place as a result of a failure of the numbers to check or as a result of a timing operation.

With relay TRR1(17) operated, a circuit is closed from ground over contact 7 of relay TRR1(17) and conductor 1714 to battery through the winding of relay TRR2, operating the latter relay. Relay TRR1(17) also connects conductor 319 to conductor 1715 to close the minor alarm circuit. In addition, relay TRR1(17) at its contact 1 opens the circuit over which MKB(5) is operated to prevent operating the marker cut-in relays at the master test frame. Relay TRR2(10) at its contact 1 opens the circuit of relay RN(7) to prevent the release of the monitor before the trouble record has been completed.

At its contact 5, relay TRR1(17) closes a circuit from battery through resistance STC3(17), contact 5 of relay TRR1(17), contact 2 of relay NRR(17), contact 2 of relay TRB(17), conductor 1701, contact 1 of relay TRC(10), conductor 1002 through cable 5-10A to ground through the winding of relay MON(5) at the master test frame connector to seize the connector.

If the test frame connector is busy, relay TRB(17) will be operated and the circuit for seizing the frame opened. In that case, the monitor will wait for a time interval and release as will be described hereinafter.

If the connector is idle, relay MON(5) operates, in turn operating relay CI(10) in the monitor, which then operates relay ON(5), followed by relay RM1(5). Relay CI(10) also operates relay CI1(10), which operates the multicontact relays MCA(27), and MCB(33) as previously described. With relay TRR2(10) operated, relay CI1(10) also closes a circuit from ground over contact 5 of relay TRR2(10), contact 4 of relay CI1(10), conductor 1020 through cable 11-14A to battery through the winding of relay MCE(33).

Relay CI1(10) also closes a circuit from ground over contact 2 of relay TRR1(17), conductor 1717, contact 1 of relay CI1(10), conductor 1021 through cable 5-10A, contact 3 of relay MON(5) to the trouble recorder to prepare the recorder and the marker test frame connector to receive a trouble record.

Figure 32:
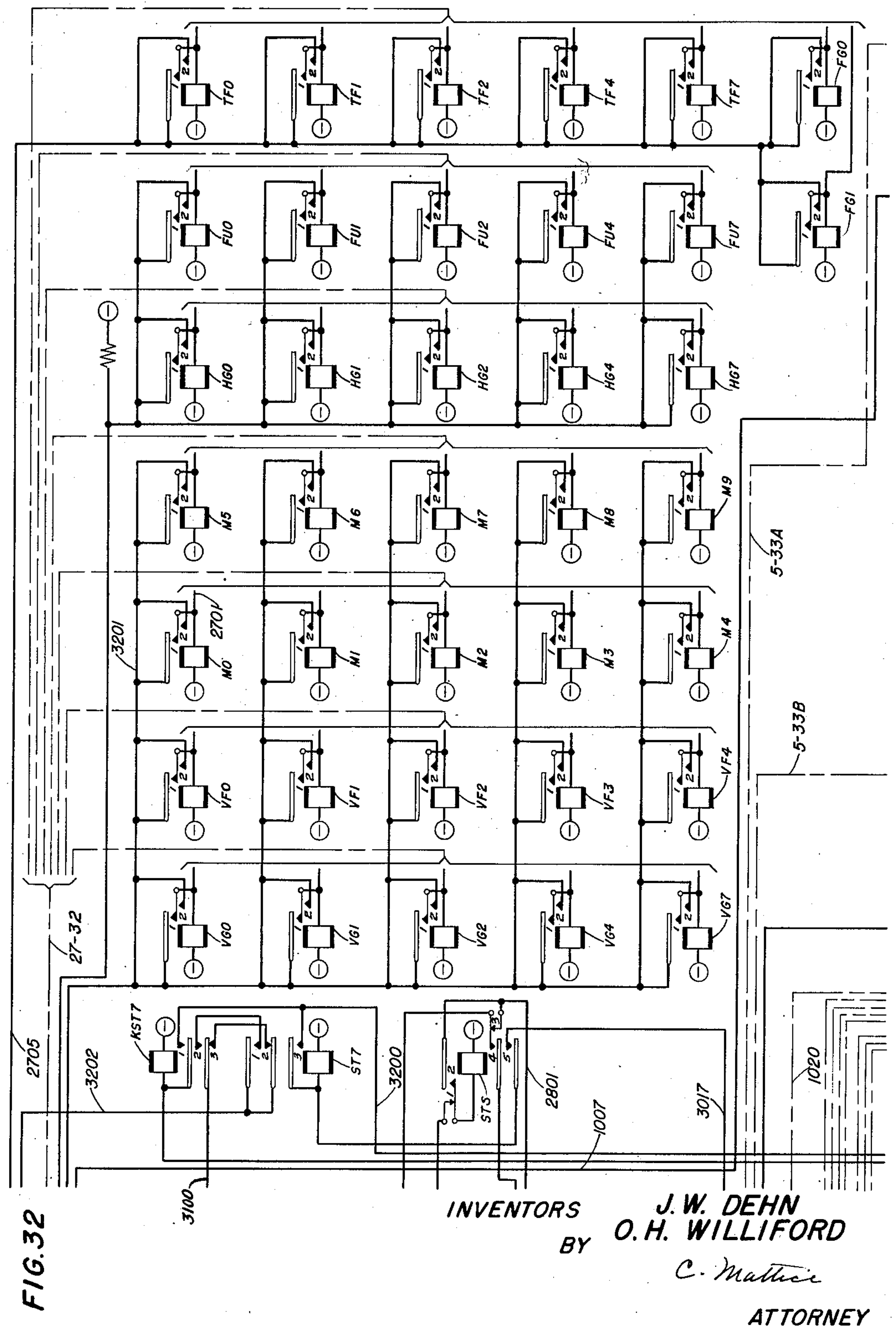
Figure 33:
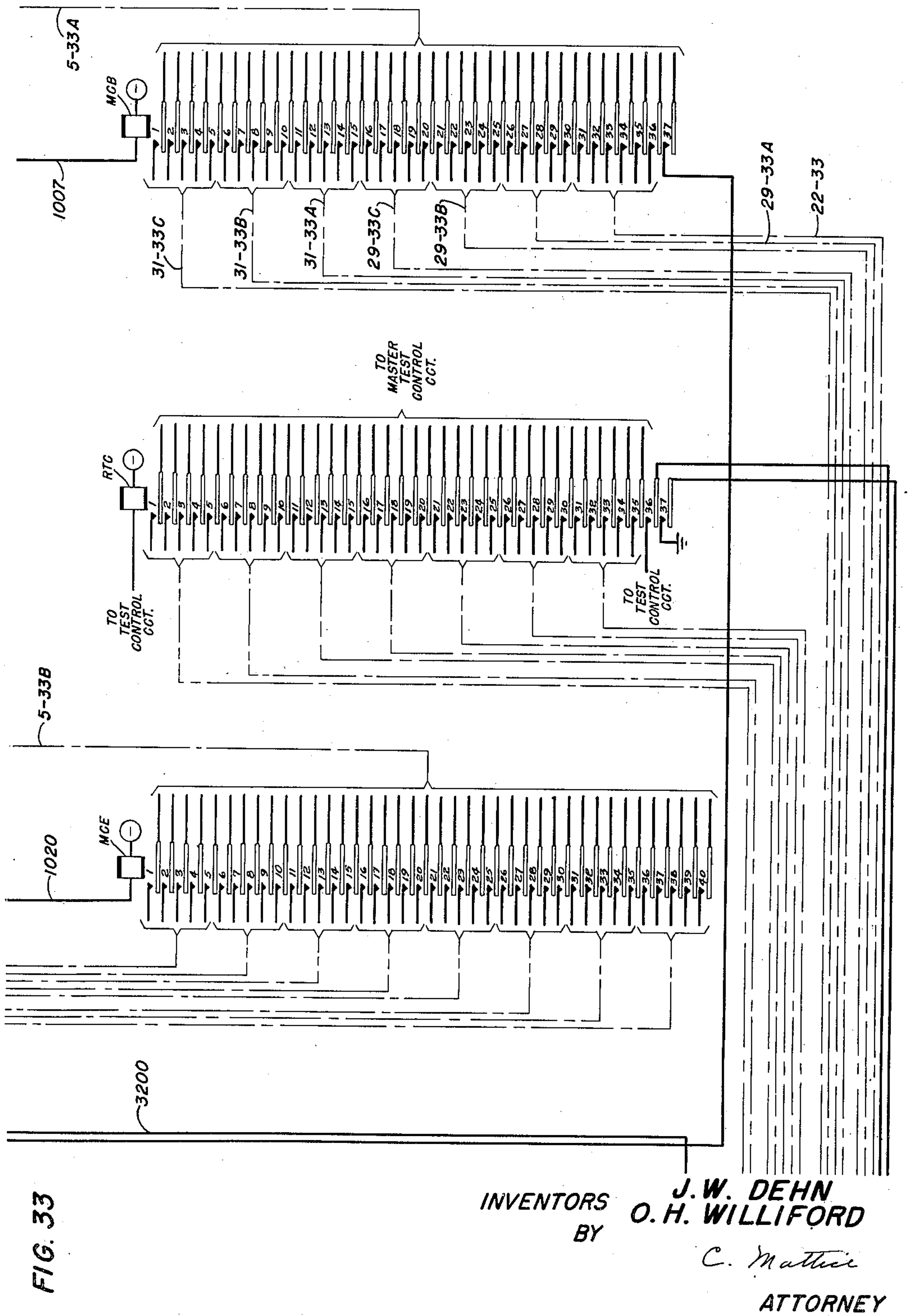

The relays of Fig. 32 previously operated to record the calling line location and marker number, and the relays of Figs. 22, 29 and 31 operated to record the called number as passed to or from the marker, extend their locking grounds over contacts of relays MCA(27) and MCB(33) through cables 5-33A and 5-27A, included in cable 5-27C to the master test frame connector. Similarly, the locking circuits for the relays on which the called number is registered directly by the monitor are extended through contacts of relay MCE(33) and cable 5-33B also included in cable 5-27C to the test frame connector.

The foregoing information is transmitted irrespective of the type of circuit being monitored.

If an originating sender is being monitored, ground is connected over contact 5 of relay ORN(6) to conductor 630 through cable 7-28 and over contact 43 of relay MCA(27) to conductor 2709 leading to the master test frame connector to indicate that fact. In addition relay MCA(27) connects ground to conductors 2706, 2707 and 2708, which are extended over contacts 4, 3 and 2 of relay MO(25) in the originating register to conductors 2508, 2509 and 2510 through cable 5-34 to the master test frame connector to record the location of the register.

A plurality of relays indicated by relay ROS0(5) are operated in sequence under the control of the trouble recorder machine to connect the conductors thus extended to the connector in groups to the interposer magnets of the recorder in order to punch holes corresponding to the information set up thereon in a record card.

If an incoming register is being monitored relay IRN(2) connects ground over its contact 4, conductor 218 through cable 7-28 over contact 42 of relay MCA(27) to conductor 2710 leading to the test frame connector to cause a record to be made of the type of monitoring. As described above, when relay CI1(10) operates, relay IRN(2) also operates relay MCC(27) to connect the trunk location and trunk number registers of Fig. 26 to the master test frame connector so that a record will be made of this information. The called number recorded directly by the monitor, the called number passed from the register to the marker and the marker number are recorded. The monitor relay in the incoming register, M(16) or M(23) transmits the register location to the test frame connector as described for the originating register.

If an outgoing sender is being monitored, relays MCC(27), MCI(14) and MCJ(14) are operated under the control of relays SON(6) and SON1(18) in addition to relays MCA(27), MCB(33), and MCE(33). Relay MCI(14) which is operated only while monitoring outgoing senders, connects ground over its contact 9 to conductor 1407 leading to the master test frame connector to cause a record to be made of the type of monitoring operation. The monitor relay in the outgoing sender, relay M(24) or relay M(34) furnishes the sender location to the trouble recorder. The record includes the marker number, the outgoing trunk location, the calling line location, the called number recorded directly by the monitor and the called number passed from the originating register to the marker and on to the sender. In addition, relay TRR2(10) closes a circuit from ground over its contact 4 and conductor 1022 through cable 11-14B to battery through the winding of relay TR(21). Relay TR(21) connects ground to individual locking circuits for relays DL1(21) to DL6(30) and KR0(22) to KR7(22) which extend over the operating circuits for these relays and contacts the relays MCI(14) and MCJ(14) to the master test frame connector to record any special information set up on the monitor relating to digit deletion and a possible preliminary digit.

When the recorder has completed its operation it transmits a signal to the master test frame connector which connects ground to conductor 508 through cable S-10A, contact 4 of relay CI(10) to battery through the winding of relay TRC(10), relay TRC(10) locks over its contact 2 and conductor 1708 to ground at contact 4 of relay ONM2(7). At its contact 1 it opens the circuit of relay MON(5) to release the master test frame connector, and at its contact 4 opens the circuit of relay DL(17). Relay TRC(10) also closes a circuit from ground over its contact 3, conductor 1023, contact 1 of key HLD(7), contact 2 of relay ONM1(7), contact 2 of relay MM(7), contact 11 of relay ONM1(7) to battery through the winding of relay RN(7) operating that relay to restore the monitor to normal.

If there is an undue delay in the operation of the trouble recorder, or in obtaining access to it, so that the timing circuit completes its operation, to operate relay TM(17), relay TM(17) closes a circuit from ground over its contact 3, contact 8 of relay TRR1(17), conductor 1718, contact 4 of relay TRC(10), conductor 1024, through the winding of relay DL(17) to battery supplied at the master test frame. Relay DL(17) locks to ground at its contact 2 and connects ground over its contact 3 to the test frame to light a lamp to indicate that a trouble record was attempted but not completed. It also closes a circuit from ground over its contact 1, contact 6 of relay TRR1(17) to conductor 1023 to operate relay RN(7) and release the monitor and the associated circuit.

*Monitoring on one type of circuit*

If it is desired to monitor on only one type of circuit, the corresponding key OR(3), OS(3) or IR(3) is operated.

If only originating registers are to be monitored, key OR(3) is operated, before the start monitor key STM(6) is operated. The operation of key STM(6) causes the operation of relays STM(6) and STM1(3), relay STM1(3) operating relay MBN(3) which in turn operates all of the marker busy relays MB0(4) to MB9(4) as previously described. With key OR(3) operated, the operation of the marker busy relays closes a circuit from ground over contacts 3 of relays MB9(3) to MB0(3), conductor 400, contact 1 of relay STM2(3), contact 1 of key OR(3) to battery through the winding of relay OR(3). Relay OR(3) operates and locks over its contact 2 and contact 3 of key OR(3) to ground at contact 1 of relay STM1(3), thereby remaining operated as long as key OR(3) remains operated. Key OR(3) at its contact 2 opens the circuit for relay APA(7), thereby disabling the allotter, and the monitor functions to monitor continuously on originating registers.

If it is desired to monitor only outgoing senders, key OS(3) is operated prior to operating key STM(6). When the marker busy relays are operated as above described, ground connected thereby to conductor 400 extends over contact 1 of relay STM2(3), contact 2 of key OR(3), contact 1 of key OS(3) to battery through the winding of relay OS(3). Relay OS(3) operates and locks over its contact 2, contact 3 of key OS(3) to ground at contact 1 of relay STM1(3). Key OS(3) at its contact 2 opens the circuit of relay APA(7) to disable the allotter. With relay OS(3) operated, ground is connected to conductor 314 to prepare for the seizure of the monitor by markers handling calls requiring outgoing senders. Ground is also connected to conductor 315 to prepare for the operation of the monitoring relay in the marker immediately following the operation of the marker preference relay. The monitor is now ready to monitor continuously on outgoing senders.

If it is desired to monitor only incoming registers, key IR(3) is operated before operating key STM(6). With key IR(3) operated, the operation of relay STM1(3) closes a circuit from ground over its contact 4, contact 3 of relay STM2(3), contact 3 of key ROR(3), contact 2 of key ROS(3), contact 3 of key RIR(3), contact 1 of key IR(3), conductor 318 through cable 3-4 to battery through the winding of relay RBN(8). Relay RBN(8) operates all of the register busy relays IRB0(4) to IRB9(4), after which a circuit is closed from ground over contacts 3 of relays IRB9(3) to IRB0(3), conductor 408, contact 2 of relay STM2(3), conductor 711 to battery through the winding of relay IR(3). Relay IR(3) operates and locks over its contact 3 and contact 3 of key IR(3) to ground at contact 1 of relay STM1(3). Relay IR(3) at contact 2 closes an operating circuit for relay STM2(3) which operates, releasing relay RBN(8) and the register busy relays not held operated by busy incoming registers. The monitor is now ready to monitor continuously on incoming registers.

*Monitoring on a particular circuit*

If it is desired to monitor on a particular originating register, key ROR(3) is operated, prior to the operation of key STM(6). Relays STM(6) and STM1(3) operate as before. With key ROR(3) operated the circuit of relay MBN(3) is opened and the marker busy relays, marker preference relays and relay OR(3) are not used.

The originating register is selected by using the master test circuit to establish a dial tone connection from the originating test line to the desired register. At the time the marker is connected to the register, the master test circuit closes a circuit for operating the monitoring relay in the register, for example relay M0(25), which connects the register to the monitor. Relay M0(25) locks over its contact 7, conductor 2501 through cable 6—25, contact 1 of key ROR(3) to ground over contact 3 of relay STM1(3) and therefore remains operate continuously. Relay M0(25) operates relay DOR(6), which in turn operates relay CMS(3) as previously described. However, with key ROR(3) operated, relay CMS(3) locks over its contact 3, contact 2 of key ROR(3), contact 3 of relay STM2(3) which is not operated under this condition, to ground at contact 4 of relay STM1(3). The call to the register is now abandoned and the register and monitor release, but relays STM(6), STM1(3) and CMS(3) as well as relay M0(25) remain operated. Whenever thereafter the register is seized, the call will be monitored.

If it is desired to monitor on a particular outgoing sender, the marker preference relay chain and relays OS(3) and MBN(3) are not used. The desired sender is chosen by operating a sender group key such as key SG(8) and an individual one of the numbered keys of Fig. 8, for example key O(8). Key ROS(3) is then operated, followed by key STM(6). When relay STM1(3) operates, it connects ground over its contact 2, contact 4 of key ROS(3), conductor 320, contact of key SG(8) to battery through the winding of relay SG(8). Relay SG(8) prepares a circuit from ground through the winding of relay MM(7), conductor 708, contact 9 of relay STM(6), conductor 632, contact 4 key O(8), contact 10 of relay SG(8) to conductor 801 individual to the desired sender. When the marker connects with this sender, conductor 801 is extended to the marker to operate relay MON(1). Relay MON(1) operates the monitoring relay of the sender, for example relay M(24) and that relay locks over its contact 6, conductor 2401 through cables 24-34 and 34-2, contact 1 of key ROS(3), contact 3 of key ROR(3), contact 3 of relay STM2(3) to ground at contact 4 of relay STM1(3), therefore remaining operated until key ROS(3) is released. Each call that is now connected to this sender will be monitored.

If it is desired to monitor on a particular incoming register, the desired register is chosen by operating an incoming group key such as key IG(8) and one of the numerical keys, for example key O(8). Key R1R(3) is then operated, followed by key STM (6). When relay STM1(3) operates, it closes a circuit from ground over its contact 2, contact 5 of key R1R(3), conductor 321 through cable 3-4B, to battery through the winding of relay SPR(8). Relay SPR(8) opens the circuits over which the associated group of incoming registers seize the monitor. With relay SPR(8) operated, a circuit is closed from ground over key IG(8), contact 1 of relay SPR(8) to battery through the winding of relay PC(8) associated with the same group of incoming registers. Relay PC(8) closes a circuit from battery through the winding of the associated relay PCA(8), contact 1 of relay PC(8), conductor 802 through cable 3-4B, contact 1 of key R1R(3) to ground at contact 2 of relay STM1(3). With relays PCA(8) and PC(8) operated, the operated condition of key O(8) extends conductor 909, which is grounded when the incoming register of Figs. 9 and 16 is seized, over contact 10 of relay PCA(8) contact 3 of key O(8), contact 11 of relay PC(8) to conductor 800 and the winding of relay IPR0(4) so that all calls to the associated incoming register will be monitored.

Relay PCA(8) also closes a circuit from battery through the winding of relay RBN(8), conductor 318, contact 11 of relay PCA(8), conductor 803, through cable 3-4B, contact 2 of key R1R(3), contact 2 of key ROS(3), contact 3 of relay ROR(3), contact 3 of relay STM2(3) to ground at contact 4 of relay STM1(3). Relay RBN(8) operates, operating all of the incoming register busy relays IRB0(4) to IRB9(4) which operate, in turn operating relay IR(3) as previously described. Relay IR(3) operates relay STM2(3), which releases relay RBN(8). If the selected incoming register is busy, the associated relay IRB0(4) is locked, thereby preventing an incomplete monitoring operation. When the register becomes idle relay IRB0(4) releases, and all subsequent calls to the associated register will be monitored.

What is claimed is:

1. In a telephone system, a plurality of types of control circuits, means for receiving telephone designations in and transmitting designations from said control circuits, an automatic monitor associable with any one of said control circuits, means in said monitor to register and compare the telephone designations as received in and transmitted from the associated control circuit, means to selectively render said monitor associable with a particular type of control circuit and means to modify the operation of said monitor in accordance with the type of control circuit with which it is made associable.

2. In a telephone system, a plurality of types of control circuits, means for receiving telephone designations in and transmitting designations from said control circuits, an automatic monitor associable with any one of said control circuits, means in said monitor to register and compare the telephone designations as received in and transmitted from the associated control circuit, means to progressively render said monitor associable with each type of control circuit and means to modify the operation of said monitor in accordance with the type of control circuit with which it is made associable.

3. In a telephone system, a plurality of types of control circuits, means for receiving telephone designations in and transmitting designations from said control circuits, an automatic monitor associable with any one of said control circuits, means in said monitor to register and compare the telephone designations as received in and transmitted from the associated control circuit, an allotter to selectively render said monitor associable with a particular type of control circuit, means under the control of said last-mentioned means to associate said monitor with one control circuit of said particular type, and means to modify the operation of said monitor in accordance with the type of control circuit with which it is associated.

4. In a telephone system, originating registers, incoming registers and outgoing senders, means for transmitting telephone designations to and from said registers and said senders, an automatic monitor associable with any one of said registers or said senders, means in said monitor to register and compare telephone designations as transmitted to and from the associated register or sender, means to selectively render said monitor associable with originating registers, incoming registers or outgoing senders, means under the control of said selective means to associate said monitor with one of said registers or one of said senders, and means to modify the operation of said monitor according as said monitor is connected with an originating register, an incoming register or a sender.

5. In a telephone system, originating registers, incoming registers and outgoing senders, means for transmitting telephone designations to and from said registers and said senders, an automatic monitor associable with any one of said registers or said senders, means in said monitor to register and compare the telephone designations as transmitted to and from the associated register or sender, means to progressively render said monitor associable with originating registers, incoming registers and outgoing senders, means under the control of said selective means to associate said monitor with one of said registers or one of said senders, and means to modify the operation of said monitor according as said monitor is connected with an originating register, an incoming register or a sender.

6. In a telephone system, a plurality of types of control circuits, each type having means to receive telephone designations by means of a different type of pulsing and all types having means to transmit said designations in the same form, an automatic monitor, means to associate said monitor with any one of said control circuits, means in said monitor to register and compare the telephone designations as received by and transmitted by the associated control circuit, pulse receiving means in said monitor to receive each type of pulsing to control the registration in the monitor of the designation as received by the associated control circuit and means responsive to the association of said monitor with a control circuit to render effective the pulse receiving means of the corresponding type.

7. In a telephone system, subscribers' lines, switches, digit registers, switch controlling markers, means to connect a calling one of said subscriber's lines with one of said digit registers, means responsive to the registration of a wanted subscriber's number in said register to transfer said wanted number to one of said markers to cause said marker to operate said switches to extend said calling line toward said wanted line, an automatic monitor circuit, means to connect said automatic monitor circuit with said one digit register, means in said automatic monitor circuit to set up a first registration of said wanted subscriber's number as transmitted to said register, means to connect said marker with said monitor circuit and to set up a second registration of the wanted number as transferred to said marker, said monitor circuit effective if the first and second registrations coincide to disconnect from said register and said marker.

8. In a telephone system, subscribers' lines, switches, digit registers, switch controlling markers, means to connect a calling one of said subscribers' lines with one of said digit registers, means responsive to the registration of a wanted subscriber's number in said register to transfer said wanted number to a one of said markers to cause said marker to operate said switches to extend said calling line toward said wanted subscriber's line, an automatic monitor circuit, means to connect said automatic monitor circuit with said digit register, means in said automatic monitor circuit to set up a first registration of said wanted subscriber's number as transmitted to said register, means to connect said marker with said monitor circuit and to set up a second registration of the wanted number as transferred to said marker, a trouble recorder, and means in said monitor circuit effective if the first and second registrations do not coincide to connect with and operate said trouble recorder to make a record of both registrations.

9. In a telephone system, subscribers' lines, switches, outgoing trunks, digit registers, switch controlling markers, means to connect a calling one of said subscribers' lines with one of said digit registers, a switch controlling marker means responsive to the registration of a wanted subscriber's number in said register to transfer said wanted number to said marker to cause said marker to operate said switches to extend said calling line to one of said outgoing trunks, outgoing senders associable with said trunk, means to connect said marker with one of said outgoing senders, means under the control of said marker to further transfer said wanted number to said one outgoing sender, means in said sender to transmit said number over said trunk to control the extension of said trunk to said wanted subscriber, an automatic monitor circuit, means responsive to the connection of said marker with said sender to connect said monitor circuit with said marker and with said sender, means in said automatic monitor circuit to set up a first registration of the wanted number as transferred to said sender, means to set up a second registration of the wanted number as transmitted by said sender and means in said monitor circuit effective if the first and second registrations coincide to disconnect said monitor from said marker and said sender.

10. In a telephone system, subscribers' lines, switches, outgoing trunks, digit registers, switch controlling markers, means to connect a calling one of said subscribers' lines with one of said digit registers, a switch controlling marker means responsive to the registration of a wanted subscriber's number in said register to transfer said wanted number to said marker to cause said marker to operate said switches to extend said calling line to one of said outgoing trunks, outgoing senders associable with said trunk, means to connect said marker with one of said outgoing senders, means under the control of said marker to further transfer said wanted number to said one outgoing sender, means in said sender to transmit said number over said trunk to control the extension of said trunk to said wanted subscriber, an automatic monitor circuit, means responsive to the connection of said marker with said sender to connect said monitor circuit with said marker and with said sender, means in said automatic monitor circuit to set up a first registration of the wanted number as transferred to said sender, means to set up a second registration of the wanted number as transmitted by said sender, a trouble recorder, and means in said monitor circuit effective if the first and second registrations do not coincide to connect with and operate said trouble recorder to make a record of both registrations.

11. In a telephone system, subscribers' lines, switches, incoming trunks, digit registers associable with said trunks, switch controlling markers, means responsive to a call incoming on one of said trunks to seize one of said registers and associate it with said trunk, means to register the designation of one of said subscribers' lines in said incoming register, means responsive to said registration to connect said register with one of said markers and to transfer said registered designation to said marker to cause said marker to operate said switches to extend said incoming trunk to said designated line, an automatic monitor circuit, means responsive to the seizure of one of said registers to connect said automatic monitor circuit with said register, means in said monitor circuit to set up a first registration of said wanted number as transmitted to said register, means to connect said monitor circuit with said marker and to set up a second registration of the wanted number as transferred to said marker, and means in said monitor circuit effective if the first and second registrations coincide to disconnect said monitor from said register and said marker.

12. In a telephone system, subscribers' lines, switches, incoming trunks, digit registers associable with said trunks, switch controlling markers, means responsive to a call incoming on one of said trunks to seize one of said registers and associate it with said trunk, means to register the designation of one of said subscribers' lines in said incoming register, means responsive to said registration to connect said register with one of said markers and to transfer said registered designation to said marker to cause said marker to operate said switches to extend said incoming trunk to said designated line, an automatic monitor circuit, means responsive to the seizure of one of said registers to connect said automatic monitor circuit with said register, means in said monitor circuit to set up a first registration of said wanted number as transmitted to said register, means to connect said monitor circuit with said marker and to set up a second registration of the wanted number as transferred to said marker, a trouble recorder, and means in said monitor circuit effective if the first and second registrations do not coincide to connect with and operate said trouble recorder to make a record of both registrations.

JOSEPH W. DEHN.
OSCAR H. WILLIFORD.

REFERENCES CITED

The following references are of record in the file of this patent:

UNITED STATES PATENTS

| Number | Name | Date |
|---|---|---|
| 1,997,195 | MacPherson | Apr. 9, 1935 |
| 2,004,607 | Hersey | June 11, 1935 |
| 2,075,527 | Korn | Mar. 30, 1937 |
| 2,202,921 | Powell | June 4, 1940 |
| 2,225,688 | Dehn | Dec. 24, 1940 |
| 2,297,365 | Ostline | Sept. 29, 1942 |